(12) United States Patent
Chen et al.

(10) Patent No.: US 11,010,691 B1
(45) Date of Patent: May 18, 2021

(54) DISTRIBUTABLE EVENT PREDICTION AND MACHINE LEARNING RECOGNITION SYSTEM

(71) Applicant: SAS Institute Inc., Cary, NC (US)

(72) Inventors: Xu Chen, Apex, NC (US); Jorge Manuel Gomes da Silva, Durham, NC (US); Brett Alan Wujek, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/093,917

(22) Filed: Nov. 10, 2020

Related U.S. Application Data

(63) Continuation-in-part of application No. 16/904,818, filed on Jun. 18, 2020, now Pat. No. 10,956,825.

(60) Provisional application No. 63/049,473, filed on Jul. 8, 2020, provisional application No. 62/991,973, filed on Mar. 19, 2020, provisional application No. 62/990,399, filed on Mar. 16, 2020.

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 10,402,720 B2* | 9/2019 | Annapureddy | G06N 3/08 |
| 2019/0378037 A1* | 12/2019 | Kale | G06F 17/17 |
| 2020/0082260 A1* | 3/2020 | Hammoud | G06N 3/04 |

OTHER PUBLICATIONS

Wu, Xuan, Lingxiao Zhao, and Leman Akoglu. "A quest for structure: Jointly learning the graph structure and semi-supervised classification." Proceedings of the 27th ACM international conference on information and knowledge management. 2018. (Year: 2018).*

Wang, De, Feiping Nie, and Heng Huang. "Large-scale adaptive semi-supervised learning via unified inductive and transductive model." Proceedings of the 20th ACM SIGKDD international conference on Knowledge discovery and data mining. 2014. (Year: 2014).*

(Continued)

*Primary Examiner* — Daniel T Pellett
(74) *Attorney, Agent, or Firm* — Bell & Manning, LLC

(57) ABSTRACT

Data is classified using semi-supervised data. A decomposition is performed to define a first decomposition matrix that includes first eigenvectors of a weight matrix, a second decomposition matrix that includes second eigenvectors of a transpose of the weight matrix, and a diagonal matrix that includes eigenvalues of the first eigenvectors. Eigenvectors are selected from the first eigenvectors to define a reduced decomposition matrix. A linear transformation matrix is computed as a function of the first decomposition matrix, the reduced decomposition matrix, the diagonal matrix, and a penalty matrix. When a rank of the linear transformation matrix is less than a number of rows of the penalty matrix, a classification matrix is computed by updating a gradient of a cost function. When the rank of the linear transformation matrix is equal to the number of rows of the penalty matrix, the classification matrix is computed using a dual formulation.

30 Claims, 28 Drawing Sheets

(56) References Cited

OTHER PUBLICATIONS

Sainath, Tara N., et al. "Low-rank matrix factorization for deep neural network training with high-dimensional output targets." 2013 IEEE international conference on acoustics, speech and signal processing. IEEE, 2013. (Year: 2013).*
Belkin, Mikhail, Partha Niyogi, and Vikas Sindhwani. "Manifold regularization: A geometric framework for learning from labeled and unlabeled examples." Journal of machine learning research. Nov. 7, 2006: 2399-2434. (Year: 2006).*
Berikov, Vladimir, and Alexander Litvinenko. "Semi-Supervised Regression using Cluster Ensemble and Low-Rank Co-Association Matrix Decomposition under Uncertainties." arXiv preprint arXiv:1901.03919 (2019). (Year: 2019).*
R.J. Tibshirani and J. Taylor. The Solution Path of the Generalized Lasso. Annals of Statistics, 2011, vol. 39, No. 3, 1335-1371.
Z. Lu, X. Gao, L. Wang, J. Wen, and S. Huang. Noise-Robust Semi-Supervised Learning by Large-Scale 343 Sparse Coding. AAAI Conference on Artificial Intelligence, 2015.
M. J Feurer, A. Klein, K. Eggensperger, J. Springenberg, M. Blum, and F.Hutter. Efficient and Robust 351 Automated Machine Learning. Neural Information Processing Systems, 2015.
Yi et al., "Semi-Supervised Ridge Regression with Adaptive Graph-Based Label Propagation," Applied Sciences, 2018,8,2636, Dec. 16, 2018 22 pages.
Norm (mathematics)—Wikipedia, retrieved from http://en.wikipedia.org/w/index.php?title=Norm_(mathematics)&oldid=957250932, last edited on May 17, 2020.

\* cited by examiner

| Algorithm | 6th Dataset | 1st Dataset | 2nd Dataset |
|---|---|---|---|
| LIBSVM | 79.87(± 1.37) | 82.86(± 2.56) | 84.78(± 1.52) |
| LapSVM | 81.02(± 2.12) | 85.33(± 3.13) | 85.96(±1.42) |
| LapRLS | 81.35(± 1.78) | 85.47(±2.12) | 85.84(±1.23) |
| meanS3VM | 80.62(± 1.81) | 83.12(±3.57) | 85.04(±1.17) |
| CS4VM | 81.72(± 2.06) | 84.93(±2.98) | 88.04(±1.12) |
| ASL | 83.25(± 1.73) | 82.61(±2.15) | 90.03(±0.98) |
| ROSSEL10 | 85.42(± 1.69) | 85.11(±2.42) | 88.50(± 1.91) |
| ROSSEL50 | 86.11(± 2.23) | 85.04(±3.14) | 88.52(± 1.54) |
| LSSC | 83.25(± 1.57) | 86.35(±2.78) | 88.45(±1.15) |
| Auto-sklearn | 85.31(± 1.65) | 85.63(±2.07) | 87.61(±1.32) |
| AutoSSL | 87.61(± 1.76) | 86.47(±1.74) | 87.33(±1.45) |
| ASSENT | 89.31(± 2.04) | 89.67(±2.57) | 89.76(±0.97) |
| App 422 | 88.26(± 1.07) | 87.37(±1.65) | 93.46(±0.97) |

FIG. 12A

| Algorithm | 5th Dataset | 4th Dataset | 7th Dataset | 3rd Dataset |
|---|---|---|---|---|
| LIBSVM | 64.40(±1.73) | 60.54(±0.64) | 74.45(±1.89) | 87.56(±0.09) |
| LapSVM | 63.43(±2.43) | 61.84(±1.31) | 74.93(±1.88) | 87.57(±0.12) |
| LapRLS | 63.41(±1.63) | 60.72(±0.62) | 74.55(±0.61) | * |
| meanS3VM | - | - | - | - |
| CS4VM | 62.04(±2.14) | 58.94(±1.19) | - | - |
| ASL | 60.83(±1.41) | 61.88(±1.34) | * | * |
| ROSSEL10 | 67.89(±1.16) | 62.33(±0.90) | 79.22(±2.00) | 89.20(±0.15) |
| ROSSEL50 | 68.20(±0.98) | 64.12(±1.20) | 78.77(±2.25) | 89.18(±0.11) |
| LSSC | 68.57(±1.12) | 62.33(±1.79) | 77.23(±1.52) | 88.33(±0.23) |
| Auto-sklearn | 65.11(±1.12) | 66.14(±1.57) | 75.32(±2.11) | * |
| AutoSSL | 68.31(±1.53) | 65.93(±1.03) | 79.35(±1.83) | 89.92(±0.17) |
| ASSENT | 71.42(±1.37) | 65.93(±1.03) | 81.45(±1.65) | 91.25(±0.17) |
| App 422 | 70.89(±1.27) | 68.32(±1.25) | 83.64(±1.93) | 93.08(±0.35) |

8th Dataset – 30% Noise level
Number of Clusters $t$

| Algorithm | 1000 | 2000 | 3000 | 4000 | 5000 | 6000 |
|---|---|---|---|---|---|---|
| LSSC | 84.2 | 86.6 | 87.0 | 88.3 | 89.0 | 89.0 |
| PVM | 63.9 | 63.3 | 63.6 | 64.1 | 64.3 | 64.2 |
| LGC | 71.5 | 72.8 | 74.0 | 74.1 | 74.4 | 74.5 |
| ASSENT | 91.5 | 91.3 | 93.7 | 93.9 | 94.2 | 94.1 |
| App 422 | 93.2 | 93.6 | 94.1 | 94.3 | 94.6 | 94.6 |

| Algorithm | 0% | 5% | 10% | 15% | 20% | 30% |
|---|---|---|---|---|---|---|
| LSSC | 83.6(1.2) | 81.4(1.5) | 80.2(3.6) | 77.5(0.6) | 75.3(0.5) | 73.8(0.7) |
| PVM | 78.3(0.8) | 73.1(1.4) | 64.3(1.3) | 62.1(0.8) | 61.5(1.3) | 60.9(0.8) |
| LGC | 85.3(0.7) | 82.7(1.2) | 81.6(0.9) | 76.3(0.4) | 73.6(0.4) | 71.6(0.2) |
| GTF | 88.4(0.9) | 85.7(1.2) | 83.1(2.5) | 80.1(0.7) | 78.6(0.6) | 75.9(0.7) |
| AELP-WL | 90.5(0.7) | 88.6(0.9) | 87.3(0.8) | 85.3(0.7) | 81.1(0.5) | 78.3(0.8) |
| SIIS | 91.5(1.1) | 87.6(1.2) | 85.4(0.7) | 82.7(0.8) | 80.9(0.9) | 79.8(0.5) |
| AutoSSL | 87.3(0.5) | 85.4(0.7) | 81.1(0.5) | 79.6(0.7) | 78.1(0.6) | 76.3(0.5) |
| ASSENT | 93.1(0.7) | 92.2(0.9) | 89.3(0.8) | 86.7(0.2) | 85.2(0.6) | 83.9(0.5) |
| App 422 | 92.6(0.7) | 90.6(0.6) | 89.6(0.5) | 87.5(0.2) | 86.4(0.6) | 85.7(0.5) |

10th Dataset
Noise Level

FIG. 16

DISTRIBUTABLE EVENT PREDICTION AND MACHINE LEARNING RECOGNITION SYSTEM

CROSS-REFERENCE TO RELATED APPLICATIONS

The present application claims the benefit of and priority based on 35 U.S.C. § 119(e) to U.S. Provisional Patent Application No. 63/049,473 filed Jul. 8, 2020, the entire contents of which are hereby incorporated by reference. The present application also claims the benefit of and priority based on 35 U.S.C. § 119(e) to U.S. Provisional Patent Application No. 62/991,973 filed Mar. 19, 2020, the entire contents of which are hereby incorporated by reference. The present application also claims the benefit of and priority based on 35 U.S.C. § 119(e) to U.S. Provisional Patent Application No. 62/990,399 filed Mar. 16, 2020, the entire contents of which are hereby incorporated by reference.

The present application is also a continuation-in-part of U.S. patent application Ser. No. 16/904,818 that was filed Jun. 18, 2020, the entire contents of which are hereby incorporated by reference. U.S. patent application Ser. No. 16/904,818 claims the benefit of and priority based on 35 U.S.C. § 119(e) to U.S. Provisional Patent Application No. 62/991,973 filed Mar. 19, 2020 and to U.S. Provisional Patent Application No. 62/990,399 filed Mar. 16, 2020.

BACKGROUND

Facilitating effective decision making requires the transformation of relevant data to high-quality classification models. Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be classified in training data to indicate occurrence or non-occurrence of the event or to recognize/classify the object. An unsupervised learning system predicts the class, target variable y, in training data by defining a model that describes hidden structure in the training data. Supervised learning requires that the target (dependent) variable y be labeled in training data so that a model can be built to predict the label of new unlabeled data. A supervised learning system discards an observation in the training data that is not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the classification (data labeling) model.

Semi-supervised learning systems have many application areas such as image analysis tasks and microarray gene expression classification where measurements require expensive machinery and labels take significant time-consuming analysis and human effort. Due to the subjective nature of manual classification, human fatigue, and the difficulty of the classification task, class labels obtained from various sources such as crowdsourcing, synthetic labeling, and data programming inevitably contain noise. However, traditional learning techniques are not particularly designed for noise reduction. As a result, the semi-supervised classification performance is reduced dramatically when the class labels are inaccurate.

Determining hyperparameters associated with the classification model to determine the best model configuration is a complex optimization problem. Though the classification model solutions are influenced by the hyperparameters, there are typically no clear default values for the hyperparameters that generate a satisfactory classification model for a wide range of applications. Not only do the input values used for the hyperparameters dictate the performance of the training process, but more importantly they influence the quality of the resulting classification models. Even with expertise in setting the hyperparameters, the best values of these hyperparameters change with different data. As a result, it is difficult to define the hyperparameter values based on previous experience. However, there is an inherent expense in training numerous candidate models to evaluate various values and combinations of values for the hyperparameters in terms of computing resources, computing time, and user time.

SUMMARY

In an example embodiment, a non-transitory computer-readable medium is provided having stored thereon computer-readable instructions that when executed by a computing device, cause the computing device to predict occurrence of an event or to classify an object using semi-supervised data to label unlabeled data in a dataset. A weight matrix is computed using a kernel function applied to a plurality of observation vectors. The plurality of observation vectors includes a plurality of unclassified observation vectors and a plurality of classified observation vectors. A target variable value is defined to represent a label for each respective observation vector of the plurality of classified observation vectors. The target variable value is not defined to represent the label for each respective observation vector of the plurality of unclassified observation vectors. A decomposition is performed to define a first decomposition matrix that includes first eigenvectors of the computed weight matrix, a second decomposition matrix that includes second eigenvectors of a transpose of the computed weight matrix, and a diagonal matrix that includes eigenvalues of the first eigenvectors. A predefined number of eigenvectors is selected from the first eigenvectors to define a reduced decomposition matrix. The predefined number of eigenvectors have largest eigenvalues relative to other of the first eigenvectors not selected. A linear transformation matrix is computed as a function of the defined first decomposition matrix, the defined reduced decomposition matrix, the defined diagonal matrix, and a predefined penalty matrix. When a rank of the computed linear transformation matrix is less than a number of rows of the predefined penalty matrix, a classification matrix is computed by updating a gradient of a cost function defined from the plurality of observation vectors based on the target variable value. When the rank of the computed linear transformation matrix is equal to the number of rows of the predefined penalty matrix, the classification matrix is computed using a dual formulation based on the computed linear transformation matrix. The target variable value is determined for each observation vector of the plurality of unclassified observation vectors based on the computed classification matrix. The target variable value is output for each observation vector of the plurality of unclassified observation vectors. The target variable value selected for each observation vector of the plurality of unclassified observation vectors is defined to represent the label for a respective unclassified observation vector.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to predict occurrence of an event or to classify an object using semi-supervised data to label unlabeled data in a dataset.

In yet another example embodiment, a method of predicting occurrence of an event or of classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 12A and 12B show classification accuracy tables computed using thirteen different algorithms with seven datasets including the five datasets of FIGS. 11A through 11E in accordance with an illustrative embodiment.

FIG. 15 shows a classification accuracy computed using five of the nine different algorithms with a 30% noise level and the eighth dataset of FIG. 13 for six different numbers of clusters in accordance with an illustrative embodiment.

FIG. 16 shows a classification accuracy table computed using the nine different algorithms of FIG. 13 with a tenth dataset with different levels of noisy labels in accordance with an illustrative embodiment.

DETAILED DESCRIPTION

Figure 1:
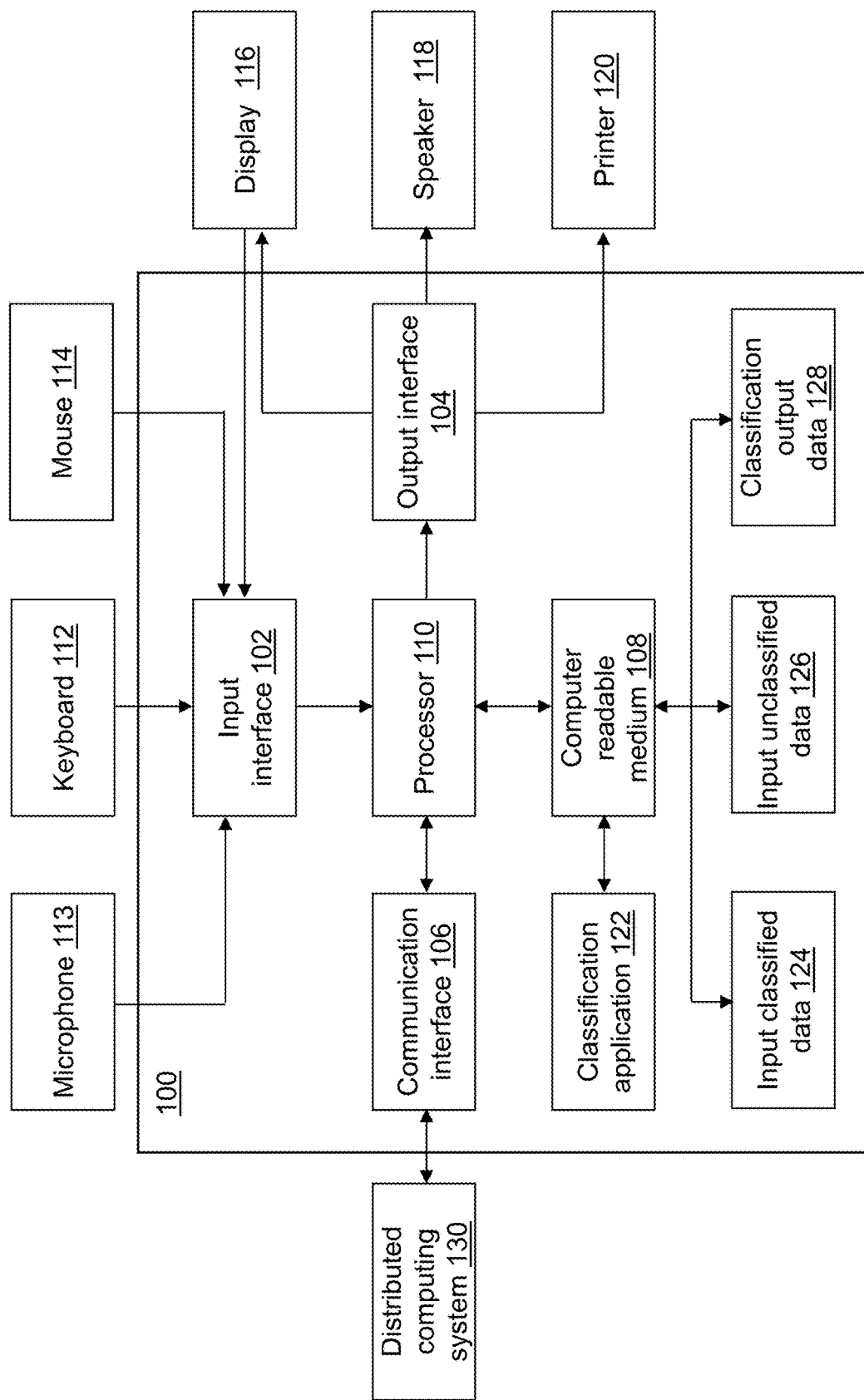
FIG. 1 depicts a block diagram of a classification device in accordance with an illustrative embodiment.

A classification application 122 more accurately classifies unclassified observation vectors using a relatively small number of classified observation vectors that may be noisy in comparison with previous methods such as the method described in Lu et al., *Noise-Robust Semi-Supervised Learning by Large-Scale Sparse Coding*, AAAI Conference on Artificial Intelligence (2015). Noisy labels indicate that some of the human classified observation vectors have been classified incorrectly. Existing classification methods are not designed to work effectively when some of the classified observation vectors have been classified incorrectly. These methods assume that the classifications provided as input are correct as a basis for training the method to classify unclassified observation vectors.

The incorrect classifications have various causes including poorly trained, careless, tired, or irresponsible human classifiers. In some cases, even well-trained expert human classifiers can make mistakes when classifying data. For example, a trained radiologist may miss a cancer indicator that is present in an image thus incorrectly classifying the image as non-cancerous. As another example, it is often challenging to distinguish images such as classifying an image as including a wolf or a dog such as a German shepherd.

In many datasets, such as video datasets, the labels for video frames contain a certain temporal structure and it is desirable to incorporate temporal continuity as important structural information into the classification process. Gene microarray data also includes structural information in the dataset, where adjacent samples tend to share similar labels. Through elastic net regularization and use of the correlation between variables and the rich structural information in the labels, classification application 122 and/or a classification model tuning application 422 (shown referring to FIG. 4) achieve a higher classification accuracy on unclassified data as shown in FIGS. 11A through 11E, 12A, 12B, and 13 through 16.

The major contributions and desirable properties of classification application 122 and/or a classification model tuning application 422 include increased efficiency, the capability to automate hyperparameter selection, improved accuracy, and scalability based on application in a distributed computing system. By minimizing a total graph loss for semi-supervised learning, classification application 122 and/or a classification model tuning application 422 can further overcome the difficulty of hyperparameter selections in the process of obtaining optimal solutions. Classification application 122 and/or a classification model tuning application 422 can further exploit distributed computing resources for scalability to big data. In addition, classification application 122 and/or a classification model tuning application 422 have a linear time and space complexity with respect to the number of observations, which further enhances the scalability to large datasets. There are applications for classification application 122 in many areas such as process control and equipment health monitoring, image processing and classification, data segmentation, data analysis, etc.

Referring to FIG. 1, a block diagram of a classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, and classification output data 128. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116. The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth antenna, a telephone jack, a USB port, etc. Data and/or messages may be transferred between classification device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables or features. In an alternative embodiment, input classified data 124 and input unclassified data 126 may be transposed. The plurality of variables define a vector $x_i$ for each observation vector i=1, 2, . . . , N, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for i=1, 2, . . . , l, where l is a number of the observation vectors included in input classified data 124.

Input classified data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

Input unclassified data 126 includes observation vectors $x_i$ that have not been labeled such that the $y_i$ value has not been determined though a value such as zero may be included in a column associated with the $y_i$ values. Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefor, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition or some other physical characteristic. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated.

Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 130 and accessed by classification device 100 using communication interface 106, input interface 102, and/or output interface 104. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 130. Classification device 100 may coordinate access to input classified data 124 and input unclassified data 126 that is distributed across distributed computing system 130 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
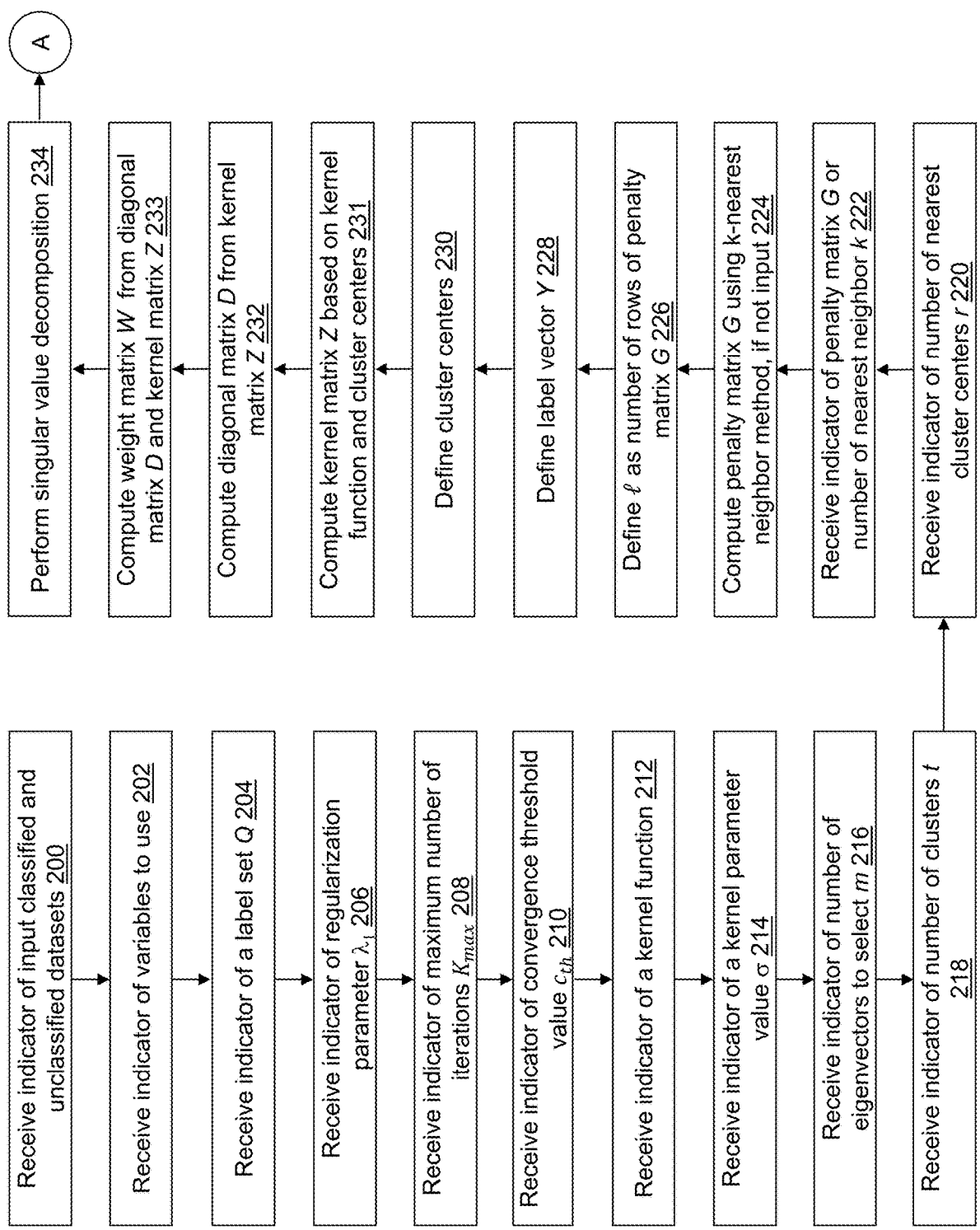
FIGS. 2A, 2B, and 2C depict a flow diagram illustrating examples of operations performed by a classification application of the classification device of FIG. 1 in accordance with an illustrative embodiment.
Figure 2B:
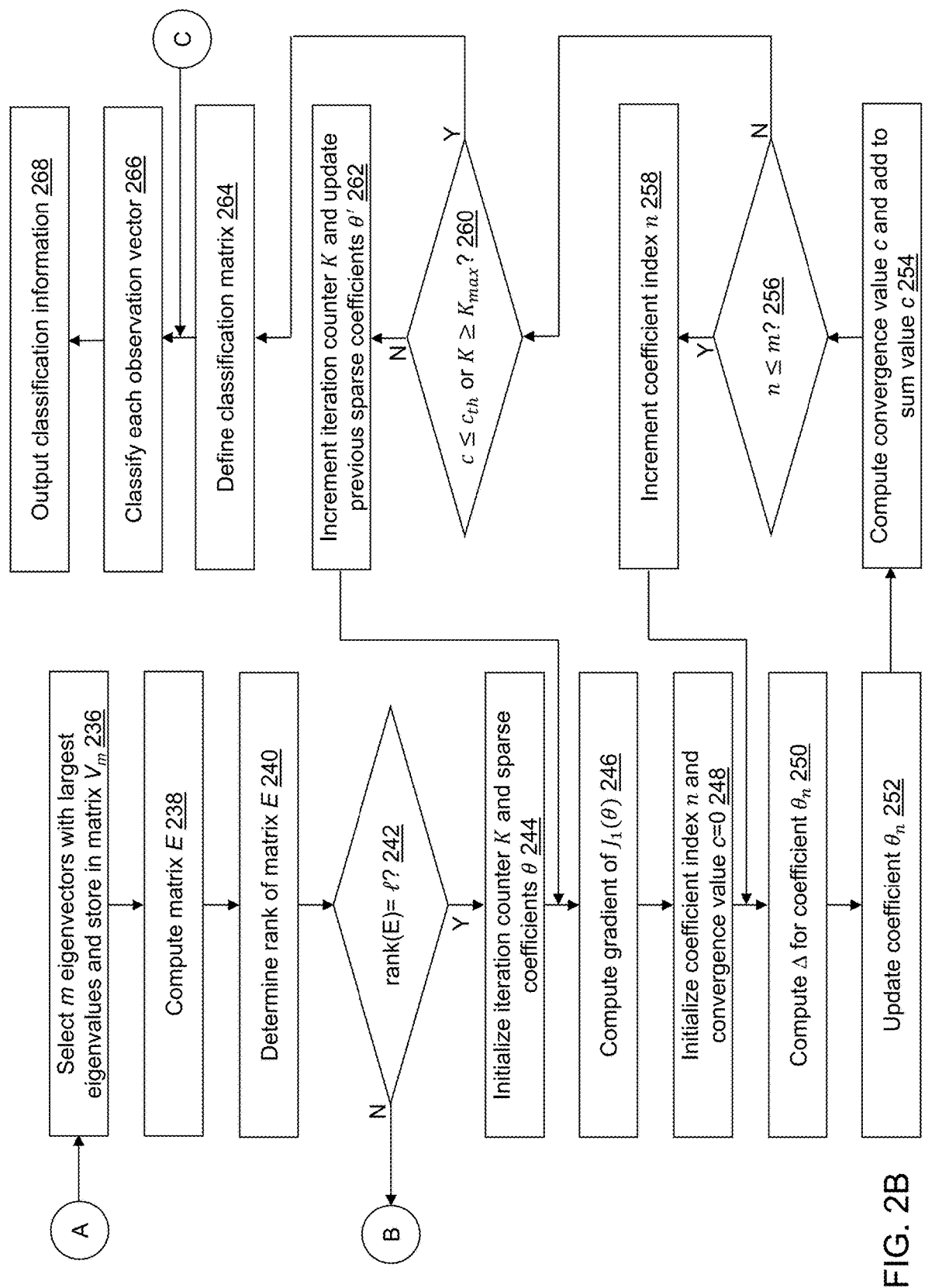
Figure 2C:
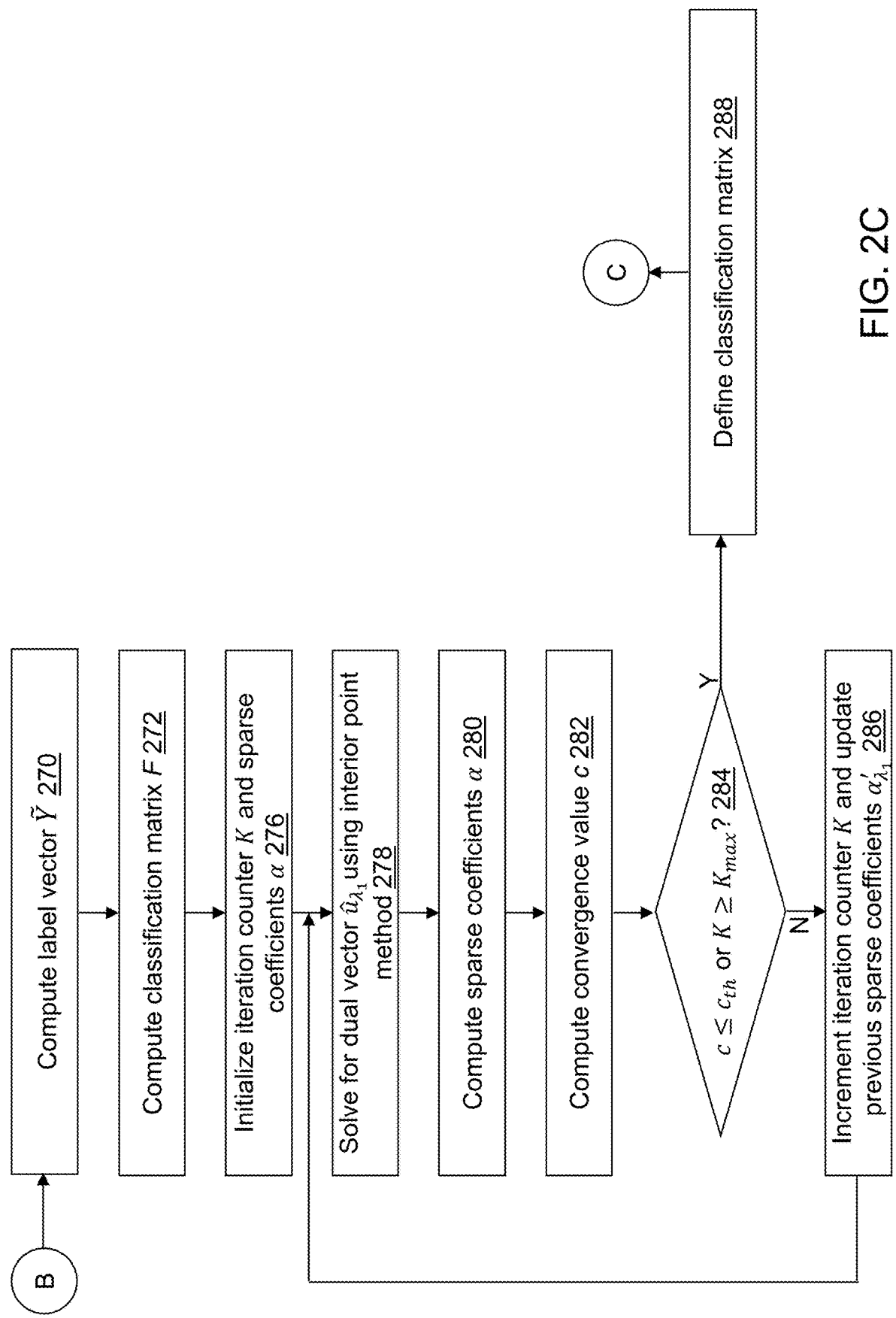

Referring to FIGS. 2A, 2B, and 2C, example operations associated with classification application 122 are described when input classified data 124 and input unclassified data 126 are stored on classification device 100 and accessed by a single thread of classification device 100. Additional, fewer, or different operations may be performed depending on the embodiment of classification application 122. The order of presentation of the operations of FIGS. 2A, 2B, and 2C is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122 or predefined by classification application 122.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$. A number of the plurality of variables may be indicated by N. The second indicator may further indicate a column number or a column name that stores the value for $y_i$ in input classified data 124 and/or input unclassified data 126. As another option, the first or the last column may be assumed to include the value for $y_i$.

In an operation 204, a third indicator may be received that indicates a label set Q associated with input classified data 124 and input unclassified data 126. For example, the label set Q includes a list of permissible values that the $y_i$-variable (target) value of each observation vector $x_i$ may have. For illustration, if input classified data 124 and input unclassified data 126 include text images of numeric digits, the label set Q includes c=10 permissible values that may be indicated as Q={1, ..., c} where Q=1 may be associated with the digit "0", Q=2 may be associated with the digit "1", Q=3 may be associated with the digit "2", ..., Q=10 may be associated with the digit "9". c is a number of classes in label set Q. No $y_i$-variable (target) value or a variable value of zero may indicate that the associated observation vector $x_i$ is not classified when input classified data 124 and input unclassified data 126 are stored together in memory or in a single dataset. The label set Q further may be a binary indicator that indicates the existence or non-existence of a characteristic of each observation vector. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified.

When input classified data 124 and input unclassified data 126 are stored together in memory or in a single dataset, input classified data 124 may be extracted. Input classified data 124 and input unclassified data 126 together define a point set $\chi=\{x_1, \ldots, x_l, x_{l+1}, \ldots, x_N\}$, where N indicates a total number of data points or observation vectors $x_i$, where the observation vectors $x_i$ (i≤l) are labeled such that $y_i \in Q$, and the remaining observation vectors $x_i$ (l<i≤N) are unlabeled such that $y_i \notin Q$. Thus, l indicates a number of classified data points or observation vectors $x_i$ included in input classified data 124. For illustration, l may be a small percentage, such as less than 1% of the total number of observation vectors N.

In an operation 206, a fourth indicator of a first regularization parameter value $\lambda_1$ may be received. In an alternative embodiment, the fourth indicator may not be received. For example, a default value may be stored, for example, in computer-readable medium 108 and used automatically. In another alternative embodiment, the value of the first regularization parameter $\lambda_1$ may not be selectable. Instead, a fixed, predefined value may be used. For illustration, a default value of the first regularization parameter $\lambda_1$ may be 0.7 though other values may be used.

In an operation 208, a fifth indicator of a maximum number of iterations $K_{max}$ may be received. In an alternative embodiment, the fifth indicator may not be received. For example, a default value may be stored, for example, in computer-readable medium 108 and used automatically. In another alternative embodiment, the value of the maximum number of iterations $K_{max}$ may not be selectable. Instead, a fixed, predefined value may be used. For illustration, a default value of the maximum number of iterations $K_{max}$ may be 100 though other values may be used.

In an operation 210, a sixth indicator of a convergence threshold value $c_{th}$ may be received. In an alternative embodiment, the sixth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01 though other values may be used.

In an operation 212, a seventh indicator of a kernel function may be received. For example, the seventh indicator indicates a name of a kernel function. The seventh indicator may be received by classification application 122 after selection from a user interface window or after entry by a user into a user interface window. A default value for the kernel function may further be stored, for example, in computer-readable medium 108. As an example, a kernel function may be selected from "Gaussian", "Exponential", "Linear", "Polynomial", "Sigmoid", "Radial Basis", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification application 122. For example, the Gaussian kernel function may be used by default or without allowing a selection. The Gaussian kernel function may be defined as:

$$\exp\frac{-\|x_i - x_j\|^2}{2\sigma^2}$$

where σ is a kernel parameter that is termed a Gaussian bandwidth parameter.

In an operation 214, an eighth indicator of a kernel parameter value to use with the kernel function may be received. For example, a value for σ, the Gaussian bandwidth parameter, may be received for the Gaussian kernel function. In an alternative embodiment, the eighth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used.

In an operation 216, a ninth indicator of a number of eigenvectors to select m may be received. In an alternative embodiment, the number of eigenvectors to select m may not be received. For example, a default value for the number of eigenvectors to select m may be stored, for example, in computer-readable medium 108 and used automatically. In another alternative embodiment, the value of the number of eigenvectors to select m may not be selectable. Instead, a fixed, predefined value may be used.

In an operation 218, a tenth indicator of a number of clusters t may be received. In an alternative embodiment, the number of clusters t may not be received. For example, a default value for the number of clusters t may be stored, for example, in computer-readable medium 108 and used automatically. In another alternative embodiment, the value of the number of clusters t may not be selectable. Instead, a fixed, predefined value may be used.

In an operation 220, an eleventh indicator of a number of nearest cluster centers r may be received. In an alternative embodiment, the number of nearest cluster centers r may not be received. For example, a default value for the number of nearest cluster centers r may be stored, for example, in computer-readable medium 108 and used automatically. In another alternative embodiment, the value of the number of nearest cluster centers r may not be selectable. Instead, a fixed, predefined value may be used.

In an operation 222, a twelfth indicator of a penalty matrix G may be received. In an alternative embodiment, the penalty matrix G may not be received. For example, a default matrix for the penalty matrix G may be stored, for example, in computer-readable medium 108 and used automatically. In another alternative embodiment, the penalty matrix G may not be selectable. Instead, a fixed, predefined matrix may be used. In another alternative embodiment, the penalty matrix G may be read from a file or other memory location indicated by the twelfth indicator. In another alternative embodiment, the twelfth indicator may indicate a value of a number of nearest neighbor k instead of the penalty matrix G. The number of nearest neighbor k indicates a request to compute penalty matrix G using the value of the number of nearest neighbor k.

In an operation 224, the penalty matrix G is computed using a k-nearest neighbor algorithm, input classified data 124 and input unclassified data 126, and the value of the number of nearest neighbor k when the penalty matrix G was not indicated in operation 222. For example, if a $j^{th}$ observation vector is one of the k nearest neighbor of an $i^{th}$ observation vector, $G(i,j)=-1$; otherwise, $G(i,j)=0$, $i=1, 2, \ldots, N$, $j=1, 2, \ldots, N$, $i \neq j$. $G(i,i)=1$, $i=1, 2, \ldots, N$.

In an operation 226, a value for l is defined as a number of rows of penalty matrix G.

In an operation 228, a label vector Y is defined from input classified data 124 and input unclassified data 126. $Y_i=b$ if $x_i$ is labeled as $y_i=b$. Otherwise, $Y_i=0$. As another option for binary data, $Y_i=1$ if $y_i$ indicates true; $Y_i=-1$ if $y_i$ indicates false; otherwise, $Y_i=0$.

In operation 230, t cluster centers $\{u_1, u_2, \ldots, u_t\}$ are defined by executing a k-means clustering algorithm with input classified data 124 and input unclassified data 126. In alternative embodiments, different clustering algorithms may be used to define the t cluster centers.

In an operation 231, a kernel matrix Z is computed using the t cluster centers, the kernel function, the kernel parameter value σ, and the number of nearest cluster centers r. For example, using the Gaussian kernel function, the kernel matrix Z is computed using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2\sigma^2}\right)}, i = 1, 2, \ldots, N \text{ and } j = 1, 2, \ldots, t,$$

where $N_r(i)$ is an index to a nearest cluster center to $x_i$ of the number of nearest cluster centers r, $x_i$ is an $i^{th}$ observation vector selected from input classified data 124 and input unclassified data 126, $u_j$ is a $j^{th}$ cluster center selected from the t cluster centers $\{u_1, u_2, \ldots, u_t\}$, and matrix Z is an N×t matrix.

In an operation 232, a diagonal matrix D is computed from the kernel matrix Z. For example, the diagonal matrix D is a t×t matrix and is defined $$D_{jj} = \sum_{i=1}^{N} z_{ij}, j = 1, 2, \ldots, t \text{ and } D_{ij} = 0 \text{ if } i \neq j.$$

In an operation 233, a weight matrix W is computed using diagonal matrix D and the kernel matrix Z as $W=\hat{Z}\hat{Z}^T=ZD^{-0.5}D^{-0.5}Z^T$, where $W=\hat{Z}\hat{Z}^T$, and T indicates a transpose.

In an operation 234, a singular value decomposition of $\hat{Z}$ is applied to $\hat{Z}=V\Sigma U^T$ where each column of U is an eigenvector of the transpose of the weight matrix W or $\hat{Z}^T\hat{Z}$, each column of V is an eigenvector of the weight matrix W, and Σ is a diagonal matrix whose diagonal entries are the eigenvalues of the weight matrix W. Referring to FIG. 2B, processing continues in an operation 236.

In operation 236, m eigenvectors having the largest eigenvalues of the weight matrix W are selected and stored in a matrix $V_m$ defined as $$V_m = \hat{Z} U_m \sum_m^{-1},$$

where $V_m$ is an N×m matrix.

In an operation 238, a linear transformation matrix E is computed using $E=G\Sigma^{0.5}V^T V_m$, where linear transformation matrix E has dimension l×N.

In an operation 240, a rank of linear transformation matrix E is determined.

An optimization is applied to define a classification matrix F using $F=V_m\alpha$, where α is a plurality of sparse coefficients also referred to as a sparse coefficients vector, where the plurality of sparse coefficients includes a coefficient value defined for each of the m eigenvectors. To promote a sparsity of the variables after a linear transformation, the optimization problem can be solved using generalized Lasso as follows:

$$J(f)=0.5\|F-Y\|_2^2+\lambda_1\|G\Sigma^{0.5}V^T F\|_1.$$

The choice of the transformation represents a desired property of the variables and may depend on the application. With substitution, $$J(\alpha)=0.5\|V_m\alpha-Y\|_2^2+\lambda_1\|G\Sigma^{0.5}V^T V_m\alpha\|_1=0.5\|V_m\alpha-Y\|_2^2+\lambda_1\|E\alpha\|_1.$$

When E is invertible, by defining $\theta=E\alpha$ and substituting $\alpha=E^{-1}\theta$, the optimization problem can be formulated as a traditional sparse coding problem. When l<m and rank(E)=l, $\tilde{E}=[E,A]^T$ is defined, where rank($\tilde{E}$)=m. By finding a (m-l)×m matrix A whose rows are orthogonal to those in E, the variables are augmented to define $\tilde{\theta}^{m\times 1}=[\theta^{l\times 1}, \theta_2^{(m-l)\times 1}]=\tilde{\Sigma}\alpha$ resulting in $$\arg\min_{\tilde{\theta}\in R^m} J(\tilde{\theta}) = 0.5\|Y - V_m\tilde{E}^{-1}\tilde{\theta}\|_2^2 + \lambda_1\|\theta\|_1$$

which is close to the standard Lasso form except that the $L_1$ penalty only consists of part of the coefficient vector. By rearranging, $V_m \tilde{E}^{-1}=[V_1,V_2]$ and given $V_m \tilde{\Sigma}^{-1} \tilde{\theta}=V_1\theta+V_2\theta_2$, $\theta_2=(V_2^T V_2)^{-1} V_2^T(Y-V_1\theta)$ can be solved using linear regression. Setting $P=V_2^T(V_2^T V_2)^{-1} V_2$ as the projection onto the column space of $V_2$, $$\underset{\theta \in R^\ell}{\text{argmin}}\, J(\theta) = 0.5\|(I-P)Y - (I-P)V_1\theta\|_2^2 + \lambda_1\|\theta\|_1$$

where I is an identity matrix, which can be used to compute an optimum value for $\theta$ as described further below to define the classification matrix such that $F=V_m \alpha = V_m \tilde{\Sigma}^{-1}\theta_{op}$, where $\theta_{op}$ is the optimum value computed for $\theta$.

When rank(E)<l, $V_m$ is a full rank matrix. The optimization problem is instead solved by first deriving its dual. Let $z=E\alpha$, resulting in $$\arg \min_{\alpha \in R^m, z \in R^\ell} J(\alpha, z) = 0.5\|V_m\alpha - Y\|_2^2 + \lambda_1\|z\|_1$$

The LaGrangian can be expressed as:

$$L(\alpha,u,z)=0.5\|V_m\alpha-Y\|_2^2+\lambda_1\|z\|_1+u^T(E\alpha-z)$$

To derive the dual formulation, $L(\alpha,u,z)$ is minimized over $\alpha$ and z.

$$\min_\alpha 0.5\|V_m\alpha - Y\|_2^2 + u^T(E\alpha - z) = 0.5\|\tilde{Y} - F^T u\|_2^2,$$

where $\tilde{Y}=V_m(V_m^T V_m)^{-1} V_m^T Y$, $F=E(V_m^T V_m)^{-1} V_m^T$, and $$\min_z \lambda_1\|z\|_1 - u^T z = \begin{cases} 0, & \text{if } \|u\|_\infty \leq \lambda_1 \\ -\infty, & \text{otherwise} \end{cases}$$

Thus, the dual form can be represented as $$\underset{u \in R^\ell}{\text{argmin}}\, T(u) = 0.5\|\tilde{Y} - F^T u\|_2^2$$

subject to $\|u\|_\infty \leq \lambda_1$. The solution of the dual is not unique as it is not strictly convex. The primal problem is strictly convex and a unique solution is guaranteed. Therefore, strong duality holds. The Karush-Kuhn-Tucker (KKT) optimality conditions for the dual problems are $FF^T\hat{u}_\lambda - F\tilde{Y} + \zeta\gamma=0$, where $\hat{u}_\lambda$, $\zeta$, and $\gamma$ are subject to the following constraints: $\gamma^T\hat{u}_\lambda=\|\hat{u}_\lambda\|_\infty \leq \lambda_1$, $\zeta \geq 0$, $\zeta(\lambda\hat{u}_\lambda\|_\infty - \lambda_1)=0$, and $\|\gamma\|_1 \leq 1$, where $\zeta$ is a subgradient of the function $\|x\|_\infty$ evaluated at $x=\hat{u}_\lambda$. The above KKT conditions are a necessary and sufficient condition for $\hat{u}_\lambda$ to be the solution of the dual problem.

For each $i^{th}$ element of the 1 dimensional vector $$u, \hat{u}_{\lambda_1, i} = \begin{cases} \lambda_1, & \text{if } (F\alpha_{\lambda_1})_i > 0 \\ -\lambda_1, & \text{if } (F\alpha_{\lambda_1})_i < 0, \; i=1,\ldots,\ell \\ [-\lambda_1, \lambda_1], & \text{if } (F\alpha_{\lambda_1})_i = 0 \end{cases}$$

An interior point method, such as that described in a Chapter 11 of a book by Stephen Boyd and Lieven Vandenberghe titled *Convex Optimization* and published by the Cambridge University Press (2004), can be applied to compute $\hat{u}_\lambda$. Therefore, when rank(E)<l, the following is minimized $$J(\alpha)=0.5\|V_m\alpha-Y\|_2^2+\lambda_1\|E\alpha\|_1.$$

In an operation 242, a determination is made concerning whether rank(E)=l. When rank(E)=l, processing continues in an operation 244. When rank(E)<l, processing continues in an operation 270 shown referring to FIG. 2C.

In an operation 244, the vector $\theta$ is initialized, for example, to zero values, where $\theta$ is an m×1 vector, a previous vector $\theta'$ is initialized using $\theta'=\theta$, where $\theta'$=is an m×1 vector, and an iteration counter K is initialized, for example, as K=1.

In operation 246, a gradient of $J(\theta)$ is computed with respect to $\theta$. For example, the gradient of $J(\theta)$ is computed as $$\nabla_\theta J_1(\theta)=((I-P)V_1)^T((I-P)Y-(I-P)V_1\theta),$$

where I is the identity matrix having dimension (m–l)×(m–l), $P=V_2^T(V_2^T V_2)^{-1} V_2$, and T indicates a transpose. To compute $V_1$ and $V_2$, $\tilde{E}=[E,A]^T$ is defined, where rank($\tilde{E}$)=m, and an (m–l)×m matrix A is found whose rows are orthogonal to those in E, $V_m \tilde{E}^{-1}=[V_1,V_2]$. $V_1$ has dimension N×l, and $V_2$ has dimension N×(m–l). $V_1$ and $V_2$ are determined by rearranging the coefficient matrix computed as $V_m \tilde{E}^{-1}$.

In an operation 248, a coefficient index n is initialized, for example, as n=1, and a convergence value c is initialized, for example, as c=0.

In an operation 250, a difference value $\Delta_n$ is computed for coefficient $\theta_n$ using $$\Delta_n = \theta_n - \frac{\nabla_{\theta_n} J_1(\theta)}{\|(I-P)V_1\|_s},$$

where $\|(I-P)V_1\|_s$ is a spectral norm of the matrix $(I-P)V_1$, and I is the identity matrix.

In operation 252, $\theta_n$ is updated, for example, using $$\theta_n = \max\left\{|\Delta_n| - \frac{\lambda_1}{\|(I-P)V_1\|_s}, 0\right\},$$

where I is the identity matrix.

In operation 254, a convergence value c is computed, for example, using $c=c+\theta_n-\theta'_n$. The convergence value c is a sum of a difference between the current $\theta_n$ and the previous $\theta'_n$ for each coefficient.

In an operation 256, a determination is made concerning whether there is another coefficient to update, for example, using n≤m. When n≤m, processing continues in an operation 258. When n>m, processing continues in an operation 260.

In operation 258, the coefficient index n is incremented, for example, as n=n+1, and processing continues in operation 250 to process the next coefficient.

In operation 260, a determination is made concerning whether convergence has been achieved or the maximum number of iterations have been performed. When c≤$c_{th}$ or K≥$K_{max}$, processing continues in an operation 262. When c>$c_{th}$ and K<$K_{max}$, processing continues in an operation 264.

In operation 262, the iteration counter K is incremented, for example, as K=K+1, the previous vector θ' is updated using θ'=θ, and processing continues in operation 246.

In operation 264, the classification matrix F is defined using F=$V_m \tilde{E}^{-1} \theta$, where classification matrix F is an N×1 vector for a binary label set or an N×c matrix for a label set having c classes.

In an operation 266, each of the unclassified observation vectors in input unclassified data 126 is classified and updated in label vector Y. For example, for a binary label set, if $F_i$>0, the $y_i$-variable (target) value or class of the $i^{th}$ observation vector of input unclassified data 126 is predicted to be 1; whereas, if $F_i$≤0, the $y_i$-variable (target) value or class of the $i^{th}$ observation vector of input unclassified data 126 is predicted to be −1. For a label set having c classes, $y_i$ is selected for each observation vector $x_i$ based on $$y_i = \operatorname*{argmax}_{j \leq c} F_{ij}.$$

As a result, a label with a highest classification value as indicated by $$\operatorname*{argmax}_{j \leq c} F_{ij}$$

is selected as the $y_i$-variable (target) value or class for the $i^{th}$ observation vector $x_i$ of input unclassified data 126. The classification or label for each observation vector $x_i$ of input unclassified data 126 may be extracted from label set Q using the value of $y_i$ as an index into label set Q, and label vector Y may be updated with these values.

In an operation 268, the class or label identified for each observation vector $x_i$ included in input unclassified data 126 may be stored in classification output data 128 possibly with the respective observation vector $x_i$.

Referring to FIG. 2C, in operation 270, the estimated label vector $\hat{Y}$ is computed, for example, using $\hat{Y} = V_m(V_m^T V_m)^{-1} V_m^T Y$.

In an operation 272, an initial classification matrix F is computed, for example, using F=$E(V_m^T V_m)^{-1} V_m^T$.

In an operation 276, a sparse coefficients vector $\alpha_{\lambda_1}$ is initialized, for example, to zero values, where $\alpha_{\lambda_1}$ is an m×1 vector, a previous sparse coefficients vector $\alpha'_{\lambda_1}$ is initialized using $\alpha'_{\lambda_1} = \alpha_{\lambda_1}$, where $\alpha'_{\lambda_1}$ is an m×1 vector, and an iteration counter K is initialized, for example, as K=1.

In an operation 278, an interior point method can be applied to compute the dual vector $\hat{u}_\lambda$ subject to $$\hat{u}_{\lambda_1, i} = \begin{cases} \lambda_1, & \text{if } (F a_{\lambda_1})_i > 0 \\ -\lambda_1, & \text{if } (F a_{\lambda_1})_i < 0, i = 1, \dots, \ell. \\ [-\lambda_1, \lambda_1], & \text{if } (F a_{\lambda_1})_i = 0 \end{cases}$$

In an operation 280, the sparse coefficients vector α is computed, for example, using $\alpha_{\lambda_1} = (V_m^T V_m)^{-1} V_m^T (\hat{Y} - F^T \hat{u}_{\lambda_1})$.

In an operation 282, a convergence value c is computed, for example, using c=$|\alpha_{\lambda_1} - \alpha'_{\lambda_1}|$, where | | indicates an absolute value of $\alpha_{\lambda_1} - \alpha'_{\lambda_1}$.

In an operation 284, a determination is made concerning whether convergence has been achieved or the maximum number of iterations have been performed. When c≤$c_{th}$ or K≥$K_{max}$, processing continues in an operation 288. When c>$c_{th}$ and K<$K_{max}$, processing continues in an operation 286.

In operation 286, the iteration counter K is incremented, for example, as K=K+1, the previous sparse coefficients vector $\alpha'_{\lambda_1}$ is updated using $\alpha'_{\lambda_1} = \alpha_{\lambda_1}$, and processing continues in operation 278.

In operation 288, the classification matrix F is defined using F=$V_m \alpha_{\lambda_1}$, where classification matrix F is an N×1 vector for a binary label set or an N×c matrix for a label set having c classes. Processing continue in operation 266 shown referring to FIG. 2B.

Figure 3:
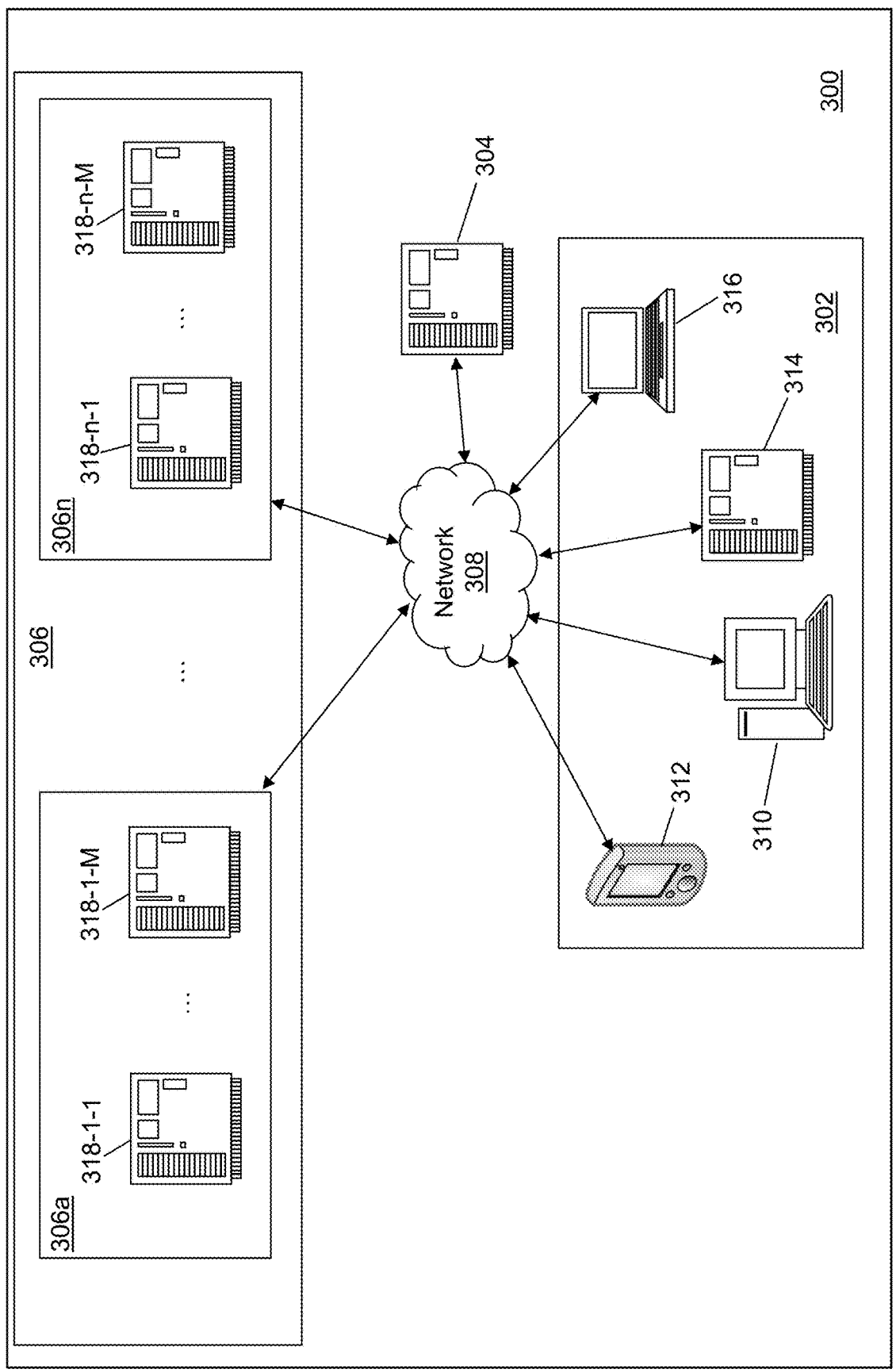
FIG. 3 depicts a block diagram of a classification system in accordance with an illustrative embodiment.

Referring to FIG. 3, a block diagram of a distributed classification system 300 is shown in accordance with an illustrative embodiment. Distributed classification system 300 provides an automated, distributed active machine learning system that jointly minimizes a loss value allowing users to select hyperparameters such as σ, m, $\lambda_1$, k, t, and/or r automatically.

In an illustrative embodiment, distributed classification system 300 may include a user system 302, a selection manager device 304, a worker system 306, and a network 308. Each of user system 302, selection manager device 304, and worker system 306 may be composed of one or more discrete computing devices in communication through network 308. Alternatively, user system 302, selection manager device 304, and worker system 306 may be integrated into a single computing device capable of computing using a plurality of different threads.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more RAM than another computer form factor and support multi-threading as understood by a person of skill in the art. The computing devices of user system 302 may send and receive signals through network 308 to/from another of the one or more computing devices of user system 302 and/or to/from selection manager device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
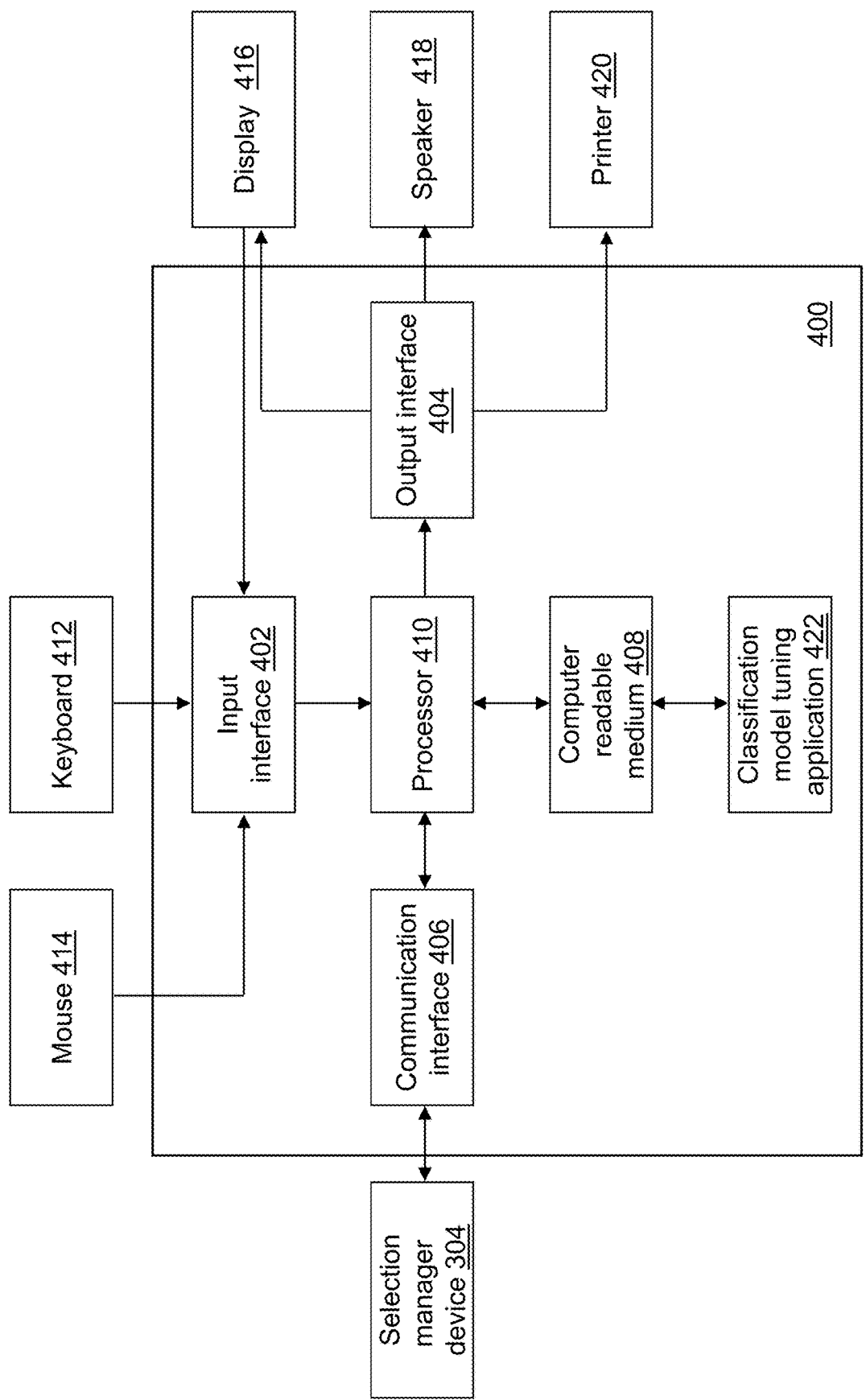
FIG. 4 depicts a block diagram of a user device of the classification system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, and a classification model tuning application 422. Each computing device of user system 302 may be executing classification model tuning application 422 of the same or different type.

Referring again to FIG. 3, selection manager device 304 can include any form factor of computing device. For illustration, FIG. 3 represents selection manager device 304 as a server computer. Selection manager device 304 may send and receive signals through network 308 to/from user system 302 and/or to/from worker system 306. Selection manager device 304 may communicate using various transmission media that may be wired and/or wireless as understood by those skilled in the art. Selection manager device 304 may be implemented on a plurality of computing devices of the same or different type. Distributed classification system 300 further may include a plurality of selection manager devices.

Figure 5:
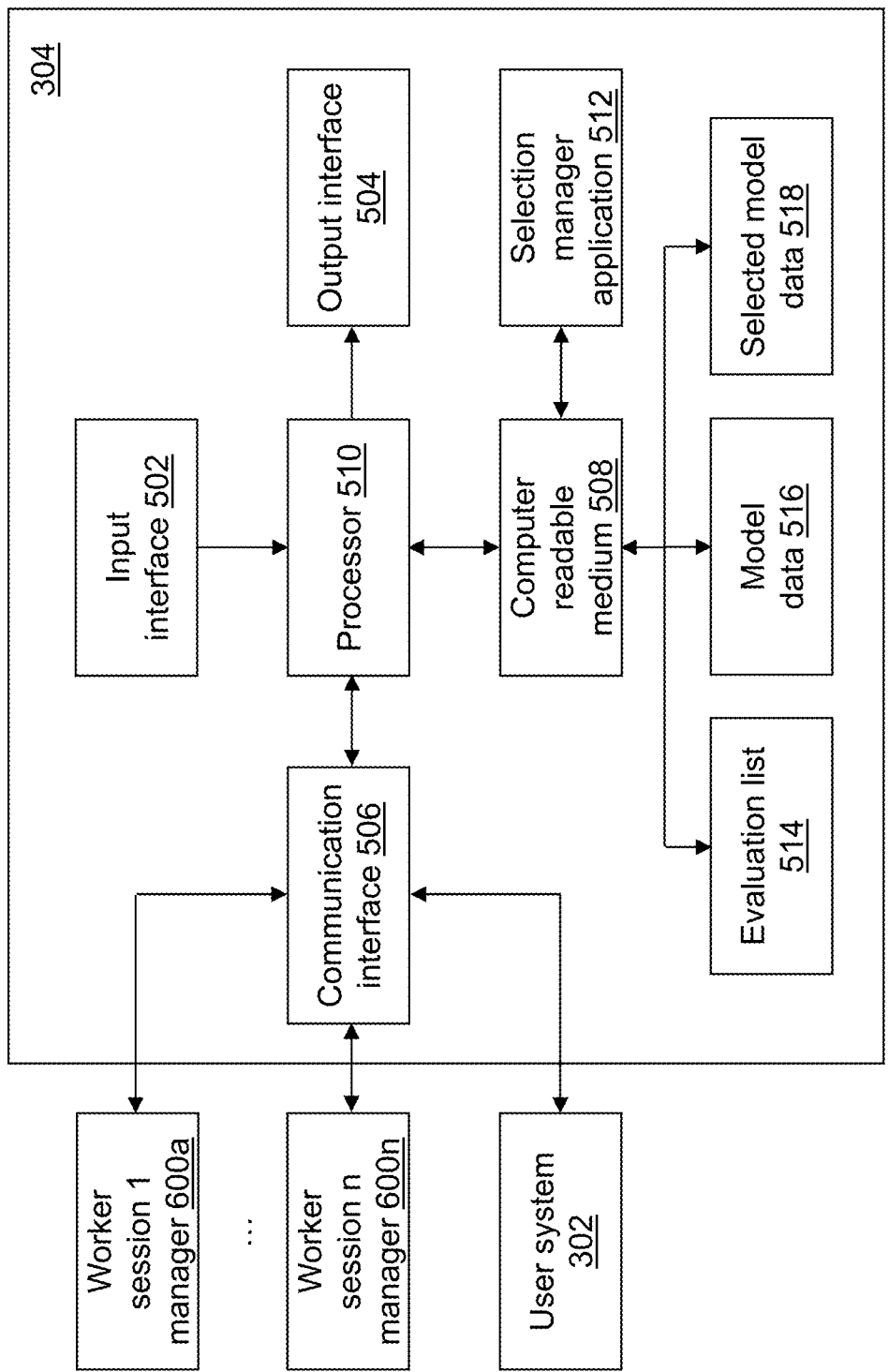
FIG. 5 depicts a block diagram of a selection manager device of the classification system of FIG. 3 in accordance with an illustrative embodiment.

For illustration, referring to FIG. 5, a block diagram of selection manager device 304 is shown in accordance with an illustrative embodiment. Selection manager device 304 may include a third input interface 502, a third output interface 504, a third communication interface 506, a third computer-readable medium 508, a third processor 510, a selection manager application 512, an evaluation list 514, model data 516, and selected model data 518. Evaluation list 514, model data 516, and selected model data 518 are created from results generated by worker system 306. Evaluation list 514 allows the hyperparameter tuning process to remain efficient by only evaluating "close" points once. Evaluation list 514 may be stored in memory using various data structures such as a list, an array, a tree, etc. For example, evaluation list 514 may be stored as a splay tree so that the points that are most recently added are near the root of the tree for faster searching.

Referring again to FIG. 3, the one or more computing devices of worker system 306 may include computers of any form factor that may be organized into one or more sessions, where a number of the one or more sessions is indicated by $N_s$. Worker system 306 may include a number of computing devices indicated by $N_w$. Worker system 306 may include computers of other form factors such as a desktop or a laptop, etc. Worker system 306 can include any number and any combination of form factors of computing devices organized into any number of sessions. For example, in the illustrative embodiment, worker system 306 includes a first worker session 306a, ..., and an $N_s^{th}$ worker session 306n. Each session may include one or more computing devices, where a number of session computing devices in each session is indicated by M. In the illustrative embodiment, first worker session 306a may include a first computing device 318-1-1, ..., and an $M^{th}$ computing device 318-1-M, and $N_s^{th}$ worker session 306n may include a first computing device 318-n-1, ..., and an $M^{th}$ computing device 318-n-M. The number of computing devices indicated by $N_w$ may or may not also include selection manager device 304. A number of threads may be associated with each computing device of worker system 306.

The computing devices of worker system 306 may send and receive signals through network 308 to/from selection manager device 304 and/or to/from user system 302 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6A:
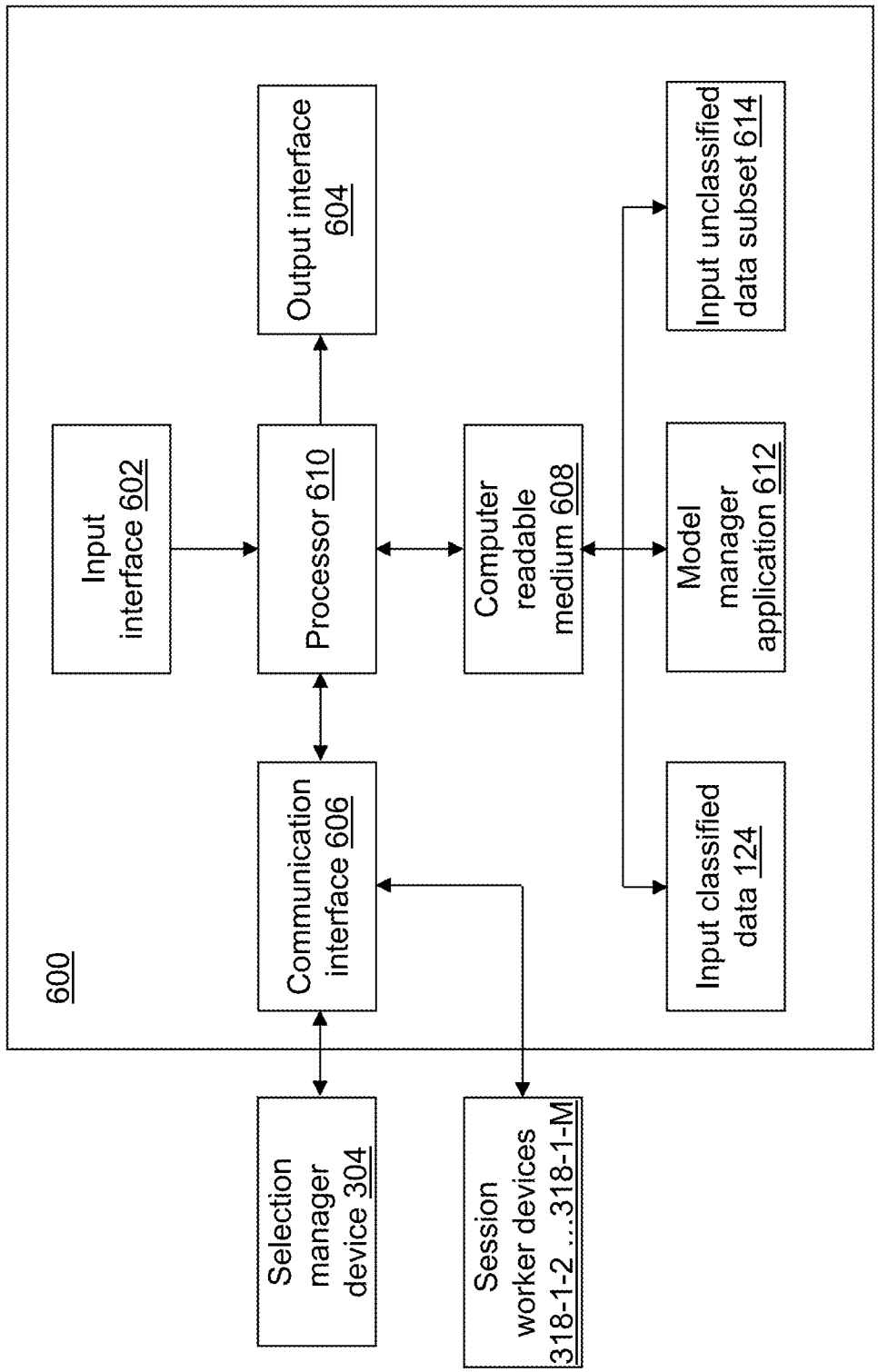
FIG. 6A depicts a block diagram of a session manager device of the classification system of FIG. 3 in accordance with an illustrative embodiment.

For illustration, referring to FIG. 6A, a block diagram of a session manager device 600 is shown in accordance with an example embodiment. Session manager device 600 is an example computing device selected from each session of worker system 306. For example, a first computing device of each session, such as first computing device 318-1-1 of first worker session 306a and first computing device 318-n-1 of $N_s^{th}$ worker session 306n may be an instance of session manager device 600. In the illustrative embodiment of FIG. 6A, session manager device 600 is the session manager device for first worker session 306a and may be referred to as first computing device 318-1-1 that communicates with second computing device 318-1-2, ..., and $M^{th}$ computing device 318-1-M. Session manager device 600 may include a fourth input interface 602, a fourth output interface 604, a fourth communication interface 606, a fourth computer-readable medium 608, a fourth processor 610, a model manager application 612, input classified data 124, an input unclassified data subset 614.

Figure 6B:
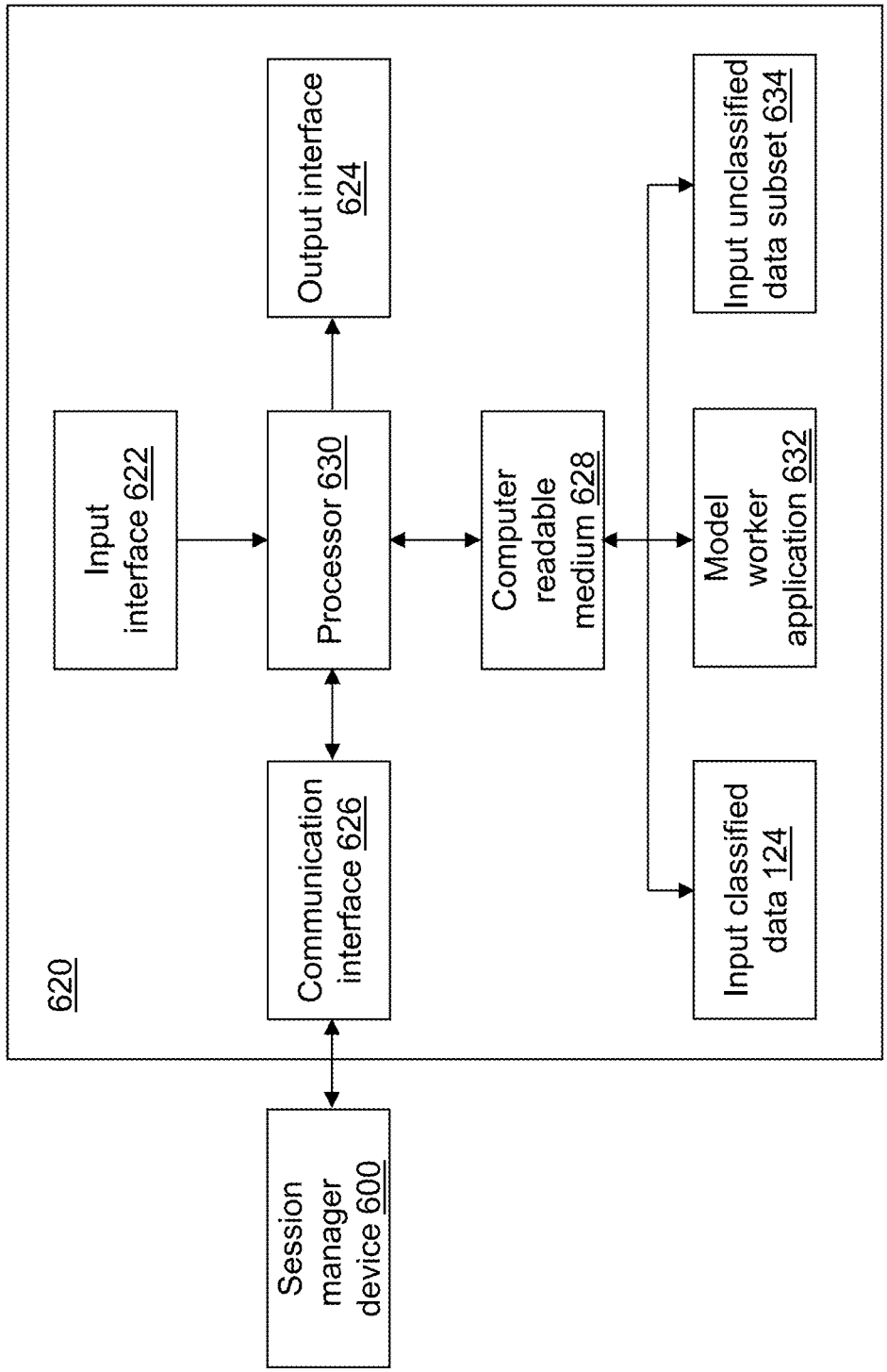
FIG. 6B depicts a block diagram of a session worker device of the classification system of FIG. 3 in accordance with an illustrative embodiment.

For illustration, referring to FIG. 6B, a block diagram of a session worker device 620 is shown in accordance with an example embodiment. Session worker device 620 is an example worker computing device of each session of worker system 306 excluding each session manager device 600. For example, remaining computing devices of each session, such as second computing device 318-1-2, ..., and $M^{th}$ computing device 318-1-M of first worker session 306a and second computing device 318-n-2, ..., and $M^{th}$ computing device 318-n-M of $N_s^{th}$ worker session 306n, may each be an instance of session worker device 620. Session worker device 620 may include a fifth input interface 622, a fifth output interface 624, a fifth communication interface 626, a fifth computer-readable medium 628, a fifth processor 630, a model worker application 632, input classified data 124, and an input unclassified data subset 634.

In some implementations, a distributed solution allows applications of big data. For example, scalability is provided with a distributed solution. A copy of input classified data 124 may be sent to each computing device of worker system 306. Because input unclassified data 126 may need to be distributed across a plurality of computing devices, each session may include a plurality of computing devices with one of the computing devices acting as the session manager and referred to as session manager device 600. Input unclassified data 126 first may be distributed into data subsets at each computing device included in a respective session, with each session distributing input unclassified data 126 in a similar manner among its computing devices. For example, if first worker session 306a includes three computing devices, input unclassified data 126 is distributed to each computing device of first worker session 306a that may or may not include a first session manager device 600a of first worker session 306a. $N_s^{th}$ worker session 306n similarly distributes input unclassified data 126 among the computing devices of nth worker session 306n so that each worker computing device has a subset of input unclassified data 126 stored thereon.

Evaluation list 514, model data 516, and selected model data 518 are created from results generated by worker system 306 executing model manager application 612 with input classified data 124 and input unclassified data subset 634. Model manager application 612 may coordinate generation of the classification model using model worker application 632 executing at the one or more session worker devices 620 assigned to the session with input classified data 124 and their allocated subset of input unclassified data 126 designated as input unclassified data subset 634. Session manager device 600 may or may not include input classified data 124 and a subset of input unclassified data 126 divided into input unclassified data subset 614. For example, session manager device 600 may coordinate the distribution of input unclassified data 126 with or without storing a subset of input unclassified data 126 on fourth computer-readable medium 608.

Referring again to FIG. 4, each user device 400 of user system 302 may include the same or different components and combination of components. Fewer, different, and additional components may be incorporated into user device 400. Second input interface 402 provides the same or similar functionality as that described with reference to input interface 102 of classification device 100 though referring to user device 400. Second output interface 404 provides the same or similar functionality as that described with reference to output interface 104 of classification device 100 though referring to user device 400. Second communication interface 406 provides the same or similar functionality as that described with reference to communication interface 106 of classification device 100 though referring to user device 400. Data and messages may be transferred between selection manager device 304 and user device 400 using second communication interface 406. Second computer-readable medium 408 provides the same or similar functionality as that described with reference to computer-readable medium 108 of classification device 100 though referring to user device 400. Second processor 410 provides the same or similar functionality as that described with reference to processor 110 of classification device 100 though referring to user device 400

Classification model tuning application 422 performs operations associated with selecting a hyperparameter configuration for a classification model where the hyperparameter configuration defines a value for each hyperparameter used to train the classification model. The operations may be implemented using hardware, firmware, software, or any combination of these methods. Referring to the example embodiment of FIG. 4, classification model tuning application 422 is implemented in software (comprised of computer-readable and/or computer-executable instructions) stored in second computer-readable medium 408 and accessible by second processor 410 for execution of the instructions that embody the operations of classification model tuning application 422. Classification model tuning application 422 may be written using one or more programming languages, assembly languages, scripting languages, etc. Classification model tuning application 422 may be implemented as a Web application.

Referring again to FIG. 5, fewer, different, or additional components may be incorporated into selection manager device 304. Third input interface 502 provides the same or similar functionality as that described with reference to input interface 102 of classification device 100 though referring to selection manager device 304. Third output interface 504 provides the same or similar functionality as that described with reference to output interface 104 of classification device 100 though referring to selection manager device 304. Third communication interface 506 provides the same or similar functionality as that described with reference to communication interface 106 of classification device 100 though referring to selection manager device 304. Data and messages may be transferred between selection manager device 304 and/or user device 400 and session manager device 600 using third communication interface 506. Third computer-readable medium 508 provides the same or similar functionality as that described with reference to computer-readable medium 108 of classification device 100 though referring to selection manager device 304. Third processor 510 provides the same or similar functionality as that described with reference to processor 110 of classification device 100 though referring to selection manager device 304.

Selection manager application 512 performs operations associated with selecting sets of hyperparameter configurations to evaluate based on inputs provided by user device 400. Selection manager application 512 requests that the computing devices of worker system 306 generate a trained classification model for each hyperparameter configuration in the selected sets of hyperparameter configurations. The operations may be implemented using hardware, firmware, software, or any combination of these methods. Referring to the example embodiment of FIG. 5, selection manager application 512 is implemented in software (comprised of computer-readable and/or computer-executable instructions) stored in third computer-readable medium 508 and accessible by third processor 510 for execution of the instructions that embody the operations of selection manager application 512. Selection manager application 512 may be written using one or more programming languages, assembly languages, scripting languages, etc. Selection manager application 512 may be implemented as a Web application.

Referring again to FIG. 6A, fewer, different, and additional components may be incorporated into session manager device 600. Each session manager device 600 of each session of worker system 306 may include the same or different components or combination of components.

Fourth input interface 602 provides the same or similar functionality as that described with reference to input interface 102 of classification device 100 though referring to session manager device 600. Fourth output interface 604 provides the same or similar functionality as that described with reference to output interface 104 of classification device 100 though referring to session manager device 600. Fourth communication interface 606 provides the same or similar functionality as that described with reference to communication interface 106 of classification device 100 though referring to session manager device 600. Data and messages may be transferred between session manager device 600 and session worker device 620 using fourth communication interface 606. Fourth computer-readable medium 608 provides the same or similar functionality as that described with reference to computer-readable medium 108 of classification device 100 though referring to session manager device 600. Fourth processor 610 provides the same or similar functionality as that described with reference to processor 110 of classification device 100 though referring to session manager device 600.

Referring again to FIG. 6B, fewer, different, and additional components may be incorporated into session worker device 620. Each session worker device 620 of each session of worker system 306 may include the same or different components or combination of components.

Fifth input interface 622 provides the same or similar functionality as that described with reference to input interface 102 of classification device 100 though referring to session worker device 620. Fifth output interface 624 provides the same or similar functionality as that described with reference to output interface 104 of classification device 100 though referring to session worker device 620. Fifth communication interface 626 provides the same or similar functionality as that described with reference to communication interface 106 of classification device 100 though referring to session worker device 620. Data and messages may be transferred between session manager device 600 and session worker device 620 using fifth communication interface 626. Fifth computer-readable medium 628 provides the same or similar functionality as that described with reference to computer-readable medium 108 of classification device 100 though referring to session worker device 620. Fifth processor 630 provides the same or similar functionality as that described with reference to processor 110 of classification device 100 though referring to session worker device 620.

Model worker application 632 may be integrated with other analytic tools and may be integrated with model manager application 612 to generate a classification model using input classified data 124 and input unclassified data 126 distributed across the worker computing devices of each session. Classification model tuning application 422, selection manager application 512, model manager application 612, and/or model worker application 632 may be the same or different applications that are integrated in various manners to select a hyperparameter configuration for a classification model using input classified data 124 and input unclassified data 126 in a single computing device or a plurality of distributed computing devices. As an example, classification model tuning application 422, selection manager application 512, model manager application 612, and/or model worker application 632 may be integrated in a single computing device such as classification device 100. Classification model tuning application 422, selection manager application 512, model manager application 612, and/or model worker application 632 further may be part of an integrated data analytics software application and/or software architecture such as that offered by SAS Institute Inc. of Cary, N.C., USA. For example, classification model tuning application 422, selection manager application 512, model manager application 612, and/or model worker application 632 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, classification model tuning application 422, selection manager application 512, model manager application 612, and/or model worker application 632 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Classification model tuning application 422, selection manager application 512, model manager application 612, and/or model worker application 632 may be used in a variety of industries. For example, a classification model trained using classification model tuning application 422, selection manager application 512, model manager application 612, and/or model worker application 632 may be used to recognize text, text meaning, a voice, speech, to recognize characteristics of images such as medical images, equipment diagnostic images, terrain images, etc., to recognize types of web pages, to predict whether or not an event has occurred, such as an equipment failure, to classify a microarray gene expression, etc. Classification model tuning application 422, selection manager application 512, model manager application 612, and/or model worker application 632 may automatically process data generated as part of operation of an enterprise, facility, system, device, etc., to classify the data and possibly provide a warning or alert associated with the classification using, for example, second input interface 402, second output interface 404, and/or second communication interface 406 so that appropriate action can be initiated in response to the labeling, recognition, or classification. For example, medical images that include a tumor may be recognized in input unclassified data 126 that triggers the sending of a notification message to a clinician that a tumor has been identified based on a "tumor" label determined for the image data.

Figure 7:
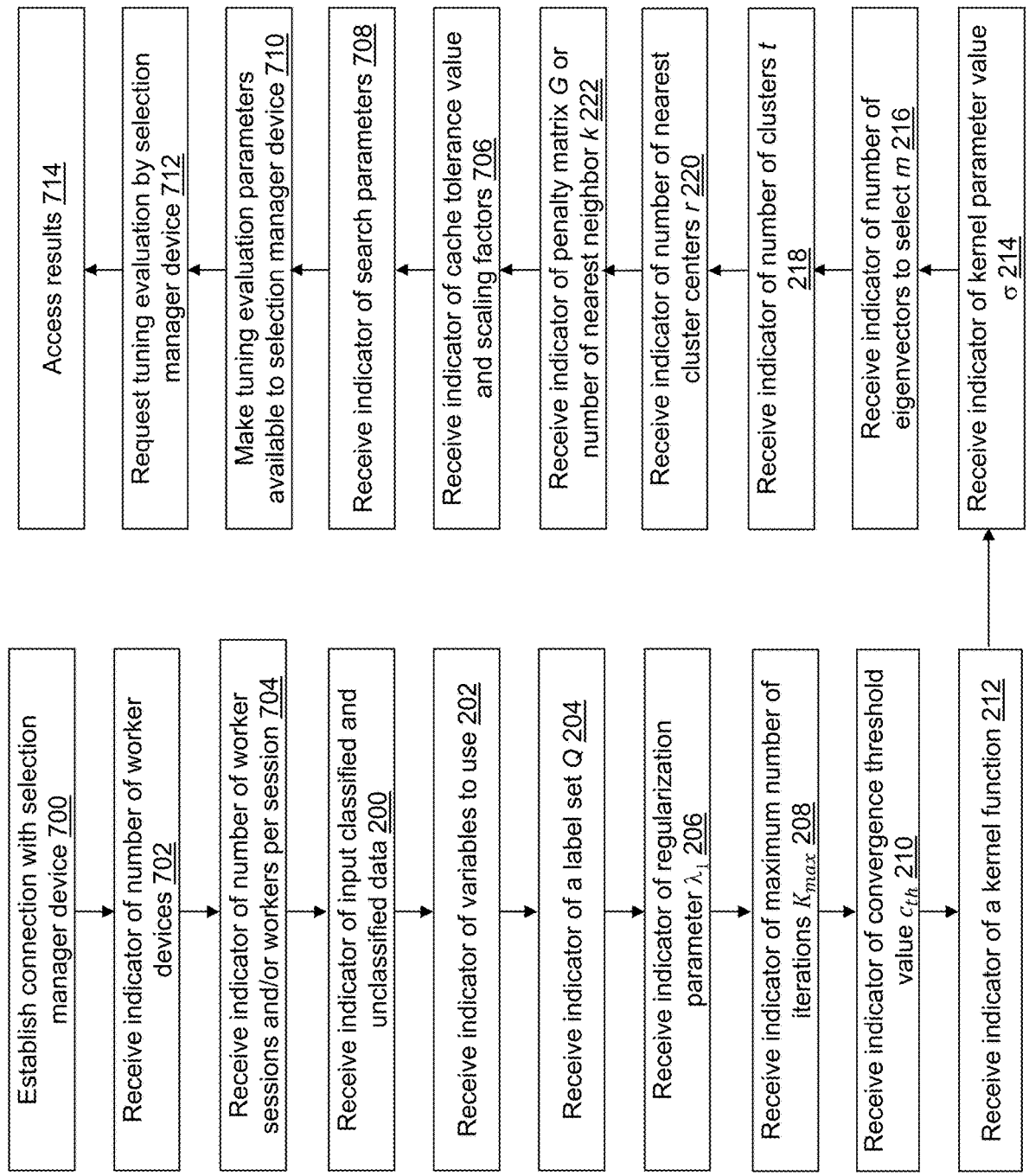
FIG. 7 depicts a flow diagram illustrating examples of operations performed by the user device of FIG. 4 in accordance with an illustrative embodiment.

Referring to FIG. 7, example operations associated with classification model tuning application 422 are described. Additional, fewer, or different operations may be performed depending on the embodiment. The order of presentation of the operations of FIG. 7 is not intended to be limiting. A user can interact with one or more user interface windows presented to the user in display 416 under control of classification model tuning application 422 independently or through a browser application in an order selectable by the user. Although some of the operational flows are presented in sequence, the various operations may be performed in various repetitions, concurrently, and/or in other orders than those that are illustrated. For example, a user may execute classification model tuning application 422, which causes presentation of a first user interface window, which may include a plurality of menus and selectors such as drop-down menus, buttons, text boxes, hyperlinks, etc. associated with classification model tuning application 422 as understood by a person of skill in the art.

In an operation 700, a connection is established with selection manager device 304. User device 400 accepts commands from a user and relays necessary instructions to selection manager device 304.

In an operation 702, a thirteenth indicator may be received that indicates a value of $N_w$ the number of computing devices or nodes of worker system 306 that may include selection manager device 304 (for example, the same or another indicator may indicate whether or not to include selection manager device 304 or it may or may not be included by default). The thirteenth indicator may further indicate whether selection manager device 304 is configured in a single-machine mode or a distributed mode. In an alternative embodiment, the thirteenth indicator may not be received. For example, a default value may be stored, for example, in computer-readable medium 408 and used automatically. In another alternative embodiment, $N_w$ may not be selectable. Instead, a fixed, predefined value may be used. The value further may be automatically determined based on a number of computing devices connected to selection manager device 304.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 304. More simply, single-machine mode means multithreading on selection manager device 304. Single-machine mode uses the number of CPUs (cores) on selection manager device 304 to determine the number of concurrent threads. For example, one thread per core may be used though a number of threads on any computing device may be changed under control of the user. A grid host may be specified for a distributed mode and identify a domain name system (DNS) or IP address of selection manager device 304, when selection manager device 304 is a separate device from user device 400.

In an operation 704, a fourteenth indicator may be received that indicates the value of $N_s$ the number of the one or more sessions and/or the value of M the number of computing devices included in each session. Within each session, each computing device of that session may also use multiple threads. In an alternative embodiment, the fourteenth indicator may not be received. For example, default values may be stored, for example, in computer-readable medium 608 and used automatically. In another alternative embodiment, M or $N_s$ may not be selectable. Instead, a fixed, predefined value may be used. The value(s) further may be automatically determined based on W and other criteria as described further below such that the user does not specify either or only one of $N_s$ the number of the one or more sessions and M the number of computing devices included in each session.

Similar to classification device 100, user device 400 may request values to define the various input parameters/hyperparameters of operations 200 through 222. One or more values may be input for each hyperparameter such as the Gaussian bandwidth parameter σ, the number of eigenvectors to select m, the first regularization parameter $\lambda_1$, the number of nearest neighbor k, the number of clusters t, and the number of nearest cluster centers r. The one or more values for each hyperparameter may be used to search for optimum hyperparameter values by selection manager device 304. For example, one or more values for a may be received. Alternatively, one or more default values for a may be stored, for example, in second computer-readable medium 408 and used automatically. In another alternative embodiment, the one or more values of σ may not be selectable. Instead, one or more fixed, predefined values may be used. The one or more values of σ may be defined in various manners such as using a list of possible values or using a minimum σ value, a maximum σ value, and a σ step value. For example, a list of σ values may be defined that includes the minimum σ value and each subsequent value adding the σ step value up to and including the maximum σ value.

In an operation 706, a fifteenth indicator may be received that defines a cache tolerance value and a scaling factor value for each hyperparameter. The cache tolerance value is used to determine when a subsequent hyperparameter configuration is "close enough" to a previously executed configuration to not repeat execution with the subsequent hyperparameter configuration. The scaling factor value for each hyperparameter is used to scale the hyperparameters relative to each other. In an alternative embodiment, the fifteenth indicator may not be received. For example, default value may be stored, for example, in second computer-readable medium 408 and used automatically. An illustrative default value for the cache tolerance value is 1.0e-9. An illustrative default value for the scaling factor value for each hyperparameter is one. In another alternative embodiment, the cache tolerance value and the scaling factor value for each hyperparameter may not be selectable. Instead, fixed, predefined values may be used.

In an operation 708, a sixteenth indicator may be received that defines values for one or more search parameters associated with a tuning search method. For example, a maximum number of configuration evaluations $n_b$, a population size $n_p$, a number of centers $n_c < n_p$, an initial step size value Δ, and/or a decrease criterion value $\beta \in (0,1)$, etc. may be defined by the sixteenth indicator. The tuning search method may be "LHS+GA/GSS" in which a Latin hypercube sampling (LHS) search method is used to generate a first set of hyperparameter configurations that are each executed to generate a cost function value. The cost function values and the hyperparameter configuration associated with each are used to initialize a genetic algorithm (GA). Each population of the GA search method may be enhanced with a "growth step" in which a genetic set search (GSS) search method is used to locally improve some of the more promising members of the GA population.

For illustration, the LHS search method generates uniform hyperparameter values across the range of each the one or more values of each hyperparameter and randomly combines them across hyperparameters. If the hyperparameter is continuous or discrete with more levels than a requested sample size, a uniform set of samples is taken across the hyperparameter range including a lower and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. This LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly.

For illustration, the GA search method defines a family of local search algorithms that seek optimal solutions to problems by applying the principles of natural selection and evolution. Members of a current generation that have passed a selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameter are modified to temporarily fix integer hyperparameters to their current setting. These additional growth steps may be performed each iteration to permit selected hyperparameter configurations of the population (based on diversity and fitness) to benefit from local optimization over the continuous variables.

In an operation 710, the tuning evaluation parameters that may include the parameters indicated in operations 702 through 708 and 200 through 222 are made available to selection manager device 304. For example, the values of any of the parameters that are not default values may be sent to selection manager device 304. As another option, a location of the values of any of the parameters that are not default values may be sent to selection manager device 304. As still another option, a location of the values of any of the parameters that are not default values may be provided to selection manager device 304 in a computer memory location that is known to selection manager device 304.

In an operation 712, a tuning evaluation to select hyperparameters is requested of selection manager device 304 using the tuning evaluation parameters.

In an operation 714, tuning evaluation results are accessed. For example, an indicator may be received that indicates that the tuning process is complete. For example, one or more output tables may be presented on second display 416 when the tuning process is complete. As another option, second display 416 may present a statement indicating that the tuning process is complete. The user can access the output tables in the specified location. For example, the user can select the hyperparameters included in a "Best Configuration" output table.

Figure 8A:
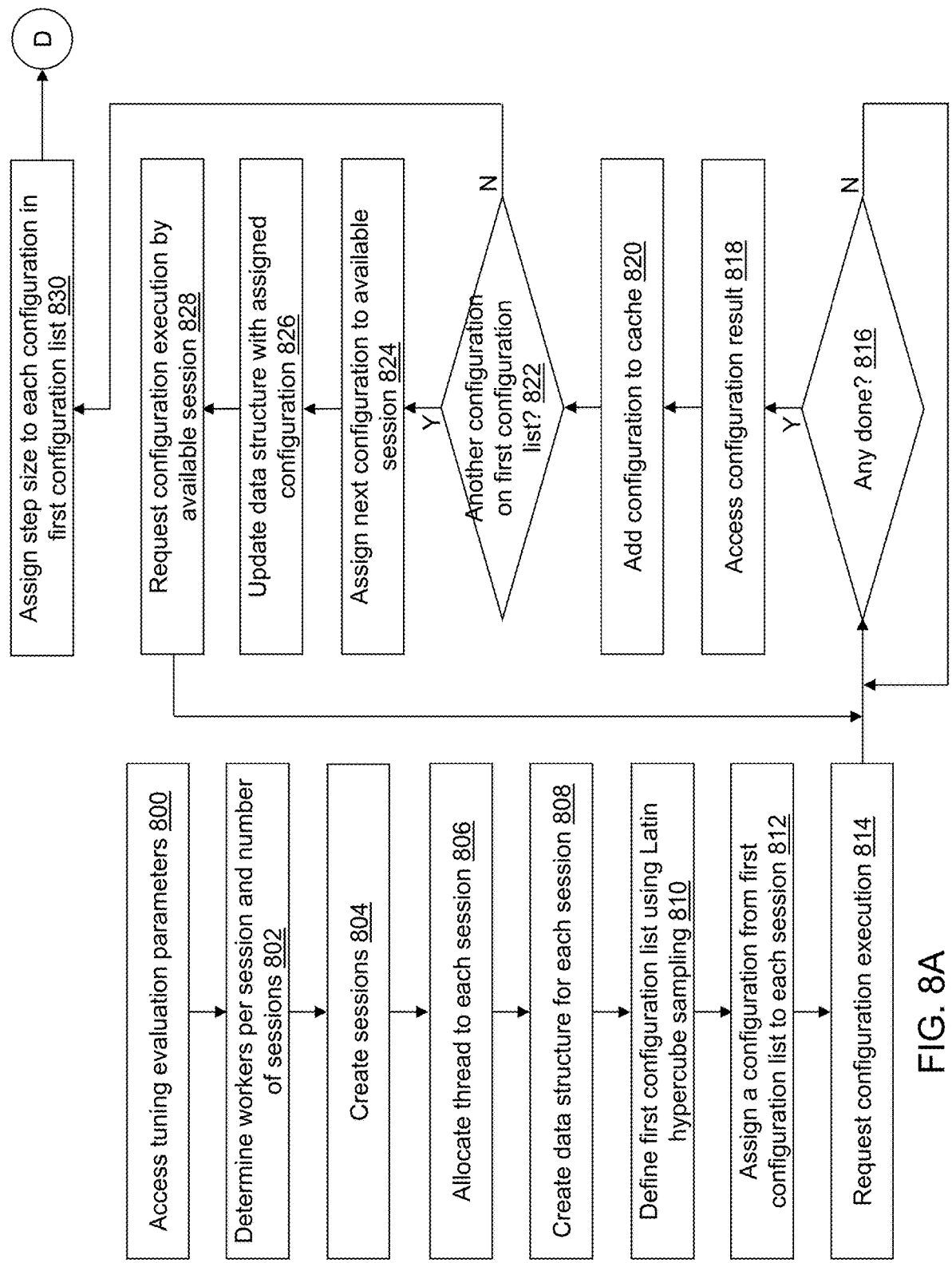
FIGS. 8A to 8C depict a flow diagram illustrating examples of operations performed by the selection manager device of FIG. 5 in accordance with an illustrative embodiment.
Figure 8B:
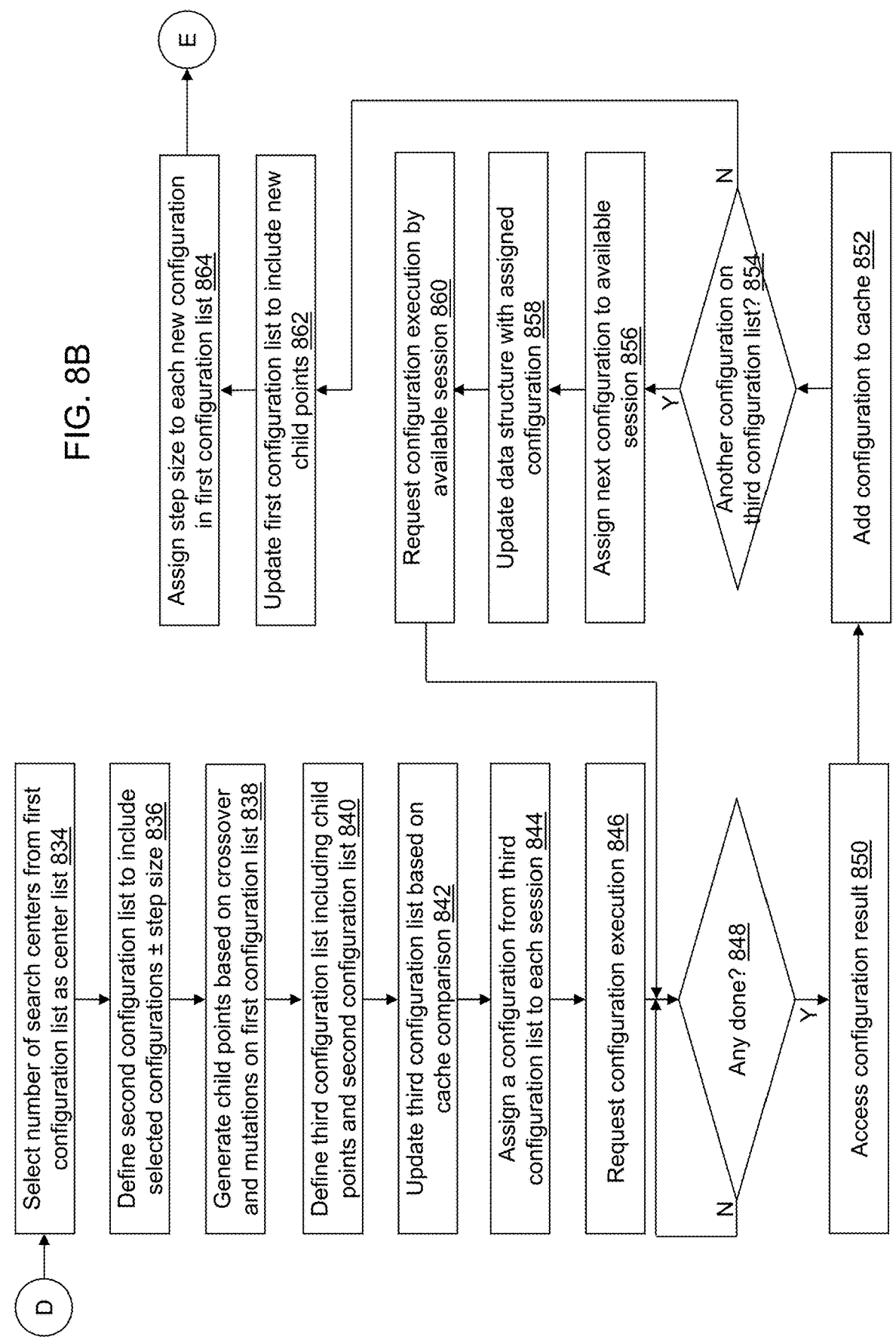
Figure 8C:
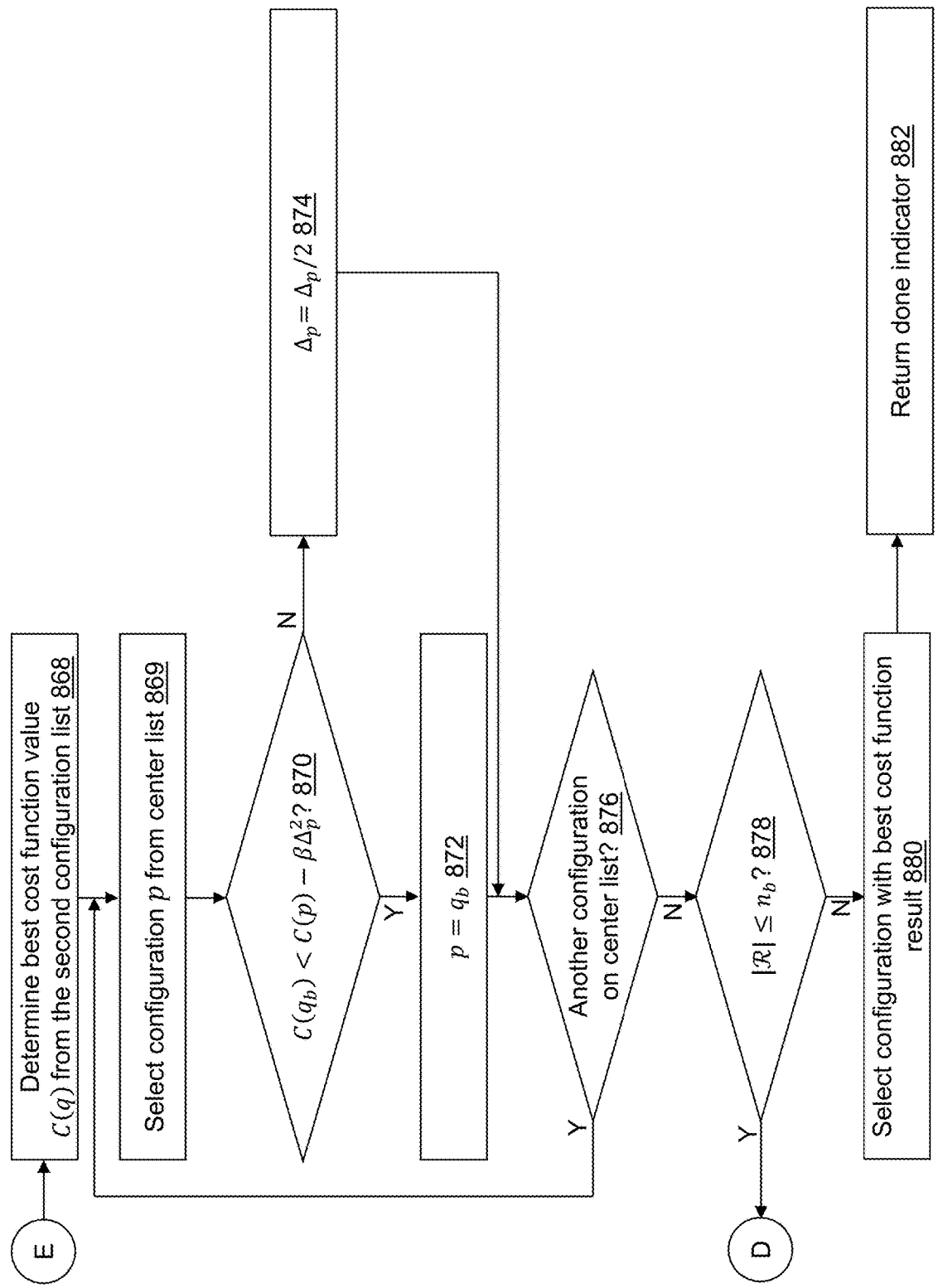

Referring to FIGS. 8A, 8B, and 8C, example operations associated with selection manager application 512 are described. Additional, fewer, or different operations may be performed depending on the embodiment. The order of presentation of the operations of FIGS. 8A, 8B, and 8C is not intended to be limiting. Selection manager device 304 establishes communication with the computing devices of worker system 306, sends instructions to each session manager device 600 associated with each session established by selection manager device 304, collects and aggregates the results of computations from each session, and communicates final results to user device 400. Selection manager device 304 may utilize itself as a worker computing device of worker system 306. The computing devices of worker system 306 receive instructions from selection manager device 304, store and process data, and send the results of computations back to selection manager device 304 under control of session manager device 600 associated with each session. The worker computing devices of each session may also communicate to each other directly to complete tasks.

In an operation 800, tuning evaluation parameters obtained by classification model tuning application 422 are accessed. For example, values for parameters indicated in operations 702 through 708 and 200 through 222 and made available to selection manager device 304 in operation 710 are accessed.

In an operation 802, the number of workers per session M and the number of sessions $N_s$ are determined. For example, when the fourteenth indicator specifies $N_s$, that value is used for the number of sessions, or when the fourteenth indicator specifies M, that value is used for the number of workers per session. If $N_w$ is equal to all of the workers that are connected to selection manager device 304 and there are at least 16 worker computing devices included in worker system 306, $N_s$ may be limited to eight so that the number of workers per session M is at least two.

Optionally, the fourteenth indicator may indicate that M is set based on a size of input classified data 124 and input unclassified data 126. For example, M may be set based on a number of rows r and a number of columns c of input classified data 124 and input unclassified data 126 and a distribution factor d. For illustration, M=1+rcd. An illustrative value of $d=2e^{-8}$ may be used so that another session worker device 620 is added to each session for every 50 million data values. The value of d may be selected by a user of user device 400. The number of columns c further may be the number of variables to use instead of a total number of columns. The number of rows r further may be the number of rows to include in input unclassified data 126.

$N_s$ may be determined as either one less than a population size specified for the GA tuning search method because one hyperparameter configuration is carried forward each iteration. The best point is carried forward so that if the next iteration does not find an improvement, the returned set of evaluations still includes the current best for consideration in generating the next iteration of hyperparameter configurations. For the GSS tuning search method, twice the number of hyperparameters is added to the value of $N_s$. For the LHS tuning search method, M is determined as one less than a sample size. $N_s$ may then be limited by a configuration of selection manager device 304. When selection manager device 304 is configured in single-machine mode and $N_s$ is greater than four and not specified by the thirteenth indicator, $N_s$ is limited to four. When selection manager device 304 is configured in single-machine mode and $N_s$ is specified by the thirteenth indicator, $N_s$ may be limited to 32 or a number of threads of selection manager device 304. When selection manager device 304 is configured in distributed mode, and $N_s$ is not specified by the thirteenth indicator, $N_s \leq N_w/M$ may be used. When selection manager device 304 is configured in distributed mode and M is specified by the thirteenth indicator, $N_s \leq 2N_w/M$ may be applied.

For illustration, if a population size specified for a GA search method is ten, even if $N_w=100$ and $M=2$ based on a size of input classified data 124 and input unclassified data 126, $N_s=10$ instead of $N_s=50$ because the GA population size (number of hyperparameter configurations created each iteration by the GA search method) limits the number of hyperparameter configurations created each iteration.

When $N_s$ is greater than one and M is equal to one, selection manager application 512 is executed in a model parallel mode; when M is greater than one and $N_s$ is equal to one, selection manager application 512 is executed in a data parallel mode; and when both M and $N_s$ are greater than one, selection manager application 512 is executed in a data and model parallel mode. In an automatic mode, $N_s$ may be selected to be as large as possible with M as small as possible subject to the size of input classified data 124 and input unclassified data 126 because model parallel is more efficient than data parallel.

In an operation 804, the number of sessions $N_s$ are created to include the number of workers per session M with a different session manager device 600 selected for each created session. Input unclassified data 126 is provided to each session and distributed among the worker computing devices of each respective session to define input unclassified data subset 614 and/or input unclassified data subset 634. A copy of input classified data 124 is also provided to each worker computing device of each respective session.

In an operation 806, a thread is allocated from an available thread pool to each created session. The allocated threads each manage the communications between selection manager device 304 and session manager device 600 of each respective session.

In an operation 808, a data structure is created for each session through which each session is notified of the hyperparameter values for the assigned hyperparameter configuration, etc. A hyperparameter configuration may include a value for each hyperparameter such as a value for each of the Gaussian bandwidth parameter a, the number of eigenvectors to select m, the first regularization parameter the number of nearest neighbor k, the number of clusters t, and the number of nearest cluster centers r. In an alternative embodiment, the penalty matrix G may be received or used as an input instead of the number of nearest neighbor k. When the penalty matrix G is received, the number of nearest neighbor k is not a hyperparameter. An illustrative data structure includes a thread identifier that links the data structure to each thread, a session handle for the thread, a parameter list, the hyperparameter configuration assigned to the thread, a completion indicator, etc. The session handle contains information about the session that was started in a new process to run actions.

In an operation 810, the first configuration list is defined using LHS and its associated parameters. The first configuration list includes a plurality of hyperparameter configurations where each hyperparameter configuration includes a value for each hyperparameter to evaluate $\{\sigma, m, \lambda_1, k, t, r\}$. A set of hyperparameter configurations includes a plurality of hyperparameter configurations selected for evaluation before a next set of hyperparameter configurations is selected for evaluation based on the tuning search method and the cost function values computed for each hyperparameter configuration.

In an operation 812, a single configuration is selected from the first configuration list and assigned to each created session by loading the values in the data structure associated with the selected session. Depending on the number of created sessions $N_s$ relative to the number of configurations included on the first configuration list, all of the configurations defined in the first configuration list may be assigned or less than all of the configurations may be assigned.

Figure 9:
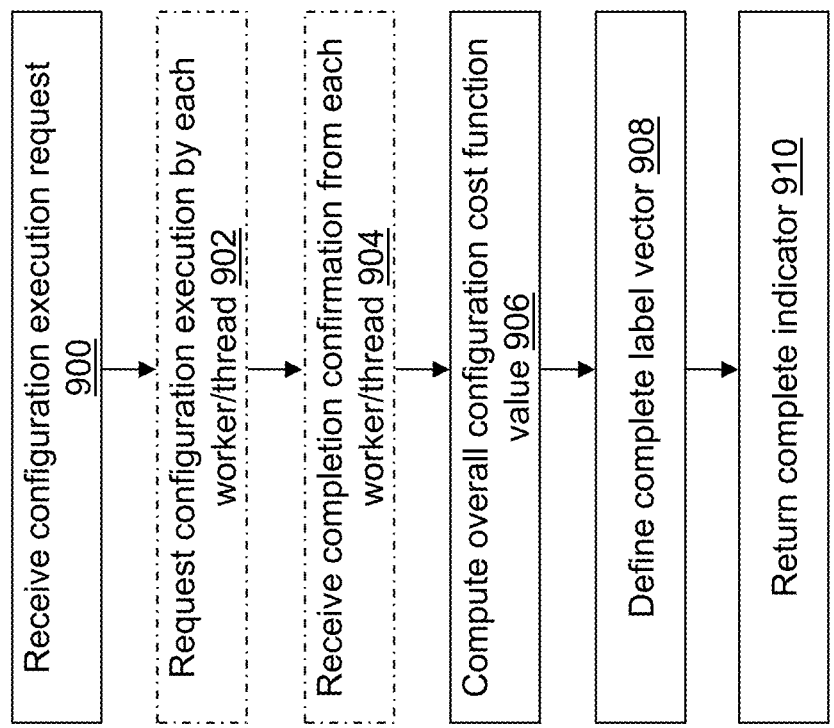
FIG. 9 depicts a flow diagram illustrating examples of operations performed by the session manager device of FIG. 6A in accordance with an illustrative embodiment.

In an operation 814, each session is requested to execute its assigned hyperparameter configuration based on the parameter values in the data structure. The handle to the session process stored in the data structure associated with the selected session may be used to make this request or call. FIG. 9 describes the operations performed by each session in response to the request configuration execution request.

In an operation 816, a determination is made concerning whether or not any execution is done. For example, session manager device 600 may set the completion indicator to indicate done in the data structure associated with it. If no execution is done, processing continues in operation 816 until indication that a session is done is received. If any execution is done, processing continues in an operation 818. For illustration, selection manager device 304 loops through each of its thread handles, checking to see if that particular thread is busy or free. When a session finishes evaluating its assigned hyperparameter configuration, session manager device 600 returns the computed values back to selection manager device 304 and sets its completion indicator indicating that it is free to receive a new hyperparameter configuration for evaluation.

In operation 818, results from the configuration execution are accessed in association with the set of hyperparameter values defined in the configuration assigned to the session that has completed its computations. For example, a cost function value C and label vector Y may be accessed using the data structure.

In an operation 820, the results including the cost function value and set of hyperparameter values defined for the assigned hyperparameter configuration may be stored in evaluation list 514. The cost function value and label vector Y may be stored in model data 516 in association with the set of hyperparameter values.

In an operation 822, a determination is made concerning whether or not the first configuration list includes another hyperparameter configuration to evaluate that has not been assigned to a session. If the first configuration list includes another hyperparameter configuration to evaluate, processing continues in an operation 824. If the first configuration list does not include another hyperparameter configuration to evaluate, processing continues in an operation 830.

In operation 824, a next hyperparameter configuration is selected from the first configuration list and assigned to the now free session.

In an operation 826, the data structure associated with the now free session is updated to include the next assigned hyperparameter configuration.

In an operation 828, a request is sent to session manager device 600 associated with the now free session to execute model manager application 612 with the hyperparameter configuration included in the data structure, and processing continues in operation 816 to continue to monitor for sessions that have completed their assigned hyperparameter configuration evaluation.

In operation 830, a step size is assigned to each configuration included in the first configuration list using the initial step size value $\Delta$, and processing continues in an operation 834 shown referring to FIG. 8B.

In operation 834, a number of search centers $n_s$ is selected from the first configuration list to define a center list. Similar to the first configuration list, the center list includes a plurality of hyperparameter configurations where each hyperparameter configuration includes a value for each hyperparameter to evaluate such as $\{s\ \sigma, m, \lambda_1, k, t, r\}$. The center list includes $n_s$ number of configurations randomly selected from first configuration list.

In an operation 836, a second configuration list is defined that includes $p+\Delta_p e_i$ and $p-\Delta_p e_i$, where p is each configuration on the center list, $\Delta_p$ is the step size value assigned to the $p^{th}$ configuration, and $e_i$ is a predefined decay parameter used in machine learning for optimization. An illustrative value for $e_i=0.95$ such that, as the iteration increases, the search step size becomes smaller to identify an optimal solution.

In an operation 838, child points are generated based on crossover and mutations of the configurations of the configurations on the first configuration list using the GA search method and its associated parameters and a cost function value computed from each configuration execution. For example, a paper by Koch et al., *Autotune: A Derivative-free Optimization Framework for Hyperparameter Tuning* KDD 2018 (Aug. 2, 2018) describes a process for generating child points. Each child point is a new configuration of hyperparameter values that includes a value for each hyperparameter to evaluate $\{\sigma, m, \lambda_1, k, t, r\}$.

In an operation 840, a third configuration list is defined that includes the configurations defined by the child points and included in the second configuration list.

In an operation 842, the third configuration list is updated based on a comparison of each hyperparameter configuration included in the third configuration list with each hyperparameter configuration included in evaluation list 514. For example, each hyperparameter configuration in the third configuration list is compared to previously evaluated hyperparameter configurations to determine if they are "close enough" to hyperparameter configuration values that have already been evaluated, where "close enough" is evaluated based on the cache tolerance value. If so, the hyperparameter configuration is removed from the first configuration list to avoid expending computing resources reevaluating a too similar hyperparameter configuration. The cost function value of the "close" point may be defined as the cost function value of the point removed from the first configuration list in evaluation list 514.

Similar to operation 812, in an operation 844, a single configuration is selected from the third configuration list and assigned to each created session by loading the values in the data structure associated with the selected session.

Similar to operation 814, in an operation 846, each session is requested to execute its assigned hyperparameter configuration based on the parameter values in the data structure. The handle to the session process stored in the data structure associated with the selected session may be used to make this request or call.

Similar to operation 816, in an operation 848, a determination is made concerning whether or not any execution is done. If no execution is done, processing continues in operation 848 until indication that a session is done is received. If any execution is done, processing continues in an operation 850.

Similar to operation 818, in operation 850, results including the cost function value and label vector Y computed from the hyperparameter configuration execution are accessed in association with the set of hyperparameter values defined in the configuration assigned to the session that has completed its computations.

Similar to operation 820, in an operation 852, the results including the cost function value and set of hyperparameter values defined for the assigned hyperparameter configuration may be stored in evaluation list 514. The cost function value and label vector Y may be stored in model data 516 in association with the set of hyperparameter values.

Similar to operation 822, in an operation 854, a determination is made concerning whether or not the third configuration list includes another hyperparameter configuration to evaluate that has not been assigned to a session. If the third configuration list includes another hyperparameter configuration to evaluate, processing continues in an operation 856. If the third configuration list does not include another hyperparameter configuration to evaluate, processing continues in an operation 862.

Similar to operation 824, in operation 856, a next hyperparameter configuration is selected from the third configuration list and assigned to the now free session.

Similar to operation 826, in an operation 858, the data structure associated with the now free session is updated to include the next assigned hyperparameter configuration.

Similar to operation 828, in an operation 860, a request is sent to session manager device 600 associated with the now free session to execute model manager application 612 with the hyperparameter configuration included in the data structure, and processing continues in operation 848 to continue to monitor for sessions that have completed their assigned hyperparameter configuration evaluation.

In operation 862, child points are generated based on crossover and mutations of the configurations on the first configuration list using the GA/GSS search method and its associated parameters. The first configuration list is updated to include the generated child points.

Similar to operation 830, in an operation 864, a step size is assigned to each configuration included in the first configuration list using the initial step size value Δ, and processing continues in an operation 868 shown referring to FIG. 8C.

In operation 868, a best hyperparameter configuration $q_b$ is selected from the second configuration list based on $$\min_{q \in \mathcal{T}_p} C(q),$$

where C(q) is a Gust function value for the $q^{th}$ hyperparameter configuration selected from the second configuration list indicated by $\mathcal{T}_p$. The best hyperparameter configuration $q_b$ has the minimum value of the cost function.

In an operation 869, a hyperparameter configuration p is selected from the center list.

In an operation 870, a determination is made concerning whether $C(q_b) < C(p) - \beta \Delta_p^2$, where C(p) is the cost function value for the selected $p^{th}$ hyperparameter configuration, and β is the decrease criterion value. If $C(q_b) < C(p) - \beta \Delta_p^2$, processing continues in an operation 872. If $C(q_b) < C(p) - \beta \Delta_p^2$, processing continues in an operation 874.

In operation 872, the pattern search about hyperparameter configuration p has been successful, and $p = q_b$ such that the hyperparameter configuration p is replaced with hyperparameter configuration $q_b$ in the center list.

In operation 874, the pattern search about hyperparameter configuration p was unsuccessful, and $\Delta_p = \Delta_p/2$ such that the step size for hyperparameter configuration p is reduced by half.

In an operation 876, a determination is made concerning whether or not the center list includes another hyperparameter configuration. If the center list includes another hyperparameter configuration, processing continues in operation 869. If the center list does not include another hyperparameter configuration, processing continues in an operation 878.

In operation 878, a determination is made concerning whether $|\mathcal{R}| \leq n_b$, where $|\mathcal{R}|$ indicates a number of hyperparameter configurations included on evaluation list 514, and $n_b$ is a number of hyperparameter configurations budgeted for processing. If $|\mathcal{R}| \leq n_b$, processing continues in operation 834 to process additional hyperparameter configurations. If $|\mathcal{R}| > n_b$, processing continues in an operation 880.

In operation 880, the hyperparameter configuration that resulted in the minimum cost function value is selected from evaluation list 514 and is indicated as an optimized hyperparameter configuration {σ°, m°, $\lambda_1°$, k°, t°, r°} that may be stored in selected model data 518 or returned to user device 400 in some other manner. The optimized label vector Y° may be extracted from model data 516 based on identification of the label vector Y associated with the optimized hyperparameter configuration {σ°, m°, $\lambda_1°$, k°, t°, r°} and stored in selected model data 518 or returned to user device 400 in some other manner.

The observation vectors in input classified data 124 and/or input unclassified data subset 614 and/or input unclassified data subset 634 may further be stored in selected model data 518 in association with a respective value for the target variable included in the optimized label vector Y°. The optimized label vector Y° includes a label or class defined for each observation vector included in input unclassified data 126. {σ°, m°, $\lambda_1°$, k°, t°, r°} are the selected hyperparameters for classifying input unclassified data subset 614 and/or input unclassified data subset 634.

In an alternative embodiment, the label vector Y may not be stored in association with each hyperparameter configuration. Instead, a session may be requested to execute with the optimized hyperparameter configuration {σ°, m°, $\lambda_1°$, $k^o$, $t^o$, $r^o$} and return or store its computed label vector Y as the optimized label vector $Y^o$.

In an operation 882, an indicator that processing is complete may be returned to user device 400.

Referring to FIG. 9, example operations associated with model manager application 612 that are performed by session manager device 600 in executing a hyperparameter configuration to compute the cost function value and label vector Y are described. Additional, fewer, or different operations may be performed depending on the embodiment. The order of presentation of the operations of FIG. 9 is not intended to be limiting.

In an operation 900, a request for execution is received from selection manager device 304. The data describing the process including the hyperparameter configuration assigned is accessed. For example, data in the data structure associated with the thread is accessed. Alternatively, the values may be included with the request or provided in other manners to the session. The request may be received as a result of execution of any of operations 814, 828, 846, or 860.

In an operation 902, each session worker device 620 associated with the respective session manager device 600 is requested to execute the assigned hyperparameter configuration based on the parameter values in the data structure and the observations stored in input classified data 124 and input unclassified data subset 634 distributed to each session worker device 620 of the respective session. As discussed above, session manager device 600 may also act as a session worker device 620 and execute the assigned hyperparameter configuration and the observations stored in input classified data 124 and input unclassified data subset 614.

In operation 904, results from the configuration execution at each session worker device 620 are received. For example, a cost function value $C_{sw}$ and a label vector $Y_{sw}$ may be received from each session worker device 620 that may include session manager device 600.

In an operation 906, a total cost function value is computed using $$C = \sum_{i=1}^{M} C_{sw,i}.$$

In an operation 908, each of the unclassified observation vectors in input unclassified data 126 is classified by concatenating each label vector $Y_{sw}$ received from session worker devices 620 to define label vector Y in the original order stored in input unclassified data 126.

In an operation 910, a completion indicator of the data structure is set to notify selection manager device 304 that processing of the hyperparameter configuration is complete. The total cost function value C and/or defined label vector Y are made available to selection manager device 304, for example, by including them in the data structure and/or updating a globally accessible table.

Figure 10A:
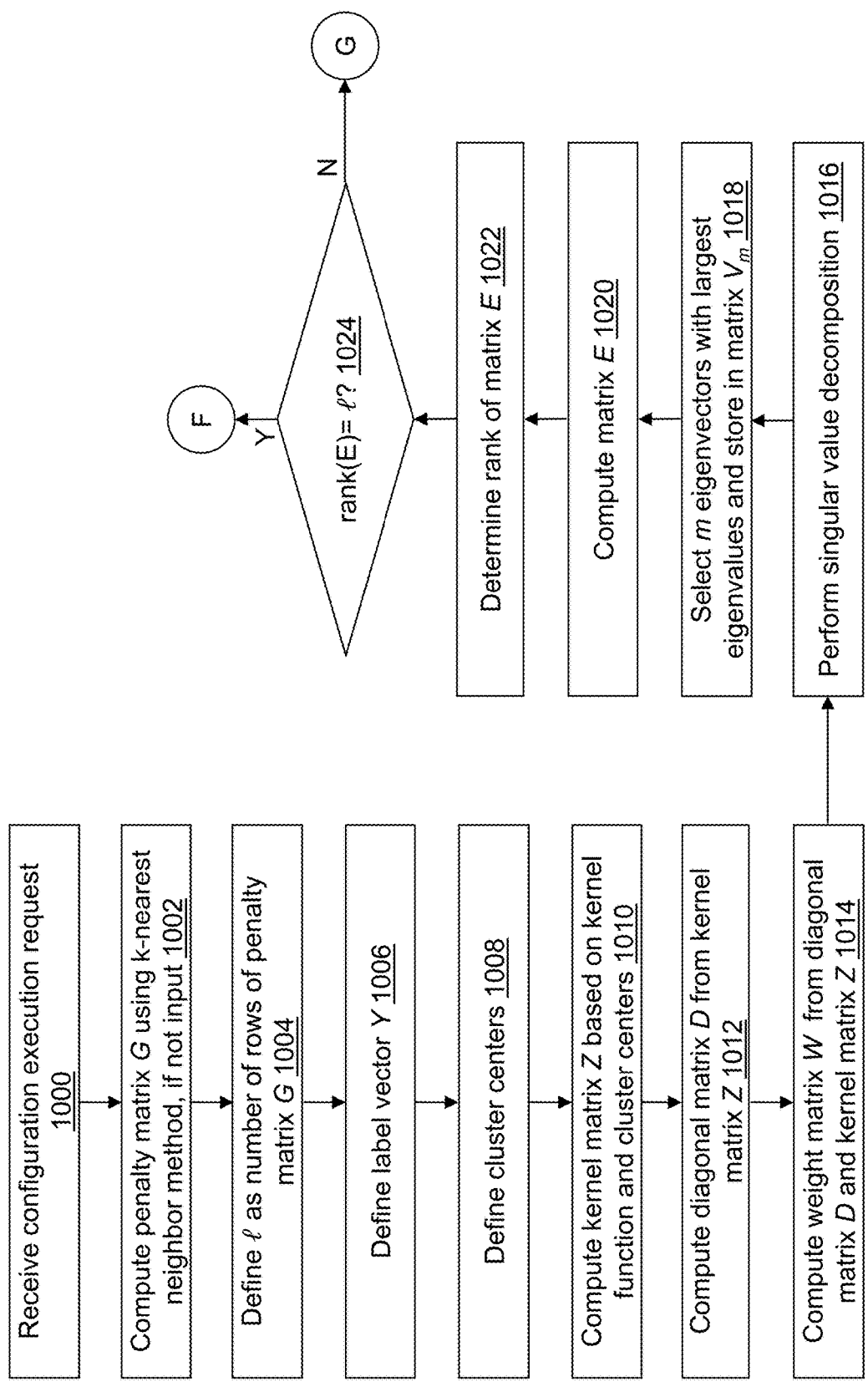
FIGS. 10A, 10B, and 10C depict a flow diagram illustrating examples of operations performed by the session worker device of FIG. 6B in accordance with an illustrative embodiment.
Figure 10B:
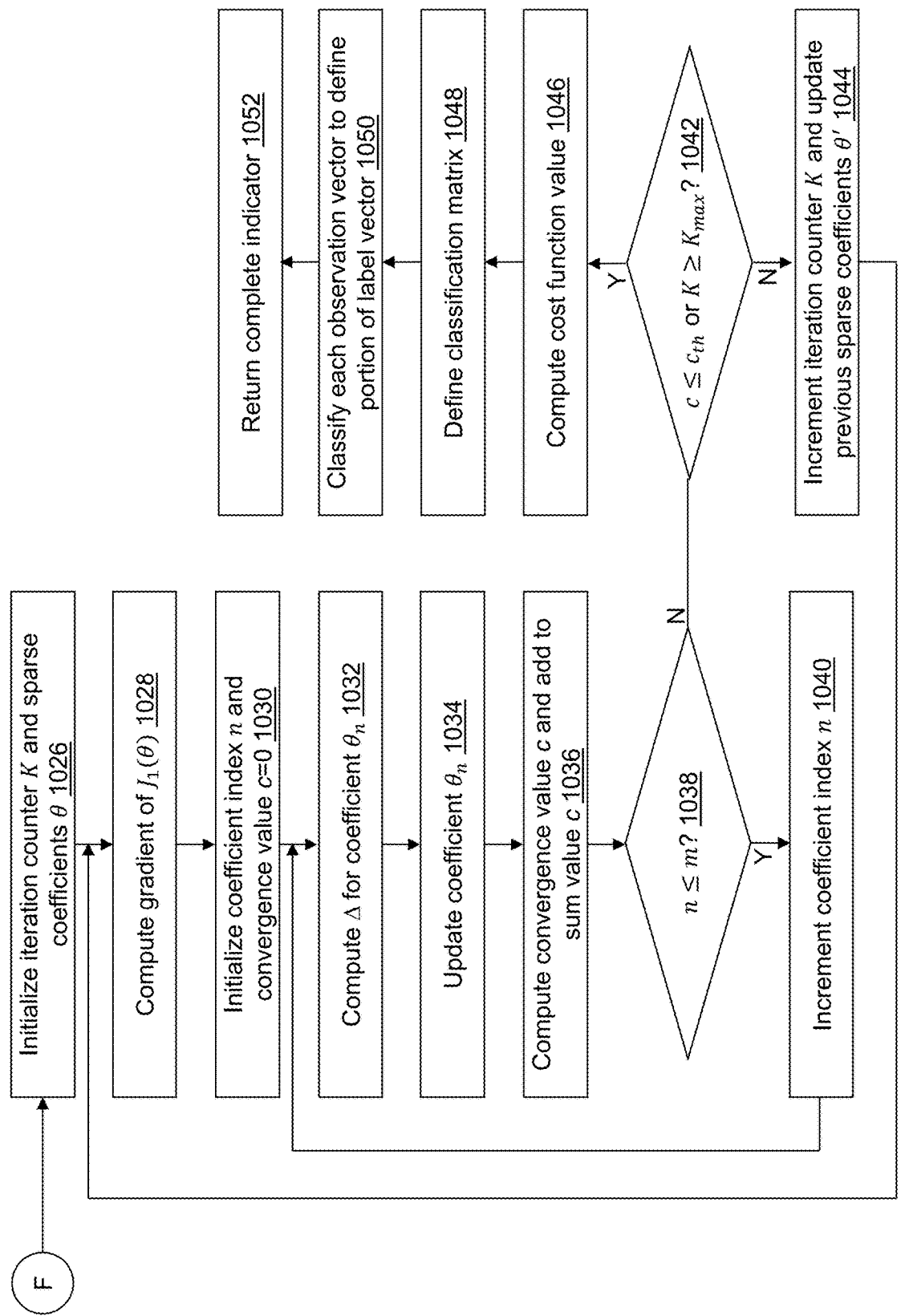
Figure 10C:
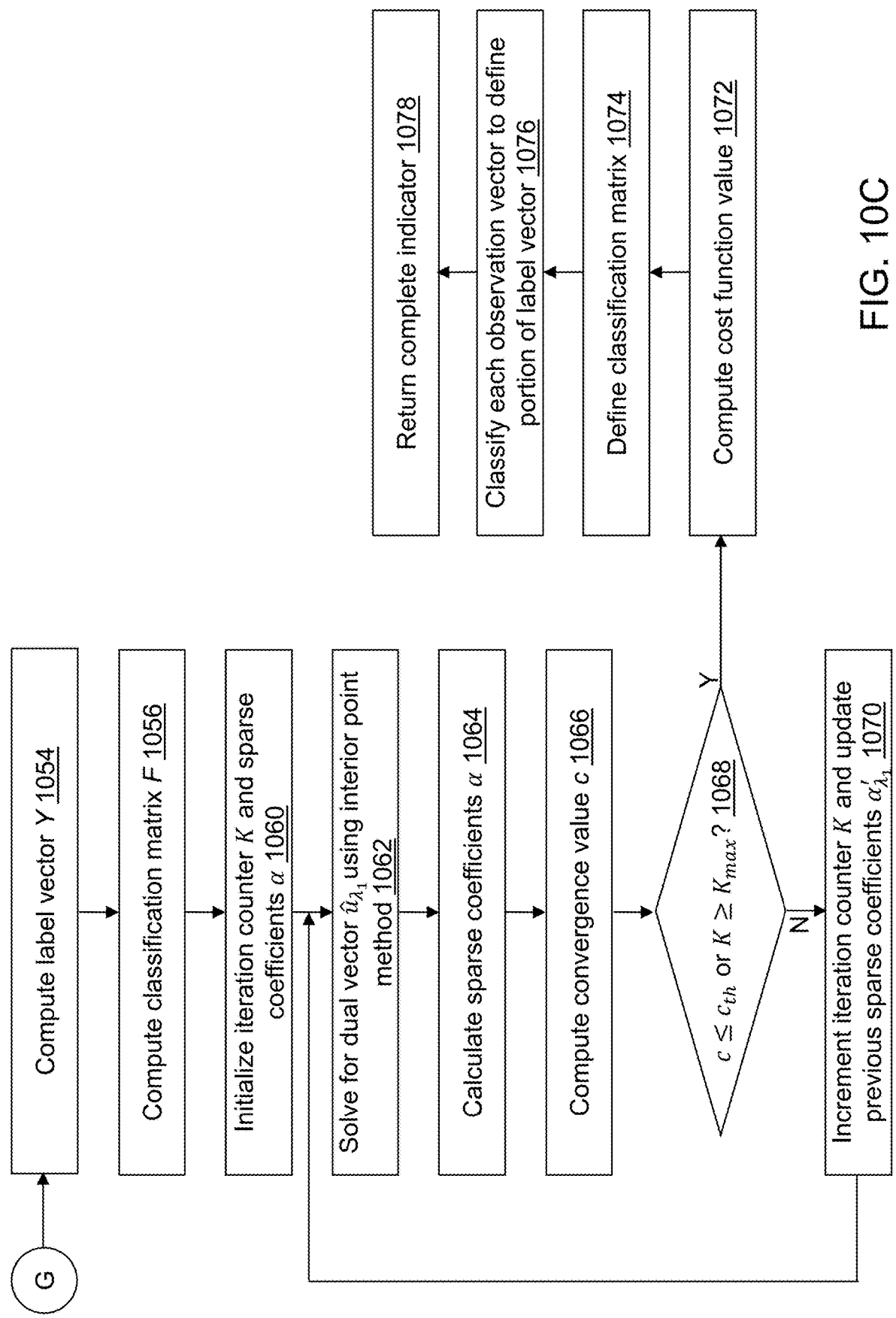

Referring to FIGS. 10A, 10B, and 10C, example operations associated with model worker application 632 in executing a hyperparameter configuration to compute the cost function value $C_{sw}$ and label vector $Y_{sw}$ are described. Additional, fewer, or different operations may be performed depending on the embodiment. The order of presentation of the operations of FIGS. 10A, 10B, and 10C is not intended to be limiting.

In an operation 1000, a request for execution is received from session manager device 600. The data describing the process including the hyperparameter configuration may be received with the request or accessed in another manner such as in a known memory location.

Similar to operation 224, in an operation 1002, the penalty matrix G is computed using a k-nearest neighbor algorithm, input classified data 124 and input unclassified data subset 614 or input unclassified data subset 634. and the value of the number of nearest neighbor k when the penalty matrix G was not indicated in operation 222.

Similar to operation 226, in an operation 1004, a value for l is defined as a number of rows of penalty matrix G.

Similar to operation 228, in an operation 1006, a label vector Y is defined from input classified data 124 and input unclassified data subset 614 or input unclassified data subset 634. $Y_i$=b if $x_i$ is labeled as $y_i$=b. Otherwise, $Y_i$=0. As another option for binary data, $Y_i$=1 if $y_i$ indicates true; $Y_i$=−1 if $y_i$ indicates false; otherwise, $Y_i$=0.

Similar to operation 230, in an operation 1008, t cluster centers {$u_1$, $u_2$, ..., $u_t$} are defined by executing a k-means clustering algorithm with input classified data 124 and input unclassified data subset 614 or input unclassified data subset 634.

Similar to operation 231, in an operation 1010, a kernel matrix Z is computed using the t cluster centers, the kernel function, the kernel parameter value σ, and the number of nearest cluster centers r. For example, using the Gaussian kernel function, the kernel matrix Z is computed using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2\sigma^2}\right)}, i = 1, 2, \ldots, N \text{ and } j = 1, 2, \ldots, t,$$

where $N_r(i)$ is an index to a nearest cluster center to $x_i$ of the number of nearest cluster centers r, $x_i$ is an $i^{th}$ observation vector selected from input classified data 124 and input unclassified data subset 614 or input unclassified data subset 634, $u_j$ is a $j^{th}$ cluster center selected from the t cluster centers {$u_1$, $u_2$, ..., $u_t$}, matrix Z is an N×t matrix, and N is a number of observation vectors included in input classified data 124 and input unclassified data subset 614 or input unclassified data subset 634.

Similar to operation 232, in an operation 1012, a diagonal matrix D is computed from the kernel matrix Z. For example, the diagonal matrix D is a t×t matrix and is defined as $$D_{jj} = \sum_{i=1}^{N} z_{ij}, j = 1, 2, \ldots, t \text{ and } D_{ij} = 0 \text{ if } i \neq j.$$

Similar to operation 233, in an operation 1014, a weight matrix W is computed using diagonal matrix D and the kernel matrix Z as $W = \hat{Z}\hat{Z}^T = ZD^{-0.5}D^{-0.5}Z^T$, where $W = \hat{Z}\hat{Z}^T$, and T indicates a transpose.

Similar to operation 234, in an operation 1016, a singular value decomposition of $\hat{Z}$ is applied to $\hat{Z} = V\Sigma U^T$ where each column of U is an eigenvector of the transpose of the weight matrix $W^T$ or $\hat{Z}^T\hat{Z}$, each column of V is an eigenvector of the weight matrix W, and Σ is a covariance matrix of $\hat{Z}$ that is a diagonal matrix whose diagonal entries are the eigenvalues of the weight matrix W. Referring to FIG. 2B, processing continues in an operation 236.

Similar to operation 236, in an operation 1018, m eigenvectors having the largest eigenvalues of the weight matrix W are selected and stored in a matrix $V_m$ defined as $$V_m = \hat{Z} U_m \Sigma_m^{-1},$$

where $V_m$ is an N×m matrix.

Similar to operation 238, in an operation 1020, a linear transformation matrix E is computed using $E = G\Sigma^{0.5}V^T V_m$, where linear transformation matrix E has dimension l×N.

Similar to operation 240, in an operation 1022, a rank of linear transformation matrix E is determined.

Similar to operation 242, in an operation 1024, a determination is made concerning whether rank(E)=l. When rank(E)=l, processing continues in an operation 1026 shown referring to FIG. 10B. When rank(E)<l, processing continues in an operation 1054 shown referring to FIG. 10C.

Referring to FIG. 10B, similar to operation 244, in operation 1026, the vector θ is initialized, for example, to zero values, where θ is an m×1 vector, a previous vector θ' is initialized using θ'=θ, where θ'=is an m×1 vector, and an iteration counter K is initialized, for example, as K=1.

Similar to operation 246, in an operation 1028, a gradient of J(θ) is computed with respect to θ. For example, the gradient of J(θ) is computed as $$\nabla_\theta J_1(\theta) = ((I-P)V_1)^T((I-P)Y - (I-P)V_1\theta),$$

where I is the identity matrix.

Similar to operation 248, in an operation 1030, a coefficient index n is initialized, for example, as n=1, and a convergence value c is initialized, for example, as c=0.

Similar to operation 250, in an operation 1032, a difference value $\Delta_n$ is computed for coefficient $\theta_n$ using $$\Delta_n = \theta_n - \frac{\nabla_{\theta_n} J_1(\theta)}{\|(I-P)V_1\|_s},$$

where $\|(I-P)V_1\|_s$ is a spectral norm of the matrix $(I-P)V_1$, and I is the identity matrix.

Similar to operation 252, in an operation 1034, $\theta_n$ is updated, for example, using $$\theta_n = \max\left\{|\Delta_n| - \frac{\lambda_1}{\|(I-P)V_1\|_s}, 0\right\},$$

where I is the identity matrix.

Similar to operation 254, in an operation 1036, a convergence value c is computed, for example, using $c = c + \theta_n - \theta'_n$, where $\theta'_n$ is a value of $\theta_n$ prior to the update in operation 252.

Similar to operation 256, in an operation 1038, a determination is made concerning whether there is another coefficient to update, for example, using n≤m. When n≤m, processing continues in an operation 1040. When n>m, processing continues in an operation 1042.

Similar to operation 258, in an operation 1040, the coefficient index n is incremented, for example, as n=n+1, and processing continues in operation 1032 to process the next coefficient.

Similar to operation 260, in operation 1042, a determination is made concerning whether convergence has been achieved or the maximum number of iterations have been performed. When $c \leq c_{th}$ or $K \geq K_{max}$, processing continues in an operation 1046. When $c > c_{th}$ and $K < K_{max}$, processing continues in an operation 1044.

Similar to operation 262, in operation 1044, the iteration counter K is incremented, for example, as K=K+1, the previous vector θ' is updated using θ'=θ, and processing continues in operation 1028.

In operation 1046, a cost function value is computed using $C_{sw} = 0.5\|(1-P)Y - (I-P)V_1\theta\|_2^1 + \lambda_1\|\theta\|_1$, where I is the identity matrix.

Similar to operation 264, in an operation 1048, the classification matrix F is defined using $F = V_m \tilde{E}^{-1}\theta$, where classification matrix F is an N×1 vector for a binary label set or an N×c matrix for a label set having c classes.

Similar to operation 266, in an operation 1050, each of the unclassified observation vectors in input unclassified data subset 614 or input unclassified data subset 634 is classified and updated in label vector Y. For example, for a binary label set, if $F_i > 0$, the $y_i$-variable (target) value or class of the $i^{th}$ observation vector of input unclassified data subset 614 or input unclassified data subset 634 is predicted to be 1; whereas, if $F_i < 0$, the $y_i$-variable (target) value or class of the $i^{th}$ observation vector of input unclassified data subset 614 or input unclassified data subset 634 is predicted to be −1. For a label set having c classes, $y_i$ is selected for each observation vector $x_i$ based on $$y_i = \underset{j \leq c}{\operatorname{argmax}} F_{ij}$$

As a result, a label with a highest classification value as indicated by $$\underset{j \leq c}{\operatorname{argmax}} F_{ij}$$

is selected as the $y_i$-variable (target) value or class for the $i^{th}$ observation vector $x_i$ of input unclassified data subset 614 or input unclassified data subset 634. The classification or label for each observation vector $x_i$ of input unclassified data subset 614 or input unclassified data subset 634 may be extracted from label set Q using the value of $y_i$ as an index into label set Q, and label vector Y may be updated with these values.

In an operation 1052, a completion indicator is sent to session manager device 600 that processing of the hyperparameter configuration on input unclassified data subset 614 or input unclassified data subset 634 is complete. The cost function value $C_{sw}$ and/or updated label vector $Y_{sw}$ are returned or otherwise made available to session manager device 600, for example, by updating a table accessible by session manager device 600.

Referring to FIG. 10C, similar to operation 270, in operation 1054, the estimated label vector $\tilde{Y}$ is computed, for example, using $$\tilde{Y} = V_m(V_m^T V_m)^{-1} V_m^T Y.$$

Similar to operation 272, in an operation 1056, a classification matrix F is computed, for example, using $$F = E(V_m^T V_m)^{-1} V_m^T.$$

Similar to operation 276, in an operation 1060, a sparse coefficients vector $\alpha_{\lambda_1}$ is initialized, for example, to zero values, where $\alpha_{\lambda_1}$ is an m×1 vector, a previous sparse coefficients vector $\alpha'_{\lambda_1}$ is initialized using $$\alpha'_{\lambda_1} = \alpha_{\lambda_1},$$

where $\alpha'_{\lambda_1}$ is an m×1 vector, and an iteration counter K is initialized, for example, as $$K = 1.$$

Similar to operation 278, in an operation 1062, the interior point method can be applied to compute the dual vector $\hat{u}_\lambda$ subject to $$\hat{u}_{\lambda_1, i} = \begin{cases} \lambda_1, & \text{if } (F\alpha_{\lambda_1})_i > 0 \\ -\lambda_1, & \text{if } (F\alpha_{\lambda_1})_i < 0, \ i = 1, \ldots, \ell. \\ [-\lambda_1, \lambda_1], & \text{if } (F\alpha_{\lambda_1})_i = 0 \end{cases}$$

Similar to operation 280, in an operation 1064, the sparse coefficients vector α is computed, for example, using $$\alpha_{\lambda_1} = (V_m^T V_m)^{-1} V_m^T (\tilde{Y} - F^T \hat{u}_{\lambda_1}).$$

Similar to operation 282, in an operation 1066, a convergence value c is computed, for example, using $$c = |\alpha_{\lambda_1} - \alpha'_{\lambda_1}|,$$

wherein | | indicates an absolute value of $$\alpha_{\lambda_1} - \alpha'_{\lambda_1}.$$

Similar to operation 284, in an operation 1068, a determination is made concerning whether convergence has been achieved or the maximum number of iterations have been performed. When $c \leq c_{th}$ or $K \geq K_{max}$, processing continues in an operation 1072. When $c > c_{th}$ and $K < K_{max}$, processing continues in an operation 1070.

Similar to operation 286, in operation 1070, the iteration counter K is incremented, for example, as K=K+1, the previous sparse coefficients vector $\alpha'_{\lambda_1}$ is updated using $\alpha'_{\lambda_1} = \alpha_{\lambda_1}$, and processing continues in operation 1062.

In operation 1072, a cost function value is computed using $C_{sw} = 0.5 \|V_m \alpha_{\lambda_1} - Y\|_2^2 + \lambda_1 \|E\alpha_{\lambda_1}\|_1$.

Similar to operation 288, in operation 1074, the classification matrix F is defined using $F = V_m \alpha_{\lambda_1}$, where classification matrix F is an N×1 vector for a binary label set or an N×c matrix for a label set having c classes.

Similar to operation 266, in an operation 1076, each of the unclassified observation vectors in input unclassified data subset 614 or input unclassified data subset 634 is classified. For example, for a binary label set, if $F_i > 0$, the $y_{sw,i}$-variable (target) value or class of the $i^{th}$ observation vector of input unclassified data subset 614 or input unclassified data subset 634 is predicted to be 1; whereas, if $F_i \leq 0$, the $y_{sw,i}$-variable (target) value or class of the $i^{th}$ observation vector of input unclassified data subset 614 or input unclassified data subset 634 is predicted to be −1. For a label set having c classes, $y_{sw,i}$ is selected for each observation vector $x_i$ based on $$y_{sw,i} = \operatorname*{argmax}_{j \leq c} F_{ij}.$$

As a result, a label with a highest classification value as indicated by $$\operatorname*{argmax}_{j \leq c} F_{ij}$$

is selected as the $y_{sw,i}$-variable (target) value or class for the $i^{th}$ observation vector $x_i$ of input unclassified data subset 614 or input unclassified data subset 634. The classification or label for each observation vector $x_i$ of input unclassified data subset 614 or input unclassified data subset 634 may be extracted from label set Q using the value of $y_{sw,i}$ as an index into label set Q and label vector $Y_{sw}$ may be updated with these values.

In an operation 1078, a completion indicator is sent to session manager device 600 that processing of the hyperparameter configuration on input unclassified data subset 614 or input unclassified data subset 634 is complete. The cost function value $C_{sw}$ and/or updated label vector $Y_{sw}$ are returned or otherwise made available to session manager device 600, for example, by updating a table accessible by session manager device 600.

Distributed classification system 300 predicts the label or class, a value for target variable y, for unclassified observation vectors in input unclassified data subset 614 and/or input unclassified data subset 634, where unclassified observation vectors were not labeled by an expert process or a human while determining the optimum values for the hyperparameters. Distributed classification system 300 supports improved classification accuracy performance in a faster manner using the plurality of worker computing devices of worker system 306 that perform operations on their portion of input unclassified data subset 614 or input unclassified data subset 634. Input classified data 124 is used at all of the computing devices of worker system 306. Selection manager device 304 controls the execution using different values of the hyperparameters by the plurality of worker computing devices of worker system 306. Distributed classification system 300 can be applied to computer vision, machine learning, pattern recognition, etc. In the application of medical imaging diagnosis, there may be a large number of unlabeled medical images that are distributed due to their geographic locations.

Supervised learning requires that the target (dependent) variable y be classified or labeled in training data so that a model can be built to predict the class of new unclassified data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Distributed classification system 300 solves this problem by providing a cost effective, accurate, and fast process for classifying unclassified data while improving the accuracy of the classification by identifying optimum values for the hyperparameters. The now classified observations of input unclassified data subset 614 and/or input unclassified data subset 634 provide observation vectors for training a predictive model that previously would have been discarded resulting in improved models and more accurate predictions as shown in the results presented below.

Experimental results were generated using the operations of classification application 122 with various datasets and compared to various existing classification methods.

A first existing classification system uses the method described in U.S. patent application Ser. No. 16/904,818 filed Jun. 18, 2020 that is assigned to the assignee of the present application and to which the present application claims priority as a continuation-in-part (ASSENT).

A second existing classification system uses the method described in Lu et al., *Noise-Robust Semi-Supervised Learning by Large-Scale Sparse Coding*, AAAI Conference on Artificial Intelligence (2015)(LSSC).

A third existing classification system was a supervised non-linear SVM baseline method, where various kernels are tuned and one-vs-all strategy is applied for all experiments. The third existing classification system used the method described in C. Chang and C. Lin, *Libsvm: A library for support vector machines*, TIST (2011)(LIBSVM).

A fourth existing classification system was a graph-based SSL algorithm with the objective function being regularized by graph Laplacian. The fourth existing classification system used the method described in Belkin et al., *On manifold regularization*, AISTATS (2005)(LapSVM).

A fifth existing classification system was similar to the fourth existing classification system in terms of regularization by graph Laplacian with a least squared loss as the objective function. The fifth existing classification system used the method described in Belkin et al., *Manifold regularization: A geometric framework for learning from labeled and unlabeled examples*, JMLR, 2399-2434 (2006) (LapRLS).

A sixth existing classification system estimated a label mean for unlabeled data based on multiple kernel learning or alternating optimization. The sixth existing classification system used the method described in Li et al., *Semi-supervised learning using label mean*, ICML (2009)(meanS3VM).

A seventh existing classification system approximated the supervised cost-sensitive support vector machine (SVM) leveraging label means of all the unlabeled data. The sixth existing classification system used the method described in Li et al., *Cost-sensitive semi-supervised support vector machine*, AAAI Conference on Artificial Intelligence (2010) (CS4VM).

An eighth existing classification system relied on suppressing the weights and optimizing the model parameter and class distribution of unlabeled data. The eighth existing classification system used the method described in Wang et al., *Large-Scale Adaptive Semi-supervised Learning via Unified Inductive and Transductive Model*, KDD (2014) (ASL).

A ninth existing classification system and a tenth existing classification system generated pseudo-labels for unlabeled data using a set of weak annotators in semi-supervised learning. The ninth existing classification system used 10 weak annotators (ROSSEL10), and the tenth existing classification system used 50 weak annotators (ROSSEL50). The ninth system and tenth existing classification systems used the method described in Yan et al., *Robust Semi-Supervised Learning through Label Aggregation*, AAAI Conference on Artificial Intelligence (2016)(ROSSEL).

An eleventh existing classification system was an open source software that applied Bayesian optimization to simultaneously select a learning algorithm and set its hyperparameters automatically. The eleventh existing classification system used the method described in Jfeurer et al., *Efficient and Robust Automated Machine Learning*, Neural Information Processing Systems (NIPS) (2015)(Auto-sklearn).

A twelfth existing classification system leveraged a large margin separation method to build an automated learning system. The twelfth existing classification system used the method described in Li et al., *Towards Automated Semi-supervised Learning*, AAAI Conference on Artificial Intelligence (2019)(AutoSSL).

A thirteenth existing classification system used the method described in Zhang et al., *Prototype vector machine for large scale semi-supervised learning*, International Conference on Machine Learning (2009)(PVM).

A fourteenth existing classification system used the method described in Liu et al., *Large graph construction for scalable semisupervised learning*, International Conference on Machine Learning (2010)(LGC).

A fifteenth existing classification system used the method described in Wang et al., *Trend filtering on graphs*, Journal of Machine Learning Research (2016)(GTF).

A sixteenth existing classification system used the method described in Cong et al., *Learning with Inadequate and Incorrect Supervision*, International Conference on Data Mining (2017)(SIIS). The sixteenth existing classification system adapted fifteenth existing classification system to filter out initial noisy labels and then reconstruct the correct labels by emphasizing the leading eigenvectors of a Laplacian matrix associated with small eigenvalues.

A seventeenth existing classification system used the method described in Z. Zhang et al., *Robust Adaptive Embedded Label Propagation With Weight Learning for Inductive Classification*, IEEE Transactions on Neural Networks and Learning Systems (2018)(AELP-WL). AELP-WL integrates the robust adaptive embedded label propagation with adaptive weight learning.

Referring to FIGS. 11A through 11E, classification accuracy comparisons are shown computed using eight of the existing algorithms including classification model tuning application 422 with five datasets in accordance with an illustrative embodiment. For classification model tuning application 422, the hyperparameter ranges were selected as $\sigma$=[0.001; 10000; 1], $\lambda_1$=[0; 1; 0.01], and r=[1000; 3000; 100]. m=$0.2N_v$, t=0.02N, and penalty matrix G was defined as $$G = \begin{pmatrix} -1 & 1 & 0 & \ldots & 0 \\ \ldots & \ldots & \ldots & \ldots & \ldots \\ 0 & 0 & \ldots & -1 & 1 \end{pmatrix}$$

and had dimension (N−1)×N to provide a piecewise constant fit for the predicted labels. For ASSENT, $\lambda_2$=[0; 99] was used. A summary of each dataset is included in Table I below:

TABLE I

| Dataset | Training Size N | Test Size | Number of Variables $N_v$ | Number of classes c |
|---|---|---|---|---|
| $1^{st}$ | 800 | 280 | 856 | 9 |
| $2^{nd}$ | 2,559 | 627 | 180 | 3 |
| $3^{rd}$ | 420,000 | 111,920 | 47,236 | 40 |
| $4^{th}$ | 19,200 | 5,187 | 357 | 3 |
| $5^{th}$ | 8,000 | 2,000 | 126 | 3 |

Input classified dataset 124 included 5% of the dataset with 10% of input classified dataset 124 contaminated by noise. For training, input unclassified dataset 126 included 75% of the dataset indicated as the training size N, and the test dataset 20% of the dataset.

Figure 11A:
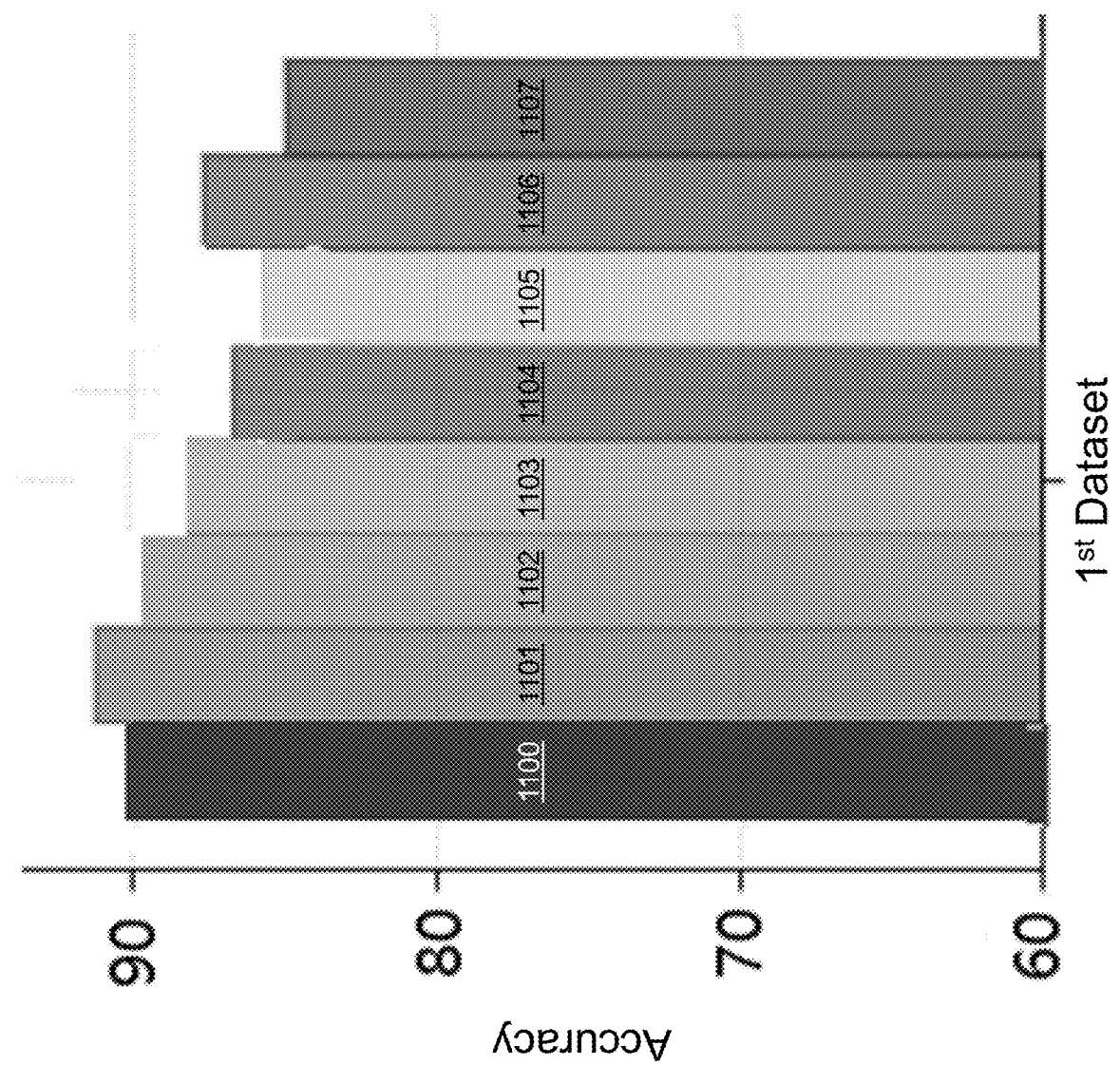
FIGS. 11A through 11E show classification accuracy comparisons computed using eight different algorithms including the classification application of the classification device of FIG. 1 with five datasets in accordance with an illustrative embodiment.

Referring to FIG. 11A, results using the first dataset are shown. A first histogram bar 1100 shows accuracy results using classification model tuning application 422. A second histogram bar 1101 shows accuracy results using ASSENT. A third histogram bar 1102 shows accuracy results using LSSC. A fourth histogram bar 1103 shows accuracy results using ROSSEL. A fifth histogram bar 1104 shows accuracy results using ASL. A sixth histogram bar 1105 shows accuracy results using meanS3 VM. A seventh histogram bar 1106 shows accuracy results using CS4 VM. An eighth histogram bar 1107 shows accuracy results using LapRLS. Classification model tuning application 422 and ASSENT achieved the highest accuracy.

Figure 11B:
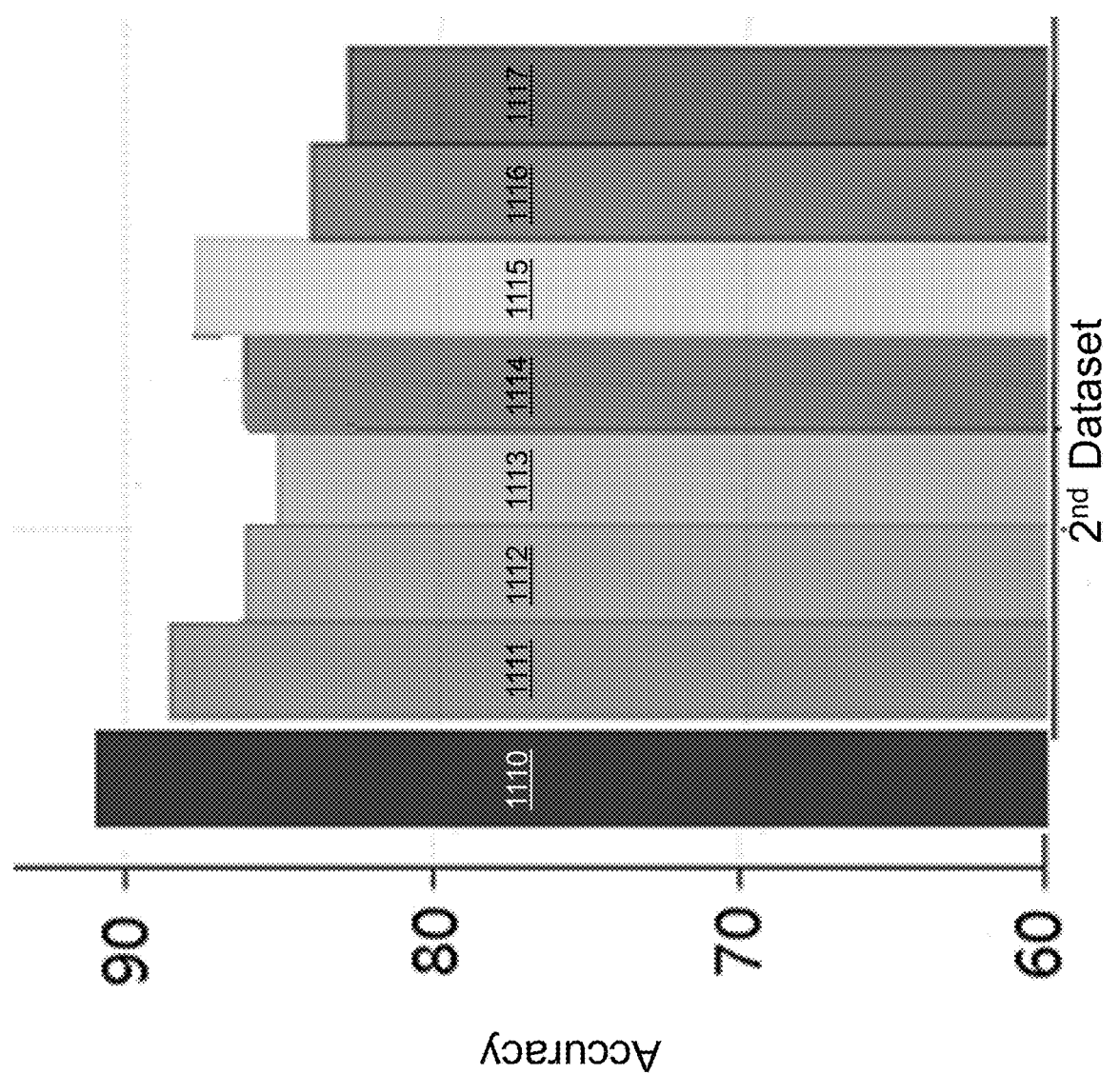

Referring to FIG. 11B, results using the second dataset are shown. A first histogram bar 1110 shows accuracy results using classification model tuning application 422. A second histogram bar 1111 shows accuracy results using ASSENT. A third histogram bar 1112 shows accuracy results using LSSC. A fourth histogram bar 1113 shows accuracy results using ROSSEL. A fifth histogram bar 1114 shows accuracy results using ASL. A sixth histogram bar 1115 shows accuracy results using meanS3 VM. A seventh histogram bar 1116 shows accuracy results using CS4 VM. An eighth histogram bar 1117 shows accuracy results using LapRLS. Classification model tuning application 422 achieved the highest accuracy due to use of the structural information from the penalty matrix G in noisy label reduction by penalizing the absolute differences in adjacent coordinates in genomic data.

Figure 11C:
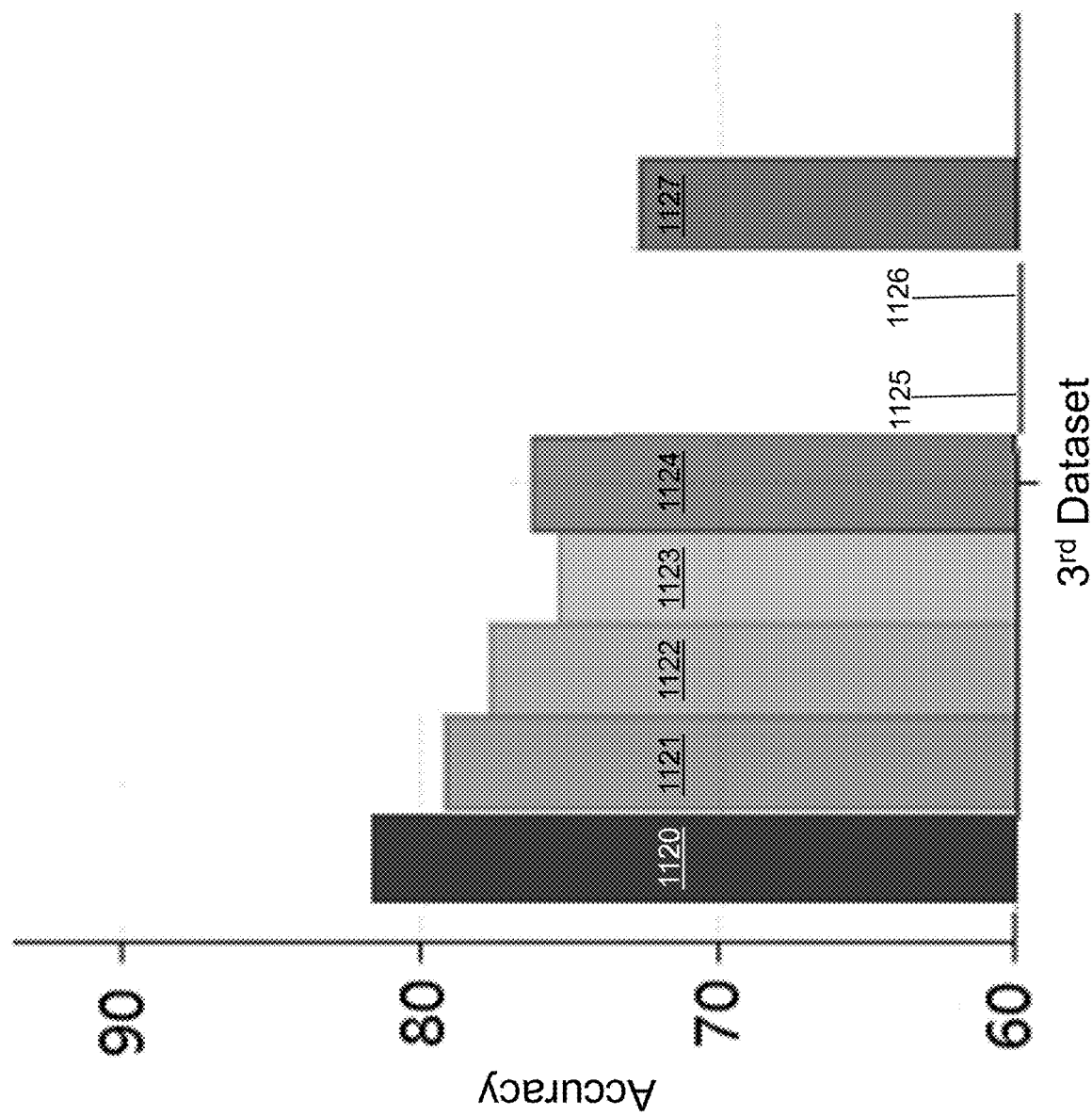

Referring to FIG. 11C, results using the third dataset are shown. A first histogram bar 1120 shows accuracy results using classification model tuning application 422. A second histogram bar 1121 shows accuracy results using ASSENT. A third histogram bar 1122 shows accuracy results using LSSC. A fourth histogram bar 1123 shows accuracy results using ROSSEL. A fifth histogram bar 1124 shows accuracy results using ASL. A sixth histogram bar 1125 shows accuracy results using meanS3 VM. A seventh histogram bar 1126 shows accuracy results using CS4 VM. An eighth histogram bar 1127 shows accuracy results using LapRLS. Classification model tuning application 422 achieved the highest accuracy. ASL and meanS3 VM failed either because too much memory was required or the computation time required more than a day.

Figure 11D:
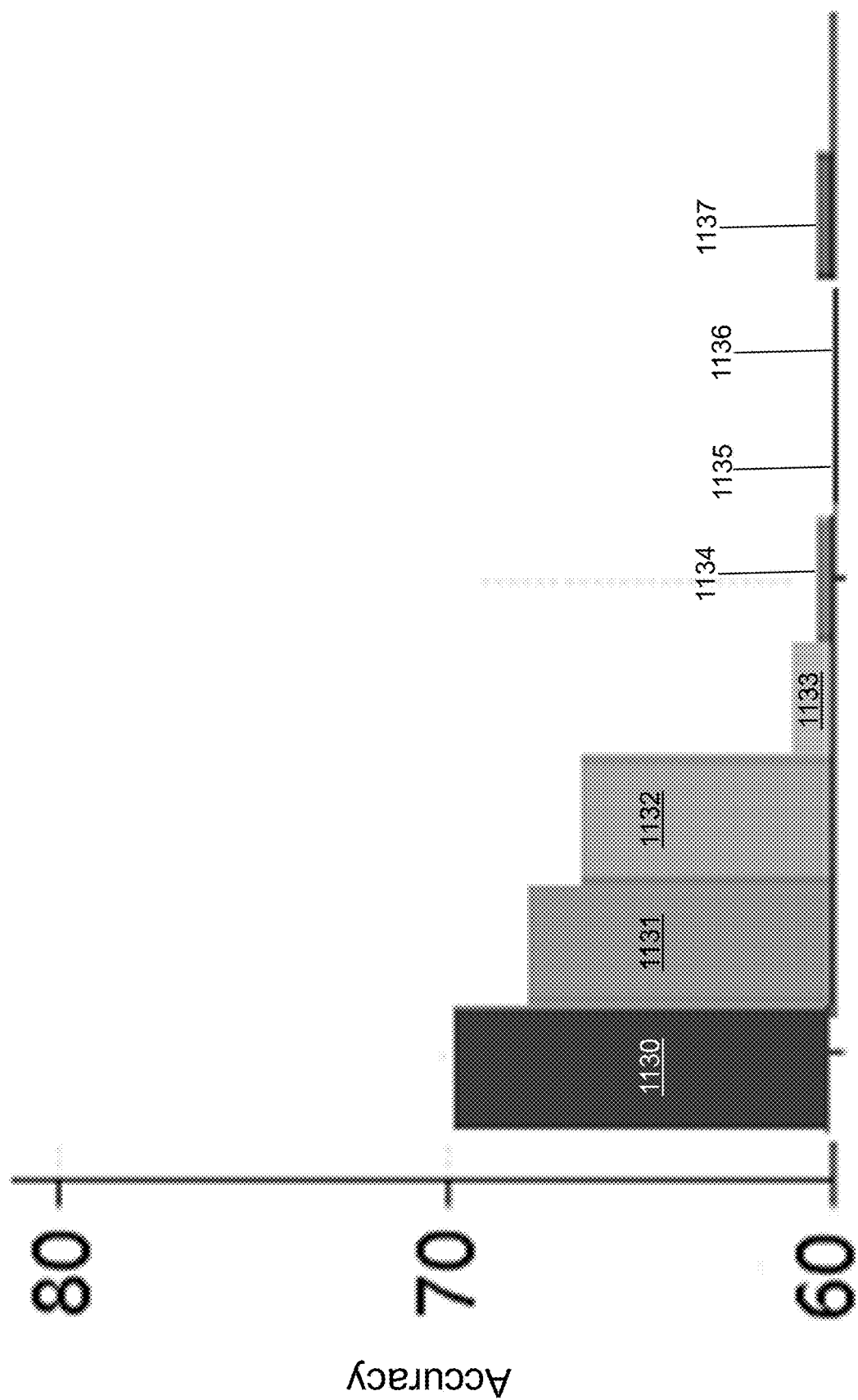

Referring to FIG. 11D, results using the fourth dataset are shown. A first histogram bar 1130 shows accuracy results using classification model tuning application 422. A second histogram bar 1131 shows accuracy results using ASSENT. A third histogram bar 1132 shows accuracy results using LSSC. A fourth histogram bar 1133 shows accuracy results using ROSSEL. A fifth histogram bar 1134 shows accuracy results using ASL. A sixth histogram bar 1135 shows accuracy results using meanS3 VM. A seventh histogram bar 1136 shows accuracy results using CS4 VM. An eighth histogram bar 1137 shows accuracy results using LapRLS. Classification model tuning application 422 achieved the highest accuracy. ASL and meanS3 VM failed either because too much memory was required or the computation time required more than a day.

Figure 11E:
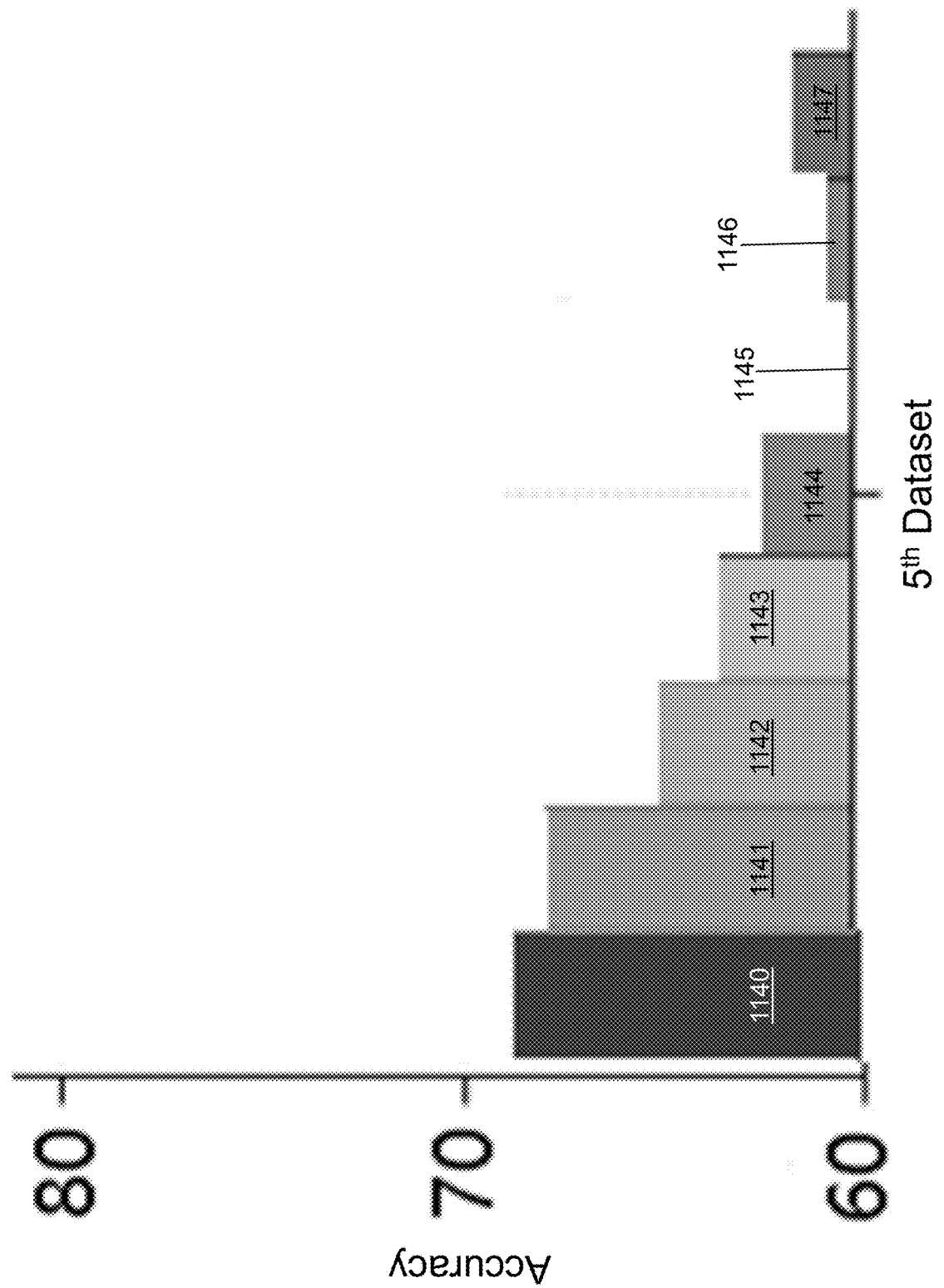

Referring to FIG. 11E, results using the fifth dataset are shown. A first histogram bar 1140 shows accuracy results using classification model tuning application 422. A second histogram bar 1141 shows accuracy results using ASSENT. A third histogram bar 1142 shows accuracy results using LSSC. A fourth histogram bar 1143 shows accuracy results using ROSSEL. A fifth histogram bar 1144 shows accuracy results using ASL. A sixth histogram bar 1145 shows accuracy results using meanS3 VM. A seventh histogram bar 1146 shows accuracy results using CS4 VM. An eighth histogram bar 1147 shows accuracy results using LapRLS. Classification model tuning application 422 achieved the highest accuracy. ASL failed either because too much memory was required or the computation time required more than a day.

Referring to FIGS. 12A and 12B, a first classification accuracy table 1200 and a second classification accuracy table 12002 are shown for thirteen different algorithms with seven datasets that include the datasets of Table I in addition to two additional datasets summarized in Table II below:

TABLE II

| Dataset | Training Size N | Test Size | Number of Variables $N_v$ | Number of classes c |
|---|---|---|---|---|
| $6^{th}$ | 30 | 530 | 18 | 2 |
| $7^{th}$ | 12,384 | 3,114 | 47,236 | 40 |

For classification model tuning application 422, the hyperparameter ranges were selected as σ=[0.001; 10000; 1], $\lambda_1$=[0; 1; 0.01], and r=[1000; 3000; 100]. m=0.2$N_v$ and t=0.02N. Penalty matrix G was defined as $$G = \begin{pmatrix} -1 & 1 & 0 & \ldots & 0 \\ \ldots & \ldots & \ldots & \ldots & \ldots \\ 0 & 0 & \ldots & -1 & 1 \end{pmatrix}$$

and had dimension (N−1)×N. For ASSENT, $\lambda_2$=[0; 99] was used.

Input classified dataset 124 included 5% of the dataset with 5% of input classified dataset 124 contaminated by noise. For training, input unclassified dataset 126 included 75% of the dataset indicated as the training size N, and the test dataset 20% of the dataset. Either classification model tuning application 422 or ASSENT achieved the highest accuracy in all seven cases. The accuracy was averaged over 20 runs. The standard deviation shown in parentheses was computed over the 20 runs. A "*" in a column indicates the algorithm failed because too much memory was required, and a "-" in a column indicates the algorithm failed because the computation time required more than a day.

Figure 13:
FIG. 13 shows a classification accuracy table computed using nine different algorithms with two additional datasets and different levels of noisy labels in accordance with an illustrative embodiment.

Referring to FIG. 13, a third classification accuracy table 1300 is shown computed using nine different algorithms with two additional datasets and different levels of noisy labels in accordance with an illustrative embodiment. An eighth dataset included 70,000 images of handwritten digit images with $N_v=784$ and $c=10$. Input classified dataset 124 included 100 images. A ninth dataset included 269,000 images of nature with $N_v=1500$ and $c=81$. Input classified dataset 124 included 100 images. Three noise level of 0%, 15% and 30% were used.

For classification model tuning application 422, the hyperparameter ranges were selected as σ=[0.001; 10000; 1], $\lambda_1$=[0; 1; 0.01], and r=[1000; 3000; 100]. m=18 and t=5000. Penalty matrix G was defined using a k-nearest neighbor method with the number of nearest neighbor k=6. For ASSENT, $\lambda_2$=[0; 99] was used. Specifically, if the $j^{th}$ image belonged to the set of the k-nearest neighbors of the $i^{th}$ image, $G(i,i)=1$, $G(i,j)=-1$; otherwise, $G(i,j)=0$.

The classification results input unclassified dataset 126 were averaged over 10 partitions of each dataset and reported for overall performance evaluation. Since for the ninth dataset, a labeled image can have multiple labels as it belongs to multiple classes, a mean average precision was selected as the metric to measure classification accuracy.

Classification model tuning application 422 achieved the best accuracy in the presence of noisy labels demonstrating its effectiveness and robustness for large scale image classification. The performance margin increased with the higher level of label noise indicating that classification model tuning application 422 performs robustly to label noise due to the smoothing effect from the penalty matrix G. Classification model tuning application 422 achieved 4.3% and 3.3% better performance compared to the second-best competing method for both the eight dataset and the tenth dataset in the presence of 30% noisy labels.

Figure 14:
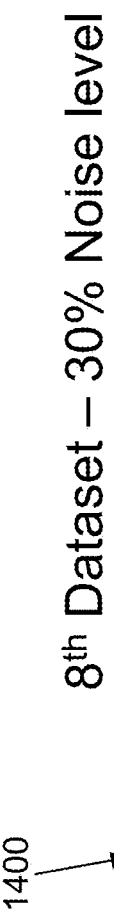
FIG. 14 shows a classification accuracy computed using the nine different algorithms with a 30% noise level and the eighth dataset of FIG. 13 and an associated execution time determined for executing the nine different algorithms in accordance with an illustrative embodiment.

Referring to FIG. 14, a results table 1400 includes the classification accuracy of FIG. 13 at the 30% noise level using the eighth dataset and an associated execution time determined for each of the the nine different algorithms in accordance with an illustrative embodiment. The execution time was evaluated on a 3.60 gigahertz, 32 gigabyte RAM Core 2 Duo PC 315 using the C Programming language. Classification model tuning application 422 consumed 61.6 seconds on average. A significant part of the execution time for classification model tuning application 422 was due to the iterative automatic tuning process. Future work will consider the sparsity of the penalty matrix and take advantage of sparse matrix libraries to further increase the computational speed.

Referring to FIG. 15, a fourth classification accuracy table 1500 is shown computed using five of the nine different algorithms with a 30% noise level and the eighth dataset for six different numbers of clusters t in accordance with an illustrative embodiment. Again, classification model tuning application 422 achieved the best accuracy for all values of the numbers of clusters t.

Referring to FIG. 16, a fifth classification accuracy table 1600 is shown computed using the nine different algorithms of FIG. 13 with a tenth dataset with different levels of noisy labels in accordance with an illustrative embodiment. The tenth dataset included of 60,000 32×32 images in 10 classes, where each class included 6000 images. 50,000 images were used for training and the remainder were used for testing. 300 images were labeled. For classification model tuning application 422, the hyperparameter ranges were selected as σ=[0.001; 10000; 1], $\lambda_1$=[0; 1; 0.01], and r=[1000; 3000; 100]. m=18 and t=5000. Penalty matrix G was defined using a k-nearest neighbor method with the number of nearest neighbor k=6. For ASSENT, $\lambda_2$=[0; 99] was used. Either ASSENT or classification model tuning application 422 consistently achieved the highest accuracy. In particular, when the noise level was less than or equal to 5%, ASSENT performed the best as it effectively captured the correlation between variables while classification model tuning application 422 performed the second best. Classification model tuning application 422 performed best when the noise level was greater than 5% due to its stronger smoothing effects for denoising. The performance improvement increased with the noise level again demonstrating the robustness of classification model tuning application 422 in the presence of noisy labels.

Table III below shows a comparison in complexity of eight different existing algorithms and classification model tuning application 422 with rank(E) G and with rank(E)=1.

TABLE III

| Method | Complexity |
| --- | --- |
| LapSVM | $O(N^3N_v)$ |
| LapRLS | $O(N^3N_v)$ |
| meanS3VM | $O(N^2N_vT)$ |
| CS4VM | $O(N^2N_vT)$ |
| ASL | $O(N^2N_vT)$ |
| ROSSEL | $O(MN^2N_v)$ |
| LSSC | $O((t^2 + T)N)$ |
| ASSENT | $O((t^2 + T)N)$ |
| App 422 rank(E) = $\ell$ | $O(t^2N + T\ell + m^3)$ |
| App 422 rank(E) < $\ell$ | $O(t^2N + m\ell^2 + m^2T)$ |

M is a number of the weak annotators, and T is a number of iterations of the algorithm. The remaining parameters are as defined above. The complexity of classification application 122 and classification model tuning application 422 is dominated by two parameters, the number of clusters t and the number of eigenvectors m, where both are much smaller than N resulting in a less complex model.

As discussed above, classification application 122 and classification model tuning application 422 provide a considerable improvement in accuracy over state-of-the-art approaches applied to both benchmark datasets and real-world datasets, especially when the noise level for labeled data is greater than 5%. Classification model tuning application 422 exploits distributed computing resources for scalability to big data. In addition, classification application 122 and classification model tuning application 422 have a linear time and space complexity with respect to the number of observations, which enhances the scalability to large datasets.

By integrating generalized Lasso into the graph Laplacian regularization, classification application 122 and classification model tuning application 422 provide superior performance over state-of the-art approaches when applied to multiple benchmark datasets and large-scale image classification with various levels of noisy labels.

The explosion of digital data is generating many opportunities for big data analytics, which in turn provides many opportunities for tuning classification models to capitalize on the information contained in the data—to make better predictions that lead to better decisions. Distributed classification system 300 support better decision making by providing a system that can identify and evaluate many more hyperparameter configurations in parallel by allocating the computing devices of worker system 306 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) compute a weight matrix using a kernel function applied to a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;
   (B) perform a decomposition to define a first decomposition matrix that includes first eigenvectors of the computed weight matrix, a second decomposition matrix that includes second eigenvectors of a transpose of the computed weight matrix, and a diagonal matrix that includes eigenvalues of the first eigenvectors;
   (C) select a predefined number of eigenvectors from the first eigenvectors to define a reduced decomposition matrix, wherein the predefined number of eigenvectors have largest eigenvalues relative to other of the first eigenvectors not selected;
   (D) compute a linear transformation matrix as a function of the defined first decomposition matrix, the defined reduced decomposition matrix, the defined diagonal matrix, and a predefined penalty matrix;
   (E) when a rank of the computed linear transformation matrix is less than a number of rows of the predefined penalty matrix, compute a classification matrix by updating a gradient of a cost function defined from the plurality of observation vectors based on the target variable value;
   (F) when the rank of the computed linear transformation matrix is equal to the number of rows of the predefined penalty matrix, compute the classification matrix using a dual formulation based on the computed linear transformation matrix;
   (G) determine the target variable value for each observation vector of the plurality of unclassified observation vectors based on the computed classification matrix; and
   (H) output the target variable value for each observation vector of the plurality of unclassified observation vectors, wherein the target variable value selected for each observation vector of the plurality of unclassified observation vectors is defined to represent the label for a respective unclassified observation vector.

2. The non-transitory computer-readable medium of claim 1, wherein the plurality of unclassified observation vectors is distributed across a plurality of computing devices and the plurality of classified observation vectors are stored on each computing device of the plurality of computing devices, wherein the computing device is one of the plurality of computing devices,
   wherein (A) through (G) are performed on each computing device of the plurality of computing devices using the plurality of unclassified observation vectors distributed to each respective computing device and the plurality of classified observation vectors.

3. The non-transitory computer-readable medium of claim 1, wherein the decomposition of the computed weight matrix computes $V\Sigma U^T$, where V is the defined first decomposition matrix and each column of V is an eigenvector of the first eigenvectors, $\Sigma$ is the defined diagonal matrix whose diagonal entries are the eigenvalues of the first eigenvectors, U is the defined second decomposition matrix, each column of U is an eigenvector of the second eigenvectors, and T indicates a transpose.

4. The non-transitory computer-readable medium of claim 1, wherein the linear transformation matrix is computed using $E=G\Sigma^{0.5}V^T V_m$, where E is the linear transformation matrix, G is the predefined penalty matrix, $\Sigma$ is the defined diagonal matrix, V is the defined first decomposition matrix, $V_m$ is the defined reduced decomposition matrix, and T indicates a transpose.

5. The non-transitory computer-readable medium of claim 1, wherein computing the weight matrix comprises:
   computing a kernel matrix using the kernel function and the plurality of observation vectors; and
   computing a second diagonal matrix by summing each row of the computed kernel matrix, wherein the sum of each row is stored in a diagonal of a respective row with zeroes in remaining positions of the respective row;
   wherein the weight matrix is computed using the kernel matrix and the second diagonal matrix.

6. The non-transitory computer-readable medium of claim 5, wherein the weight matrix is computed using $W=ZD^{-0.5}D^{-0.5}Z^T$, where W is the weight matrix, D is the computed second diagonal matrix, Z is the computed kernel matrix, and T indicates a transpose.

7. The non-transitory computer-readable medium of claim 6, wherein the kernel matrix is computed using $$z_{ij} = \frac{\exp\left(\frac{-\|x_i - u_j\|^2}{2\sigma^2}\right)}{\sum_{k \in N_r(i)} \exp\left(\frac{-\|x_i - u_k\|^2}{2\sigma^2}\right)}, i = 1, 2, \ldots, N \text{ and}$$

$$j = 1, 2, \ldots, t,$$

where $z_{ij}$ is an $i,j^{th}$ entry of the kernel matrix, a is a predefined kernel parameter value, $x_i$ is an $i^{th}$ observation vector of the plurality of observation vectors, r is a predefined number of nearest cluster centers, $N_r(i)$ is an index to a nearest cluster center to $x_i$ of the predefined number of nearest cluster centers, t is a predefined number of cluster centers, $u_j$ is a $j^{th}$ cluster center selected from the t cluster centers, $u_k$ is a $k^{th}$ cluster center selected from the t cluster centers, and N is a number of the plurality of observation vectors.

8. The non-transitory computer-readable medium of claim 7, wherein the predefined number of cluster centers are determined using a k-means clustering algorithm to define the t cluster centers.

9. The non-transitory computer-readable medium of claim 1, wherein the predefined penalty matrix is defined using a k-nearest neighbor algorithm, where k is a predefined number of nearest neighbors to identify using the k-nearest neighbor algorithm.

10. The non-transitory computer-readable medium of claim 9, wherein, when a $j^{th}$ observation vector of the plurality of observation vectors is one of the k nearest neighbors of an $i^{th}$ observation vector of the plurality of observation vectors, $G(i,j)=-1$; otherwise, $G(i,j)=0$, $i=1, 2, \ldots, N$, $j=1, 2, \ldots, N$, $i \neq j$, and $G(i,i)=1$, $i=1, 2, \ldots, N$, where G is the predefined penalty matrix, and N is a number of the plurality of observation vectors.

11. The non-transitory computer-readable medium of claim 1, wherein computing the classification matrix in (E) comprises:
(I) computing the gradient as a function of the defined reduced decomposition matrix, a plurality of sparse coefficients, and a label vector defined for the plurality of observation vectors using the target variable value of each observation vector of the plurality of observation vectors;
(J) updating a value of each coefficient of the plurality of sparse coefficients based on the computed gradient; and
(K) repeating (I) and (J) until a convergence parameter value indicates the plurality of sparse coefficients have converged;
wherein the classification matrix is computed using the converged plurality of sparse coefficients and the defined reduced decomposition matrix.

12. The non-transitory computer-readable medium of claim 11, wherein the gradient is an m×1 vector for a binary target variable value, where m is the predefined number of eigenvectors.

13. The non-transitory computer-readable medium of claim 11, wherein the gradient is an m×c matrix for a target variable value having c possible label values, where m is the predefined number of eigenvectors.

14. The non-transitory computer-readable medium of claim 11, wherein the classification matrix is computed using $F=V_m \tilde{E}^{-1} \theta$, where F is the classification matrix, $V_m$ is the defined reduced decomposition matrix, $\tilde{E}=[E,A]^T$, E is the computed linear transformation matrix, $rank(\tilde{E})=m$, A is an (m−l)×m matrix whose rows are orthogonal to those in E, m is the predefined number of eigenvectors, l is the number of rows of the predefined penalty matrix, θ is the plurality of sparse coefficients, and T indicates a transpose.

15. The non-transitory computer-readable medium of claim 14, wherein computing the gradient comprises:
rearranging $V_m \tilde{E}^{-1}$ to define a first matrix and a second matrix using $[V_1, V_2] = V_m \tilde{E}^{-1}$, where $V_1$ is the first matrix and has dimension N×l, $V_2$ is the second matrix and has dimension N×(m−l), and N is a number of the plurality of observation vectors,
wherein the gradient is computed using $\nabla_\theta J_1(\theta) = ((I-P)V_1)^T((I-P)Y-(I-P)V_1\theta)$, where $\nabla_\theta J_1(\theta)$ is the gradient, I is an identity matrix having dimension (m−l)×(m−l) $P=V_2^T(V_2^T V_2)^{-1} V_2$, and Y is the label vector.

16. The non-transitory computer-readable medium of claim 15, wherein, after (E), before (G), and when the rank of the computed linear transformation matrix is less than the number of rows of the predefined penalty matrix, the computer-readable instructions further cause the computing device to:
(L) compute a loss value using the computed classification matrix;
(M) define the label vector from the computed classification matrix;
(N) store the computed loss value and the defined label vector in association with a value for a hyperparameter used in computing the classification matrix;
(O) repeat (A) through (N) with a plurality of different values for the hyperparameter;
select an optimum value for the hyperparameter as the value of the hyperparameter stored with an extremum value of the computed loss value relative to other computed loss values; and
output the selected optimum value for the hyperparameter,
wherein the target variable value output for each observation vector of the plurality of unclassified observation vectors in (H) is selected from the defined label vector stored with the selected optimum value for the hyperparameter.

17. The non-transitory computer-readable medium of claim 16, wherein the loss value is computed using $C_{sw}=0.5\|(I-P)Y-(I-P)V_1\theta\|_2^2 + \lambda_1 \|\theta\|_1$, where $C_{sw}$ is the loss value, and $\lambda_1$ is a predefined regularization parameter.

18. The non-transitory computer-readable medium of claim 16, wherein the hyperparameter is at least one of the predefined number of eigenvectors, a regularization parameter used to compute the classification matrix, a predefined number of nearest neighbors used to compute the predefined penalty matrix, a kernel parameter used to compute the weight matrix, a number of nearest cluster centers used to compute the weight matrix, and a number of cluster centers used to compute the weight matrix.

19. The non-transitory computer-readable medium of claim 16, wherein the plurality of unclassified observation vectors is distributed across a plurality of computing devices and the plurality of classified observation vectors are stored on each computing device of the plurality of computing devices,
wherein (A) through (M) are performed on each computing device of the plurality of computing devices using the plurality of unclassified observation vectors distributed to each respective computing device and the plurality of classified observation vectors,
wherein, before (N), the computer-readable instructions further cause the computing device to
(P) compute a total loss value from the loss value computed by each computing device of the plurality of computing devices; and
(Q) define a total label vector from the label vector defined by each computing device of the plurality of computing devices;
wherein the computed loss value and the defined label vector stored in (N) are the computed total loss value and the defined total label vector, respectively, wherein (P) and (Q) are further repeated in (O).

20. The non-transitory computer-readable medium of claim 16, wherein the plurality of observation vectors is stored on each computing device of a plurality of computing devices,
wherein in (O), each computing device of the plurality of computing devices is assigned a different value of the plurality of different values for the hyperparameter and repeats (A) through (N) using the plurality of observation vectors.

21. The non-transitory computer-readable medium of claim 1, wherein computing the classification matrix in (F) comprises:
computing an estimated label vector defined using the target variable value of each observation vector of the plurality of observation vectors and the defined reduced decomposition matrix;
computing an initial classification matrix using the computed linear transformation matrix and the defined reduced decomposition matrix;
(I) solving for a dual vector using an interior point method, the computed initial classification matrix, and a plurality of sparse coefficients;
(J) computing a value of each coefficient of the plurality of sparse coefficients using the dual vector and the computed estimated label vector; and
(K) repeating (I) and (J) until a convergence parameter value indicates the plurality of sparse coefficients have converged;
wherein the classification matrix is computed using the converged plurality of sparse coefficients and the defined reduced decomposition matrix.

22. The non-transitory computer-readable medium of claim 21, wherein the classification matrix is defined using $F=V_m \alpha_{\lambda_1}$, where F is the classification matrix, $V_m$ is the defined reduced decomposition matrix, and $\alpha_{\lambda_1}$ is the plurality of sparse coefficients.

23. The non-transitory computer-readable medium of claim 22, wherein, after (F), before (G), and when the rank of the computed linear transformation matrix equals the number of rows of the predefined penalty matrix, the computer-readable instructions further cause the computing device to:
(L) compute a loss value using the computed classification matrix;
(M) define the label vector from the computed classification matrix;
(N) store the computed loss value and the defined label vector in association with a value for a hyperparameter used in computing the classification matrix;
(O) repeat (A) through (N) with a plurality of different values for the hyperparameter;
select an optimum value for the hyperparameter as the value of the hyperparameter stored with an extremum value of the computed loss value relative to other computed loss values; and
output the selected optimum value for the hyperparameter,
wherein the target variable value output for each observation vector of the plurality of unclassified observation vectors in (H) is selected from the defined label vector stored with the selected optimum value for the hyperparameter.

24. The non-transitory computer-readable medium of claim 23, wherein the loss value is computed using $C_{sw}=0.5\|V_m \alpha_{80_1}-Y\|_2^2+\lambda_1\|E\alpha_{\lambda_1}\|_1$, where Y is the label vector, $\lambda_1$ is a predefined regularization parameter, and E is the computed linear transformation matrix.

25. The non-transitory computer-readable medium of claim 23, wherein the plurality of unclassified observation vectors is distributed across a plurality of computing devices and the plurality of classified observation vectors are stored on each computing device of the plurality of computing devices,
wherein (A) through (M) are performed on each computing device of the plurality of computing devices using the plurality of unclassified observation vectors distributed to each respective computing device and the plurality of classified observation vectors,
wherein, before (N), the computer-readable instructions further cause the computing device to
(P) compute a total loss value from the loss value computed by each computing device of the plurality of computing devices; and
(Q) define a total label vector from the label vector defined by each computing device of the plurality of computing devices;
wherein the computed loss value and the defined label vector stored in (N) are the computed total loss value and the defined total label vector, respectively,
wherein (P) and (Q) are further repeated in (O).

26. The non-transitory computer-readable medium of claim 21, wherein the estimated label vector is computed using $\tilde{Y}=V_m(V_m^T V_m)^{-1}V_m^T Y$, $\tilde{Y}$ is the estimated label vector, $V_m$ is the defined reduced decomposition matrix, T indicates a transpose, and Y indicates a label vector defined for the plurality of observation vectors using the target variable value of each observation vector of the plurality of observation vectors.

27. The non-transitory computer-readable medium of claim 21, wherein the initial classification matrix is computed using $F=E(V_m^T V_m)^{-1}V_m^T$, where F is the initial classification matrix, E is the computed linear transformation matrix, $V_m$ is the defined reduced decomposition matrix, and T indicates a transpose.

28. The non-transitory computer-readable medium of claim 21, wherein the value of each coefficient of the plurality of sparse coefficients is computed using $\alpha_{\lambda_j}=(V_m^T V_m)^{-1}V_m^T(\tilde{Y}-F_T\hat{u}_\lambda)$ where $\alpha_{\lambda_1}$ is a sparse coefficient vector having dimension m, m is the predefined number of eigenvectors, $V_m$ is the defined reduced decomposition matrix, $\tilde{Y}$ is the estimated label vector, F is the initial classification matrix, $\hat{u}_\lambda$ is the dual vector, and T indicates a transpose.

29. A computing device comprising:
a processor; and
a computer-readable medium operably coupled to the processor, the computer-readable medium having computer-readable instructions stored thereon that, when executed by the processor, cause the computing device to
(A) compute a weight matrix using a kernel function applied to a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;

(B) perform a decomposition to define a first decomposition matrix that includes first eigenvectors of the computed weight matrix, a second decomposition matrix that includes second eigenvectors of a transpose of the computed weight matrix, and a diagonal matrix that includes eigenvalues of the first eigenvectors;

(C) select a predefined number of eigenvectors from the first eigenvectors to define a reduced decomposition matrix, wherein the predefined number of eigenvectors have largest eigenvalues relative to other of the first eigenvectors not selected;

(D) compute a linear transformation matrix as a function of the defined first decomposition matrix, the defined reduced decomposition matrix, the defined diagonal matrix, and a predefined penalty matrix;

(E) when a rank of the computed linear transformation matrix is less than a number of rows of the predefined penalty matrix, compute a classification matrix by updating a gradient of a cost function defined from the plurality of observation vectors based on the target variable value;

(F) when the rank of the computed linear transformation matrix is equal to the number of rows of the predefined penalty matrix, compute the classification matrix using a dual formulation based on the computed linear transformation matrix;

(G) determine the target variable value for each observation vector of the plurality of unclassified observation vectors based on the computed classification matrix; and (H) output the target variable value for each observation vector of the plurality of unclassified observation vectors, wherein the target variable value selected for each observation vector of the plurality of unclassified observation vectors is defined to represent the label for a respective unclassified observation vector.

30. A method of classifying data using semi-supervised data, the method comprising:

(A) computing by a computing device, a weight matrix using a kernel function applied to a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;

(B) performing by the computing device, a decomposition to define a first decomposition matrix that includes first eigenvectors of the computed weight matrix, a second decomposition matrix that includes second eigenvectors of a transpose of the computed weight matrix, and a diagonal matrix that includes eigenvalues of the first eigenvectors;

(C) selecting by the computing device, a predefined number of eigenvectors from the first eigenvectors to define a reduced decomposition matrix, wherein the predefined number of eigenvectors have largest eigenvalues relative to other of the first eigenvectors not selected;

(D) computing by the computing device, a linear transformation matrix as a function of the defined first decomposition matrix, the defined reduced decomposition matrix, the defined diagonal matrix, and a predefined penalty matrix;

(E) when a rank of the computed linear transformation matrix is less than a number of rows of the predefined penalty matrix, computing by the computing device, a classification matrix by updating a gradient of a cost function defined from the plurality of observation vectors based on the target variable value;

(F) when the rank of the computed linear transformation matrix is equal to the number of rows of the predefined penalty matrix, computing by the computing device, the classification matrix using a dual formulation based on the computed linear transformation matrix;

(G) determining by the computing device, the target variable value for each observation vector of the plurality of unclassified observation vectors based on the computed classification matrix; and (H) outputting by the computing device, the target variable value for each observation vector of the plurality of unclassified observation vectors, wherein the target variable value selected for each observation vector of the plurality of unclassified observation vectors is defined to represent the label for a respective unclassified observation vector.

* * * * *

UNITED STATES PATENT AND TRADEMARK OFFICE
CERTIFICATE OF CORRECTION

PATENT NO. : 11,010,691 B1  
APPLICATION NO. : 17/093917  
DATED : May 18, 2021  
INVENTOR(S) : Xu Chen et al.

Page 1 of 5

It is certified that error appears in the above-identified patent and that said Letters Patent is hereby corrected as shown below:

In the Specification

Column 14, Line 48:
Delete the phrase "$J(f) = 0.5\|F - Y\|_2^2 + \lambda_1\|G\Sigma^{0.5}V^T F\|_1$." and replace with
-- $J(f) = 0.5\|F - Y\|_2^2 + \lambda_1\|G\Sigma^{0.5}V^T F\|_1$ --.

Column 14, Lines 53-54:
Delete the phrase
"$J(\alpha) = 0.5\|V_m\alpha - Y\|_2^2 + \lambda_1\|G\Sigma^{0.5}V^T V_m\alpha\|_1 = 0.5\|V_m\alpha - Y\|_2^2 + \lambda_1\|E\alpha\|_1$." and replace with
-- $J(\alpha) = 0.5\|V_m\alpha - Y\|_2^2 + \lambda_1\|G\Sigma^{0.5}V^T V_m\alpha\|_1 = 0.5\|V_m\alpha - Y\|_2^2 + \lambda_1\|E\alpha\|_1$ --.

Column 14, Lines 60-61:
Delete the phrase "$\bar{\theta}^{m\times1} = \left[\theta^{\ell\times1}, \theta_2^{(m-\ell)\times1}\right] = \tilde{\Sigma}\alpha$" and replace with
-- $\bar{\theta}^{m\times1} = \left[\theta^{\ell\times1}, \theta_2^{(m-\ell)\times1}\right] = \tilde{E}\alpha$ --.

Column 15, Line 4:
Delete the phrase "$\theta_2 = (V_2^T V_2)^{-1} V_2^T (Y - V_1\theta)$" and replace with -- $\theta_2 = (V_2^T V_2)^{-1} V_2^T (Y - V_1\theta)$ --.

Column 15, Line 5:
Delete the phrase "$P = V_2^T (V_2^T V_2)^{-1} V_2$" and replace with -- $P = V_2^T (V_2^T V_2)^{-1} V_2$ --.

Column 15, Line 27:
Delete the phrase "$L(\alpha, u, z) = 0.5\|V_m\alpha - Y\|_2^2 + \lambda_1\|z\|_1 + u^T(E\alpha - z)$" and replace with
-- $L(\alpha, u, z) = 0.5\|V_m\alpha - Y\|_2^2 + \lambda_1\|z\|_1 + u^T(E\alpha - z)$ --.

Column 15, Line 35:

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*

Delete the phrase "$\tilde{Y} = V_m(V_m^TV_m)^{-1}V_m^TY, F = E(V_m^TV_m)^{-1}V_m^T$," and replace with
--$\tilde{Y} = V_m(V_m^TV_m)^{-1}V_m^TY, F = E(V_m^TV_m)^{-1}V_m^T$,--.

Column 15, Line 54:
Delete the phrase "$\zeta(\lambda \hat{u}_\lambda \|_\infty - \lambda_1) = 0$," and replace with --$\zeta(\|\hat{u}_\lambda\|_\infty - \lambda_1) = 0$,--.

Column 15, Line 62:
Delete the phrase "$\lambda_1$, if $(F\alpha_{\lambda_1} > 0$," and replace with --$\lambda_1$, if $(F\alpha_{\lambda_1})_i > 0$--.

Column 16, Line 9:
Delete the phrase "$J(\alpha) = 0.5\|V_m\alpha - Y\|_2^2 + \lambda_1\|E\alpha\|_1$." and replace with
--$J(\alpha) = 0.5\|V_m\alpha - Y\|_2^2 + \lambda_1\|E\alpha\|_1$.--.

Column 16, Line 26:
Delete the phrase "$P = V_2^T(V_2^TV_2)^{-1}V_2$," and replace with --$P = V_2^T(V_2^TV_2)^{-1}V_2$,--.

Column 17, Line 41-42:
Delete the phrase "$\tilde{Y} = V_m(V_m^TV_m)^{-1}V_m^TY$." and replace with --$\tilde{Y} = V_m(V_m^TV_m)^{-1}V_m^TY$.--.

Column 17, Line 44:
Delete the phrase "$F = E(V_m^TV_m)^{-1}V_m^T$." and replace with --$F = E(V_m^TV_m)^{-1}V_m^T$.--.

Column 17, Lines 61-62:
Delete the phrase "$\alpha_{\lambda_1} = (V_m^TV_m)^{-1}V_m^T(\tilde{Y} - F^T\hat{u}_{\lambda_1})$." and replace with
--$\alpha_{\lambda_1} = (V_m^TV_m)^{-1}V_m^T(\tilde{Y} - F^T\hat{u}_{\lambda_1})$.--.

Column 18, Line 9:
Delete the phrase "$F = V_m\alpha_{\lambda 1}$," and replace with --$F = V_m\alpha_{\lambda_1}$,--.

Column 25, Lines 31-33:
Delete the phrase "For example, one or more values for a may be received. Alternatively, one or more default values for a may be stored," and replace with --For example, one or more values for $\sigma$ may be received. Alternatively, one or more default values for $\sigma$ may be stored,--.

Column 29, Line 3:
Delete the phrase "Gaussian bandwidth parameter a," and replace with --Gaussian bandwidth parameter $\sigma$,--.

Column 30, Line 28:
Delete the phrase "a number of search centers n," and replace with --a number of search centers $n_c$--.

Column 30, Line 34:

CERTIFICATE OF CORRECTION (continued)

Delete the phrase "center list includes n," and replace with --center list includes $n_c$--.

Column 32, Line 9:
Delete the phrase "a Gust function value" and replace with --a cost function value--.

Column 32, Line 16:
Delete the phrase "$C(q_b) < C(p) - \beta \Delta_p^2$," and replace with --$C(q_b) < C(p) - \beta \Delta_p^2$,--.

Column 32, Line 18:
Delete the phrase "$C(q_b) < C(p) - \beta \Delta_p^2$," and replace with --$C(q_b) < C(p) - \beta \Delta_p^2$,--.

Column 32, Line 19:
Delete the phrase "$C(q_b) < C(p) - \beta \Delta_p^2$," and replace with --$C(q_b) < C(p) - \beta \Delta_p^2$,--.

Column 32, Line 46:
Delete the phrase "$\{\sigma^o, m^o, \lambda_1^o, k^o, t^o, r^o\}$" and replace with --$\{\sigma^o, m^o, \lambda_1^o, k^o, t^o, r^o\}$--.

Column 32, Line 51:
Delete the phrase "$\{\sigma^o, m^o, \lambda_1^o, k^o, t^o, r^o\}$" and replace with --$\{\sigma^o, m^o, \lambda_1^o, k^o, t^o, r^o\}$--.

Column 32, Line 61:
Delete the phrase "$\{\sigma^o, m^o, \lambda_1^o, k^o, t^o, r^o\}$" and replace with --$\{\sigma^o, m^o, \lambda_1^o, k^o, t^o, r^o\}$--.

Column 32, Line 67 and Column 33, Line 1:
Delete the phrase "$\{\sigma^o, m^o, \lambda_1^o, k^o, t^o, r^o\}$" and replace with --$\{\sigma^o, m^o, \lambda_1^o, k^o, t^o, r^o\}$--.

Column 36, Line 12:
Delete the phrase "$C_{sw} = 0.5\|(I-P)Y - (I-P)V_1\theta\|_2^{\ 1} + \lambda_1\|\theta\|_1$," and replace with --$C_{sw} = 0.5\|(I-P)Y - (I-P)V_1\theta\|_2^2 + \lambda_1\|\theta\|_1$,--.

Column 36, Line 26:
Delete the phrase "if $F_i < 0$," and replace with --if $F_i \leq 0$,--.

Column 37, Line 65:
Delete the phrase "$C_{sw} = 0.5\|V_m \alpha_{\lambda_1} - Y\|_2^2 + \lambda_1 \|E\alpha_{\lambda_1}\|_1$," and replace with --$C_{sw} = 0.5\|V_m \alpha_{\lambda_1} - Y\|_2^2 + \lambda_1 \|E\alpha_{\lambda_1}\|_1$.--.

Column 39, Line 63:
Delete the phrase "(CS4 VM)." and replace with --(*CS4VM*).--.

Column 41, Line 29:

CERTIFICATE OF CORRECTION (continued)
U.S. Pat. No. 11,010,691 B1

Delete the phrase "meanS3 VM." and replace with --*meanS3VM.*--.

Column 41, Line 30:
Delete the phrase "CS4 VM." and replace with --*CS4VM.*--.

Column 41, Line 42:
Delete the phrase "meanS3 VM." and replace with --*meanS3VM.*--.

Column 41, Line 43:
Delete the phrase "CS4 VM." and replace with --*CS4VM.*--.

Column 41, Line 58:
Delete the phrase "meanS3 VM." and replace with --*meanS3VM.*--.

Column 41, Line 59:
Delete the phrase "CS4 VM." and replace with --*CS4VM.*--.

Column 41, Line 62:
Delete the phrase "meanS3 VM." and replace with --*meanS3VM.*--.

Column 42, Line 6:
Delete the phrase "meanS3 VM." and replace with --*meanS3VM.*--.

Column 42, Line 7:
Delete the phrase "CS4 VM." and replace with --*CS4VM.*--.

Column 42, Line 10:
Delete the phrase "meanS3 VM." and replace with --*meanS3VM.*--.

Column 42, Line 21:
Delete the phrase "meanS3 VM." and replace with --*meanS3VM.*--.

Column 42, Line 22:
Delete the phrase "CS4 VM." and replace with --*CS4VM.*--.

In the Claims

Claim 6, Column 46, Lines 51-52:
Delete the phrase "$W = ZD^-_{.05}D^{-0.5}Z^T$," and replace with --$W = ZD^{-.05}D^{-0.5}Z^T$,--.

Claim 7, Column 47, Lines 1-2:
Delete the phrase "a is a predefined kernel parameter value," and replace with --$\sigma$ is a predefined kernel parameter value,--.

Claim 15, Column 48, Line 5-6:

CERTIFICATE OF CORRECTION (continued)

Delete the phrase "$P = V_2^T(V_2^T V_2)^{-1} V_2$," and replace with $--P = V_2^T(V_2^T V_2)^{-1} V_2,--$.

Claim 17, Column 48, Lines 34-35:
Delete the phrase "$C_{sw} = 0.5\|(I-P)Y - (I-P)V_1\theta\|_2^2 + \lambda_1\|\theta\|_1$," and replace with $--C_{sw} = 0.5\|(I-P)Y - (I-P)V_1\theta\|_2^2 + \lambda_1\|\theta\|_1,--$.

Claim 24, Column 49, Line 67:
Delete the phrase "$C_{sw} = 0.5\|V_m \alpha_{80\ 1} - Y\|_2^2 + \lambda_1\|E\alpha_{\lambda_1}\|_1$," and replace with $--C_{sw} = 0.5\|V_m \alpha_{\lambda_1} - Y\|_2^2 + \lambda_1\|E\alpha_{\lambda_1}\|_1,--$.

Claim 26, Column 50, Lines 29-30:
Delete the phrase "$\tilde{Y} = V_m(V_m^T V_m)^{-1} V_m^T Y$, $\acute{Y}$ is the estimated label vector," and replace with $--\tilde{Y} = V_m(V_m^T V_m)^{-1} V_m^T Y,--$ $\tilde{Y}$ is the estimated label vector,--.

Claim 27, Column 50, Line 37:
Delete the phrase "$F = E(V_m^T V_m)^{-1} V_m^T$," and replace with $--F = E(V_m^T V_m)^{-1} V_m^T,--$.

Claim 28, Column 50, Lines 43-44:
Delete the phrase "$\alpha_{\lambda_1} = (V_m^T V_m)^{-1} V_m^T(\tilde{Y} - F_T \hat{u}_\lambda)$," and replace with $--\alpha_{\lambda_1} = (V_m^T V_m)^{-1} V_m^T(\tilde{Y} - F^T \hat{u}_\lambda),--$.